US011562502B2

(12) United States Patent
Wallack et al.

(10) Patent No.: US 11,562,502 B2
(45) Date of Patent: Jan. 24, 2023

(54) SYSTEM AND METHOD FOR CALIBRATING A PLURALITY OF 3D SENSORS WITH RESPECT TO A MOTION CONVEYANCE

(71) Applicant: Cognex Corporation, Natick, MA (US)

(72) Inventors: Aaron S. Wallack, Natick, MA (US); Gang Liu, Natick, MA (US); Robert A. Wolff, Sherborn, MA (US); David J. Michael, Wayland, MA (US); Ruibing Wang, Framingham, MA (US); Hongwei Zhu, Natick, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/876,551

(22) Filed: May 18, 2020

(65) Prior Publication Data

US 2020/0388053 A1 Dec. 10, 2020

Related U.S. Application Data

(63) Continuation-in-part of application No. 15/784,043, filed on Oct. 13, 2017, now abandoned, which is a
(Continued)

(51) Int. Cl.
*G06T 7/80* (2017.01)
*G06T 7/246* (2017.01)
(Continued)

(52) U.S. Cl.
CPC ............ *G06T 7/80* (2017.01); *G01B 11/2504* (2013.01); *G06T 7/246* (2017.01); *H04N 13/246* (2018.05);
(Continued)

(58) Field of Classification Search
CPC ........... H04N 13/0246; H04N 13/0239; H04N 17/002; G06K 9/52; G06T 7/0042; G06T 7/20; G06T 7/60; G06T 2200/04
See application file for complete search history.

(56) References Cited

U.S. PATENT DOCUMENTS 4,682,894 A * 7/1987 Schmidt ............... G01B 11/306
356/243.4
4,925,308 A * 5/1990 Stern .................... G01B 11/005
356/243.4
(Continued)

FOREIGN PATENT DOCUMENTS

CA 2583935 A1 8/2001
CN 1358268 A 7/2002
(Continued)

OTHER PUBLICATIONS

Akihiro et al., "Encoderless Robot Motion Control using Vision Sensor and Back Electromotive Force", International Conference on Intelligent Robots and Systems, Sep. 2014, 7 pages.
(Continued)

*Primary Examiner* — Zaihan Jiang
(74) *Attorney, Agent, or Firm* — Loginov & Associates, PLLC; William A. Loginov

(57) ABSTRACT

This invention provides an easy-to-manufacture, easy-to-analyze calibration object which combines measurable and repeatable, but not necessarily accurate, 3D features—such as a two-sided calibration object/target in (e.g.) the form of a frustum, with a pair of accurate and measurable features, more particularly parallel faces separated by a precise specified thickness, so as to provide for simple field calibration of opposite-facing DS sensors. Illustratively, a composite calibration object can be constructed, which includes the two-sided frustum that has been sandblasted and anodized (to provide measurable, repeatable features), with a flange whose above/below parallel surfaces have been ground to a precise specified thickness. The 3D corner positions of the two-sided frustum are used to calibrate the two sensors in X and Y, but cannot establish absolute Z without accurate
(Continued)

information about the thickness of the two-sided frustum; the flange provides the absolute Z information.

19 Claims, 56 Drawing Sheets

Related U.S. Application Data continuation-in-part of application No. 14/936,616, filed on Nov. 9, 2015, now Pat. No. 10,757,394, application No. 16/876,551, filed on May 18, 2020, which is a continuation-in-part of application No. 15/232,787, filed on Aug. 9, 2016, now Pat. No. 10,812,778, which is a continuation-in-part of application No. 14/936,616, filed on Nov. 9, 2015, now Pat. No. 10,757,394.

(51) Int. Cl.
  *G01B 11/25* (2006.01)
  *H04N 13/246* (2018.01)
(52) U.S. Cl.
  CPC .............. *G06T 2207/10012* (2013.01); *G06T 2207/10028* (2013.01); *G06T 2207/30108* (2013.01)

(56) References Cited

U.S. PATENT DOCUMENTS

| | | |
|---|---|---|
| 4,969,108 A | 11/1990 | Webb |
| 5,134,665 A | 7/1992 | Jyoko |
| 5,325,036 A | 6/1994 | Diethert |
| 5,349,378 A | 9/1994 | Maali |
| 5,557,410 A | 9/1996 | Huber |
| 5,675,407 A | 10/1997 | Geng |
| 5,742,398 A | 4/1998 | Laucournet |
| 5,768,443 A | 6/1998 | Michael |
| 5,832,106 A | 11/1998 | Kim |
| 6,005,548 A | 12/1999 | Latypov |
| 6,009,359 A | 12/1999 | El-Hakim |
| 6,026,720 A | 2/2000 | Swank |
| 6,064,759 A | 5/2000 | Buckley |
| 6,246,193 B1 | 7/2001 | Dister |
| 6,272,437 B1 | 8/2001 | Woods |
| 6,678,058 B2 | 1/2004 | Baldwin |
| 6,963,423 B2 | 11/2005 | Ogasahara |
| 7,004,392 B2 | 2/2006 | Mehlberg |
| 7,177,740 B1 | 2/2007 | Guangjun |
| 7,397,929 B2 | 7/2008 | Nichani |
| 7,583,275 B2 | 9/2009 | Neumann |
| 7,626,569 B2 | 12/2009 | Lanier |
| 7,681,453 B2 | 3/2010 | Turner |
| 7,797,120 B2 | 9/2010 | Walsh |
| 7,822,571 B2 | 10/2010 | Kakinami |
| 7,912,673 B2 | 3/2011 | Hebert |
| 8,049,779 B2 | 11/2011 | Poulin |
| 8,111,904 B2 | 2/2012 | Wallack |
| 8,559,065 B2 | 10/2013 | Deamer |
| 8,872,897 B2 | 10/2014 | Grossmann |
| 9,325,974 B2 | 4/2016 | Hébert |
| 9,410,827 B2 | 8/2016 | Ghazizadeh |
| 9,417,428 B2 | 8/2016 | Shuster |
| 9,596,459 B2 | 3/2017 | Keaffaber |
| 9,816,287 B2 | 11/2017 | Zhou |
| 9,846,960 B2 * | 12/2017 | Kirk ............... H04N 13/239 |
| 9,941,775 B2 | 4/2018 | Fiseni |
| 10,725,446 B2 * | 7/2020 | Mercelis ........... G03F 7/70516 |
| 2002/0113970 A1 | 8/2002 | Baldwin |
| 2002/0196336 A1 | 12/2002 | Batson |
| 2004/0002415 A1 | 1/2004 | Jang |
| 2005/0068523 A1 | 3/2005 | Wang |
| 2006/0137813 A1 | 6/2006 | Robrecht |
| 2007/0016386 A1 | 1/2007 | Husted |
| 2007/0055468 A1 | 3/2007 | Pylvaenaeinen |
| 2008/0007720 A1 * | 1/2008 | Mittal ............... H04N 5/247 348/E7.086 |
| 2008/0083193 A1 | 4/2008 | McGlinchy |
| 2008/0298673 A1 | 12/2008 | Zhang |
| 2009/0024241 A1 | 1/2009 | Rice |
| 2009/0039810 A1 | 2/2009 | Gotz |
| 2009/0141065 A1 * | 6/2009 | Darbin .............. H01F 7/18 347/19 |
| 2009/0220124 A1 * | 9/2009 | Siegel .............. G06T 7/292 382/103 |
| 2009/0259412 A1 * | 10/2009 | Brogardh .......... G05B 19/423 702/41 |
| 2010/0020178 A1 | 1/2010 | Kleihorst |
| 2010/0024723 A1 | 2/2010 | Hasegawa |
| 2010/0033333 A1 | 2/2010 | Victor |
| 2010/0086672 A1 | 4/2010 | Von Drasek |
| 2010/0166294 A1 | 7/2010 | Marrion |
| 2010/0245541 A1 | 9/2010 | Zhao |
| 2010/0292963 A1 * | 11/2010 | Schroeder ........... B33Y 50/00 703/1 |
| 2011/0125442 A1 | 5/2011 | Schallmoser |
| 2011/0132208 A1 | 6/2011 | Asakawa |
| 2011/0301901 A1 * | 12/2011 | Panagas ............ G01C 25/005 702/104 |
| 2012/0067397 A1 | 3/2012 | Shah |
| 2012/0265479 A1 | 10/2012 | Bridges |
| 2012/0311810 A1 | 12/2012 | Gilbert |
| 2013/0188017 A1 | 7/2013 | Ma |
| 2013/0266178 A1 | 10/2013 | Jain |
| 2013/0278725 A1 * | 10/2013 | Mannan ............ H04N 13/254 348/46 |
| 2013/0329012 A1 * | 12/2013 | Bartos ................. G06T 7/80 348/46 |
| 2014/0056507 A1 * | 2/2014 | Doyle ................ G01B 11/25 382/152 |
| 2014/0085429 A1 | 3/2014 | Hebert |
| 2014/0170302 A1 | 6/2014 | Von Drasek |
| 2014/0201674 A1 | 7/2014 | Holz |
| 2014/0210456 A1 | 7/2014 | Grossman |
| 2014/0240520 A1 | 8/2014 | Liu |
| 2014/0267689 A1 | 9/2014 | Lavoie |
| 2014/0327746 A1 | 11/2014 | Dubois |
| 2015/0015607 A1 * | 1/2015 | Sodhi ............... G06F 3/0425 345/633 |
| 2015/0130927 A1 | 5/2015 | Luxen |
| 2016/0005219 A1 | 1/2016 | Powell |
| 2016/0059412 A1 | 3/2016 | Oleynik |
| 2016/0086344 A1 | 3/2016 | Regnier |
| 2016/0182903 A1 * | 6/2016 | Grundhöfer ......... H04N 17/002 348/187 |
| 2016/0262685 A1 * | 9/2016 | Wagner ............. A61B 5/1123 |
| 2017/0032526 A1 | 2/2017 | Gao |
| 2017/0053407 A1 | 2/2017 | Benosman |
| 2017/0069052 A1 | 3/2017 | Li |
| 2017/0127912 A9 | 5/2017 | Morrissette |
| 2017/0160314 A1 * | 6/2017 | Furukawa .......... G01R 15/242 |
| 2017/0228864 A1 | 8/2017 | Liu |

FOREIGN PATENT DOCUMENTS

| | | |
|---|---|---|
| CN | 102066872 A | 5/2011 |
| CN | 102538727 A | 7/2012 |
| CN | 104006825 A | 8/2014 |
| CN | 106052607 A | 10/2016 |
| DE | 19536297 A1 | 4/1997 |
| DE | 10016963 A1 | 10/2001 |
| DE | 102009054842 | 6/2011 |
| EP | 1143221 A2 | 10/2001 |
| EP | 1431705 A1 | 6/2004 |
| EP | 2466250 A1 | 6/2012 |
| WO | 9912082 A1 | 3/1999 |

(56) References Cited

FOREIGN PATENT DOCUMENTS

| WO | 2016046072 | 3/2016 |
| WO | 2017067541 A1 | 4/2017 |

OTHER PUBLICATIONS

English et al, "On the Implementation of Velocity Control for Kinematically Redundant Manipulators", "IEEE Transactions on Systems, Man and Cybernetics—Part A: Systems and Humans", May 2000, pp. 233-237, vol. 30, No. 3, Publisher: IEEE Transactions on Systems, Man and Cybernetics, Published in: USA.
Shoemake, "Animating Rotation With Quaternion Curves", "SIGGRAPH, San Francisco", Jul. 22, 1985, pp. 245-254, vol. 19, No. 3, Publisher: ACM, Published in: US.
Z. Ni et al., "Asynchronous event-based visual shape tracking for stable haptic feedback in microrobotics", IEEE Transaction on Robotics, 2012, vol. 28, No. 5, pp. 1081-1089 (Year: 2012).

* cited by examiner

SYSTEM AND METHOD FOR CALIBRATING A PLURALITY OF 3D SENSORS WITH RESPECT TO A MOTION CONVEYANCE

RELATED APPLICATIONS

This application is a continuation in part of co-pending U.S. patent application Ser. No. 15/784,043, entitled SYSTEM AND METHOD FOR FIELD CALIBRATION OF A VISION SYSTEM IMAGING TWO OPPOSITE SIDES OF A CALIBRATION OBJECT, filed Oct. 13, 2017, which is a continuation-in-part of co-pending U.S. patent application Ser. No. 14/936,616, entitled SYSTEM AND METHOD FOR CALIBRATING A PLURALITY OF 3D SENSORS WITH RESPECT TO A MOTION CONVEYANCE, filed Nov. 9, 2015, and this application is a continuation in part of co-pending U.S. patent application Ser. No. 15/232,787, entitled SYSTEM AND METHOD FOR CALIBRATING ONE OR MORE 3D SENSORS MOUNTED ON A MOVING MANIPULATOR, filed Aug. 9, 2016, which is a continuation-in-part of co-pending U.S. patent application Ser. No. 14/936,616, entitled SYSTEM AND METHOD FOR CALIBRATING A PLURALITY OF 3D SENSORS WITH RESPECT TO A MOTION CONVEYANCE, filed Nov. 9, 2015, the teachings of each of which applications are expressly incorporated herein by reference.

FIELD OF THE INVENTION

This application relates to machine vision systems and more particularly to systems and methods for calibrating vision systems having multiple camera assemblies oriented to image a scene from different points of view using a calibration object or "target".

BACKGROUND OF THE INVENTION

In manufacturing and assembly processes, it is often desirable to analyze an object surface to determine the nature of features and/or irregularities. The displacement (or "profile") of the object surface can be determined using a machine vision system (also termed herein "vision system") in the form of a laser displacement sensor (also termed a laser beam "profiler"). A laser displacement sensor captures and determines the (three dimensional) profile of a scanned object surface using a planar curtain or "fan" of a laser beam at a particular plane transverse to the beam propagation path. In a conventional arrangement, a vision system camera assembly is oriented to view the plane of the beam from outside the plane. This arrangement captures the profile of the projected line (e.g. extending along the physical x-axis) on the object surface, which, due to the baseline (i.e. the relative spacing along the y-axis) between the beam (sometimes characterized as a "fan") plane and the camera causes the imaged line to appear as varying in the image y axis direction as a function of the physical z-axis height of the imaged point (along the image x axis). This deviation represents the profile of the surface. Laser displacement sensors are useful in a wide range of inspection and manufacturing operations where the user desires to measure and characterize surface details of a scanned object via triangulation. One form of laser displacement sensor uses a vision system camera having a lens assembly and image sensor (or "imager") that can be based upon a CCD or CMOS design. The imager defines a predetermined field of grayscale or color-sensing pixels on an image plane that receives focused light from an imaged scene through a lens.

In a typical arrangement, the displacement sensor(s) and/or object are in relative motion (usually in the physical y-coordinate direction) so that the object surface is scanned by the sensor(s), and a sequence of images are acquired of the laser line at desired spatial intervals-typically in association with an encoder or other motion measurement device (or, alternatively, at time based intervals). Each of these single profile lines is typically derived from a single acquired image. These lines collectively describe the surface of the imaged object and surrounding imaged scene and define a "range image" or "depth image".

Other camera assemblies, know to those of skill, can also be employed to capture a 3D image (range image) of an object in a scene, such as stereoscopic cameras, time-of-flight cameras, LIDAR-based cameras, etc. The term range image is used to characterize an image (a two-dimensional array of values) with pel values characterizing Z height at each location, or characterizing that no height is available at that location. The term range image is alternatively used to refer to generic 3D data, such as 3D point cloud data, or 3D mesh data. The term range and gray image is used to characterize an image with pel values characterizing both Z height and associated gray level at each location, or characterizing that no height is available at that location, or alternatively a range and gray image can be characterized by two corresponding images-one image characterizing Z height at each location, or characterizing that no Z height is available at that location, and one image characterizing associated gray level at each location, or characterizing that no gray level is available at that location. The term range image is alternatively used to refer to range and gray image, or 3D point cloud data and associated gray level data, or 3D mesh data and associated gray level data. For example, structured light systems, stereo vision systems, DLP metrology, and other arrangements can be employed. These systems all generate an image that provides a height value (e.g. z-coordinate) to pixels.

A 3D range image generated by various types of camera assemblies (or combinations thereof) can be used to locate and determine the presence and/or characteristics of particular features on the object surface. In certain vision system implementations, such as the inspection of circuit boards, a plurality of displacement sensors (e.g. laser profilers) are mounted together to extend the overall field of view (FOV) (wherein the term "field of view" refers to measurement range) of the vision system so as to fully image a desired area of the object (e.g. its full width) with sufficient resolution. In the example of a laser profiler, the object moves in relative motion with respect to the camera(s) so as to provide a scanning function that allows construction of a range (or, more generally a "3D") image from a sequence of slices acquired at various motion positions. This is often implemented using a conveyor, motion stage, robot end effector or other motion conveyance. This motion can be the basis of a common (motion) coordinate space with the y-axis defined along the direction of "scan" motion.

It is recognized that profilers (also termed "profile sensors") can provide fast, accurate, non-contact 3D measurements by moving a scene with respect to a calibrated image formation system consisting of a light-sheet and a camera. The vast majority of profile sensor implementations model the structured light (e.g. laser) sheet projected therefrom as a plane (even though real physical systems are imperfect). Because of these imperfections—for example the profiler may actually project an arcuate or curved sheet—modeling the sheet more accurately than a simple plane improves the sensors' 3D measurement accuracy. Furthermore, accurately scanning scenes requires accurately knowing the relative motion between the scene and the image formation system. Better accounting for these variables can improve scanning accuracy.

SUMMARY OF THE INVENTION

The invention overcomes disadvantages of the prior art by providing a system and method for calibrating one or more (e.g.) profiler-type) scanning sensor(s) by modelling non-planar light sheets (structured light) that can be projected by the sensor(s). Calibrations in which the planar laser sheet is not aligned to the (X,Z) plane can be supported by the system and method herein. A field calibration procedure can be called iteratively to refine a motion vector estimate, so that, after each iteration, the input dataset is recomputed to reflect the updated motion vector estimate. The calibration procedure can be associated with one or more of 3D sensors that are operatively connected to a vision processor assembly, arranged to image a scene containing a stable object. A conveyance can provide relative motion between to the plurality of 3D sensors and the stable object along a motion direction. A calibration module can be arranged to concurrently calibrate the plurality of 3D sensors to a common coordinate space by providing measurements of 3D features on the stable object and by calibrating the stable object based upon the measurements and the 3D features found from 3D image data of the stable object acquired by each of the plurality of 3D sensors during the relative motion. Illustratively, the measurements can be generated by at least one of (a) a specification of the stable object and (b) 3D features found in an image of the stable object acquired by one of the plurality of 3D sensors. In various implementations, the sensor(s) can be laser displacement sensor(s) (profiler(s)).

In an illustrative embodiment, a system and method can be provided for generating measurements that can be the result of a calibration process in a 3D vision system sensor (or a plurality of 3D vision system sensors (e.g., profiler(s)) in the presence of either a non-planar structured light sheet used to illuminate an object or a non-parallel relationship between a direction of object travel and a factory coordinate space of the 3D vision system sensor. An image sensor can be connected to a processor responsive to factory calibration parameters associated with a factory coordinate space and can be adapted to receive motion step information from a motion conveyance that moves the object with respect to a field of view and the structured light sheet of the 3D vision sensor. A correction process can determine a mapping between the factory coordinate space and a coordinate space can be derived from acquired 3D image data of the object and that derives a transform therebetween. An iterative process can then apply the correction process a plurality of times based upon predetermined factors.

Illustratively, the correction process can employ estimates of the motion step information, and can be adapted to re-estimate acquired point positions of the 3D data based upon the estimated motion step information. The iterative process can re-estimate measured features of the object to derive updated measured features, and can re-estimate the motion step information from the updated measured features. The motion step information can define vector information. Also, the predetermined factors can comprise a number of times the iterative process is performed or convergence of the re-estimated measured features. The 3D image data can be based upon a calibration object having a plurality of 3D features thereon. The 3D features can define a frustum. Illustratively, the 3D vision system sensor can be a laser displacement sensor. A plurality of laser displacement sensors can be mounted across a width that is substantially transverse to the motion direction. An exemplary calibration object can have (a) a base defining a first side and an opposing second side, (b) a first three-dimensional element projecting from the first side, the first three-dimensional element having a first top, (c) a second three-dimensional element projecting from the second side, the second three-dimensional element having a second top, and (d) a first plane located relative to the first side and a second plane located relative to the second side, wherein the first plane and the second plane are substantially parallel.

In an illustrative embodiment, as system and method for generating calibration measurements in a profile sensor of a vision system can be provided, and can have a compensation process that determines an image sensor coordinate space and a substantially planar structured light coordinate space that can be non-parallel with respect to each other. The compensation process can further determine a transform between the image sensor coordinate space and the structured light coordinate space using features of an imaged calibration object of known dimensions. The transform can be stored as part of the calibration parameters of the profile sensor. Illustratively, the compensation process can occur in a manner that is free of physical alignment or fixturing processes with respect to the profile sensor, by relying on a software-based technique to compensate for physical non-parallelism.

BRIEF DESCRIPTION OF THE DRAWINGS

The invention description below refers to the accompanying drawings, of which.

DETAILED DESCRIPTION

I. System Overview

Figure 1:
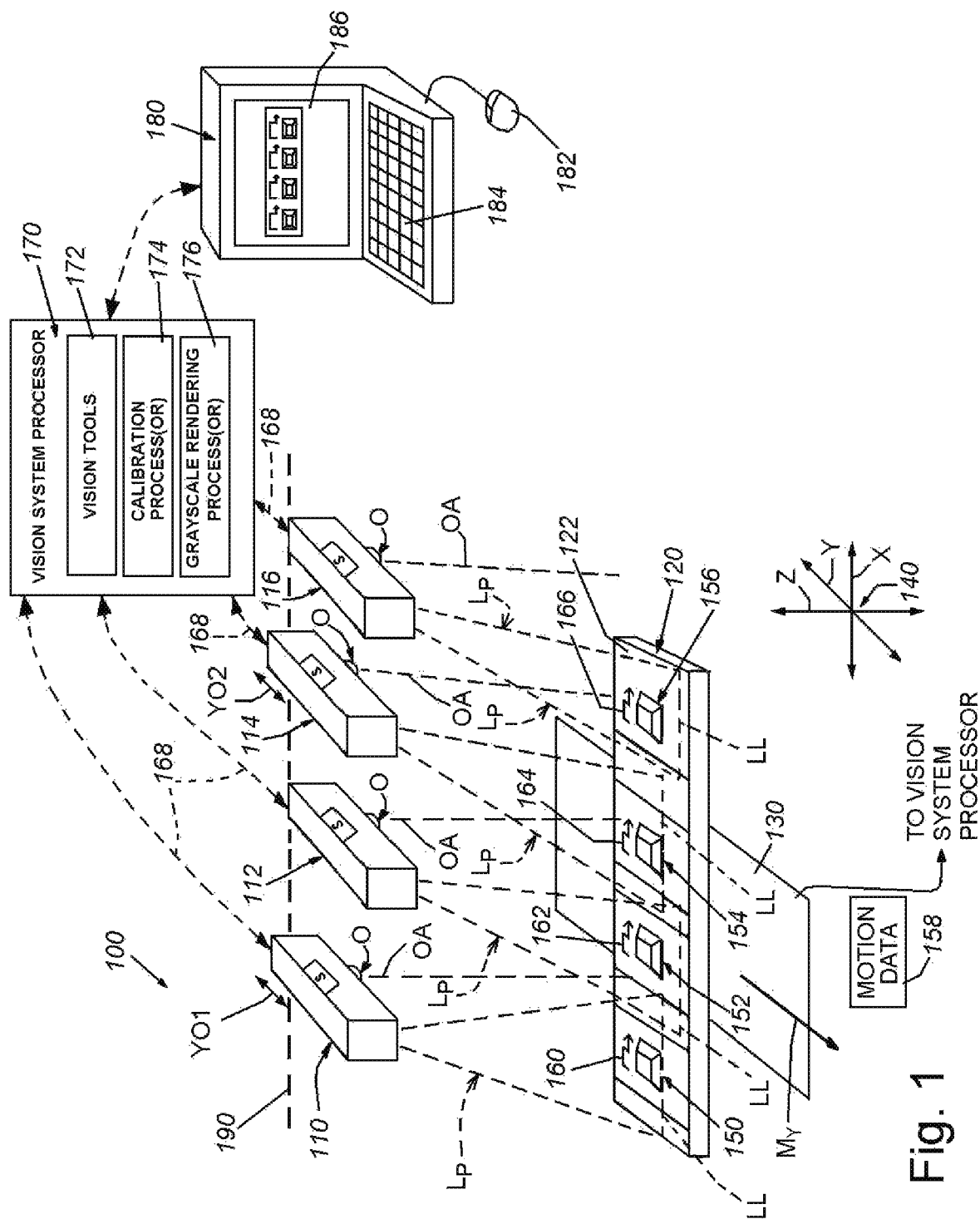
FIG. 1 is diagram of an exemplary vision system arrangement employing a plurality of 3D sensors in conjunction with a motion conveyance that provides relative motion between a stable object (e.g. a calibration object as shown and/or runtime object under inspection) and the 3D sensors.

FIG. 1 details a vision system arrangement 100 that includes a plurality of (3D) displacement sensors 110, 112, 114 and 116. In this exemplary arrangement, four sensors are depicted. However at least two and greater than four sensors can be employed as the exemplary "plurality" as defined herein. The sensors 110, 112, 114, 116 can be arranged in a variety of orientations that are typically side-by-side with respect to each other as shown to define a widened (in the x-axis direction as defined below) field of view (FOV). The 3D sensors 110, 112, 114 and 116 in this exemplary arrangement are implemented as so-called laser profilers or laser displacement sensors that rely upon relative motion (arrow My) generated by a motion conveyance that acts along the y-axis direction between the sensor and the object 120 under inspection to provide a range image (also termed herein a "3D image") of the object 120. As shown, in this embodiment, motion My is generated by the conveyor or motion stage (or another robotic manipulator component) 130. However, motion can be generated by the sensor mounting arrangement, or by both the conveyor/stage and a moving sensor mount. As described above, any image acquisition device that acquires a range image (including a height dimension for a given image pixel—thereby providing (e.g.) x, y and z—axis values for the pixels that image the object) can be employed as the 3D sensor herein.

By way of non-limiting example the depicted, exemplary laser displacement sensors 110, 112, 114 and 116 of the arrangement 100 consist of an image sensor (or imager) S and a separate laser illuminator generates a plane LP of laser light that is characterized as a "structured" illumination source in that it generates a specific optical effect on the surface of the object under inspection. The projected laser light plane LP projects a line LL on a portion of the underlying object 130 that is imaged. The laser plane LP is oriented to reside in a plane at a non-parallel (acute) angle relative to the optical axis OA of the imager optics O. In this manner, the image characterizes height deviations (variations in the local z-axis) on the surface as an offset in the line LL—generally along the local y-axis direction where the x-axis represents the direction of extension of the line LL along the surface. Each 3D sensor 110, 112, 114 and 116 inherently defines its own local coordinate space. This local coordinate space, associated with each 3D sensor, is potentially misaligned relative to the coordinate space of another one of the sensors.

Notably, the calibration of each individual 3D sensor is significantly accurate in terms of the relationship between displacement of the projected laser line LL along the local x-axis versus the local y-axis and the relative height of the imaged surface along the local z-axis. In many implementations, such accuracy can be measured in the micron or sub-micron level. Hence, the system and method herein can rely upon this inherent accuracy in making certain assumptions that speed and simplify calibration of the 3D sensors with respect to a common coordinate space. In the depicted exemplary arrangement of FIG. 1, the common coordinate space 140 is defined in terms of x, y and z-axes to which the images of all sensors are calibrated—where (by way of example) the direction of motion My is oriented along the y-axis of the coordinate space 140 and the x and z axes are orthogonal thereto. This allows the system to view a wide object that exceeds the FOV of a single 3D sensor.

The object 120 shown in FIG. 1 is a stable object (also generally termed herein as a "calibration object") consisting of a plurality of individual, spaced apart frustum assemblies (also termed calibration "subobjects") 150, 152, 154 and 156 that each define a discrete "feature set", separated by (e.g.) a planar region of the calibration object base plate or underlying base frame, which is typically free of 3D features (other than the side edges of the overall object). By "stable object", it is meant an object that remains rigid (and generally non-flexible) between uses so that its dimensions are predictable in each scan by the image sensors. The spacing between the individual assemblies is variable. In this embodiment, each frustum 150, 152, 154 and 156 resides within the local FOV of one of the respective 3D sensors 110, 112, 114 and 116. In an embodiment, each subobject is attached to an underlying plate or frame 122 in such a manner that the overall object exhibits minimal variation due to mechanical deflection (resulting from temperature variation, stresses, etc.), as described further below. This mechanical isolation of system components to reduce variable deflection enhances the repeatability and accuracy of the calibration process. It is contemplated that a variety of shapes can be employed as 3D calibration objects/shapes in various embodiments. A frustum affords a convenient shape for a calibration subobject consisting of a plurality of identifiable surfaces and edges that generate features (e.g. corners) used in the calibration process. It is expressly contemplated that other forms of calibration subobject shapes e.g. cones, irregular polyhedrons, etc. can be employed in alternate embodiments. Appropriate, unique fiducials 160, 162, 164 and 166, respectively allow the system to identify and orient each frustum 150, 152, 154 and 156 relative to the common coordinate space. Notably, each frustum is constructed to define a predictable and accurate shape, but need not be identical or precisely constructed in view of the teachings of the illustrative system and method. Likewise, while it is desirable to orient all frustum assemblies in a relatively aligned arrangement on the underlying plate 122, this is not required.

Motion My of the conveyor/stage 130 can be tracked by a motion encoder within the conveyor/stage (or by another motion sensing device, including a visual motion sensor that tracks movement of features (e.g. tick marks on the conveyor/stage) through the FOV of one or more sensors. The encoder signal (motion data) 158 as well as image data (dashed links 168) acquired by the sensors 110, 112, 114, 116, are provided to a vision process(or) 170. The processor 170 can be integrated in one or more of the sensor assemblies, or as depicted, can be located on a separate computing device 180 having appropriate user interface (e.g. mouse 182, keyboard 184) and display functions (screen and/or touchscreen 186). The computing device 180 can comprise a server, PC, laptop, tablet, smartphone or purpose-built processing device, among other types of processors with associated memory, networking arrangements, data storage, etc., that should be clear to those of skill.

The vision system process(or) 170 can include a variety of functional software processes and modules. The processes/modules can include various vision tools 172, such as feature detectors (e.g. edge detectors, corner detectors, blob tools, etc.). The vision system process(or) 170 further includes a calibration process(or) 174 that carries out the various functions of the system and method, and optionally, can include a grayscale rendering process(or) 176 that allows 3D images of objects acquired by the system to be rendered into a visible grayscale (and/or color-based) version of the object.

The mechanism for mounting the 3D sensors with respect to the imaged scene is highly variable. In an embodiment a rigid overlying beam is used. It is desirable to limit vibration, as such vibration introduces inaccuracy to the calibrated system.

Figure 2:
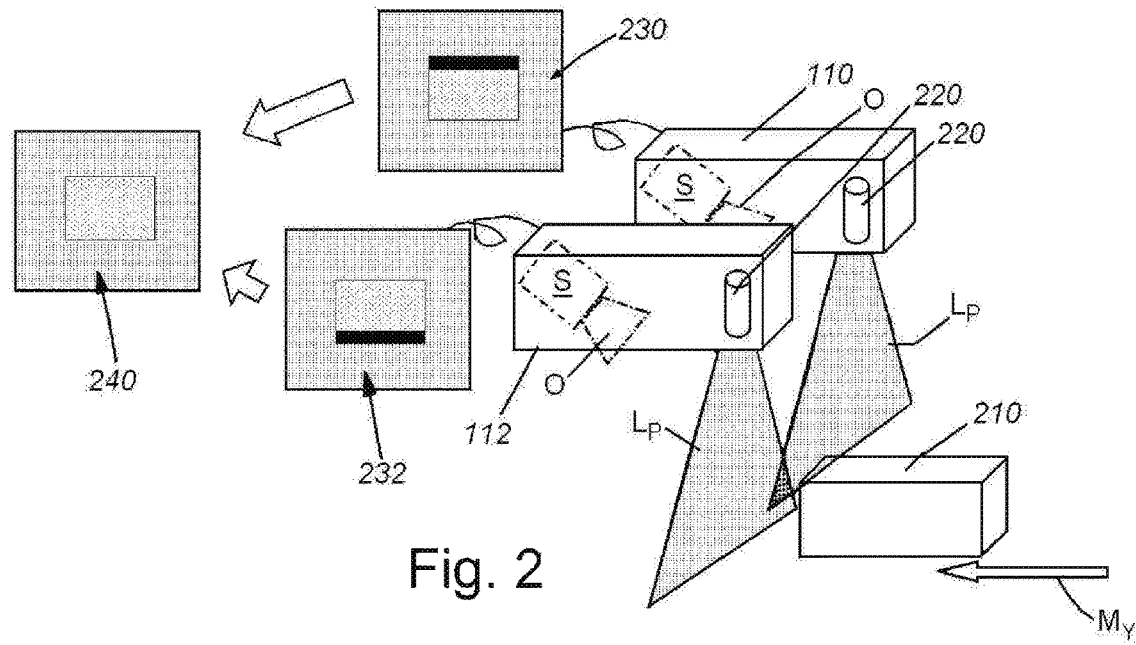
FIG. 2 is a diagram showing an arrangement of two 3D sensors arranged side-to-side so as to eliminate side occlusion with respect to a scanned object.

There are a variety of advantages to arranging a plurality of side-by-side sensors, all calibrated to a common coordinate space. Reference is made to FIG. 2, which shows an arrangement of two of the 3D sensors 110 and 112 acquiring an image of an exemplary object 210. In addition to the widening of the overall FOV, the use of a plurality of calibrated 3D sensors is to overcome occlusion induced by the sensing modality. By way of background, the exemplary, depicted displacement sensors project structured illumination onto a scene and a camera (sensor S and optics O) observes that structured illumination on the scene. 3D measurements are computed via triangulation after determining which structured illumination point corresponds to each observed feature in the camera's acquired image. This triangulation requires that the camera be relatively distant from the illumination projection, so as to establish a baseline for the triangulation. The downside of positioning the camera away from the structured illumination source is that portions of the scene can be occluded by either the camera or the structured illumination. Multiple displacement sensors can be used to overcome such occlusions, but displacement sensor calibration is required in order to accurately compose data from multiple displacement sensors. Note that the term calibration as used herein can also be referred to as "field calibration" in that it is performed in a user's runtime system environment, rather than at the factory producing the 3D sensor(s). Hence, the side-to-side (along the x-axis) sensor arrangement of FIG. 2 is useful for overcoming side occlusion. In this example, both the camera (S, O) and the laser plane (LP) projection illumination 220 can be considered to be emanating from a single point. An off-centered object can, thus, occlude a portion of the scene. Multiple 3D sensors can be configured so that any point in the scene is observed from both directions, as shown by the two partially occluded local images 230, 232 that are combined into a single complete, non-occluded image 240. Consequently, using multiple displacement sensors to view the scene from different perspectives/points of view can effectively overcome such side-to-side occlusion problems.

Figure 3:
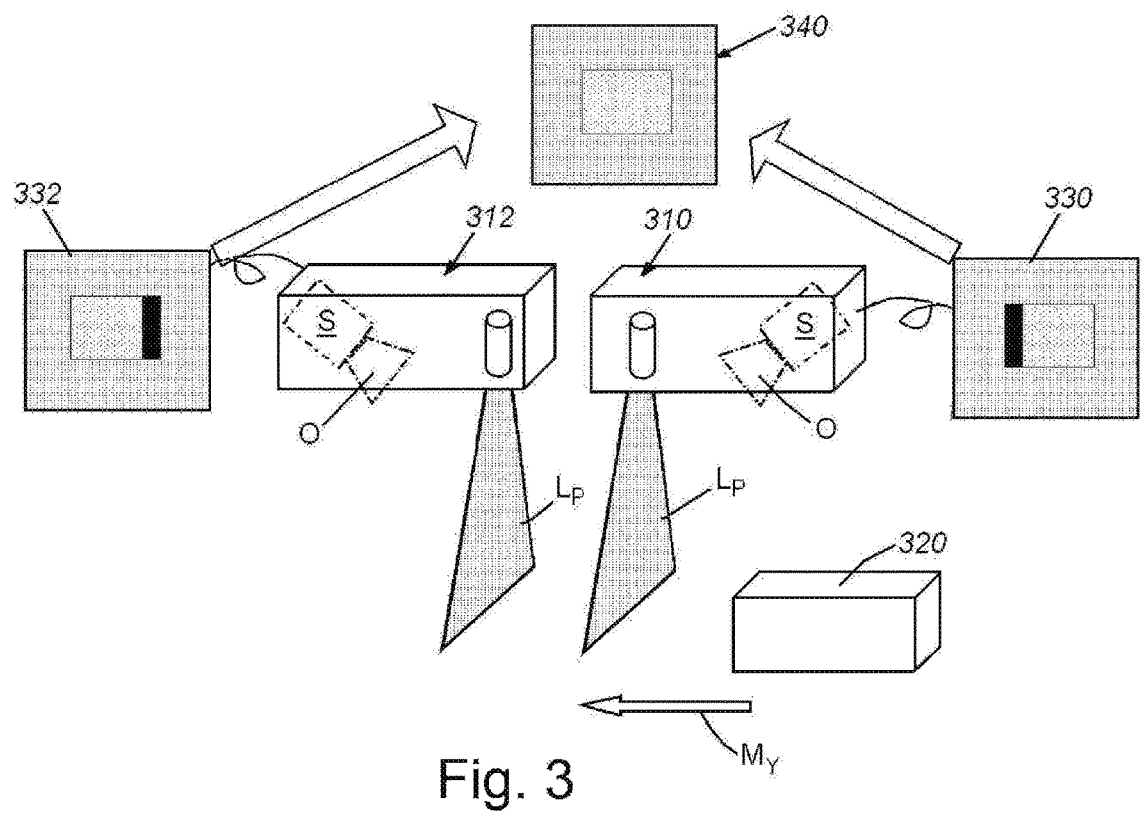
FIG. 3 is a diagram showing an optional arrangement in which an additional 3D sensor is arranged back-to-back with another 3D sensor (that is typically part of a side-to-side array of sensors) so as to eliminate object front-to-back occlusion.

Likewise, as depicted in FIG. 3, by locating a pair of sensors 310, 312 in a back-to-back arrangement along the y-axis (with at least one set of sensors also extended across the x-axis to enhance FOV). This arrangement allows each sensor to image a portion of an otherwise occluded object 320. Each partial image 330, 332 is combined to derive a full image 340 of the object using the calibration techniques described in accordance with the system and method herein.

Figure 4:
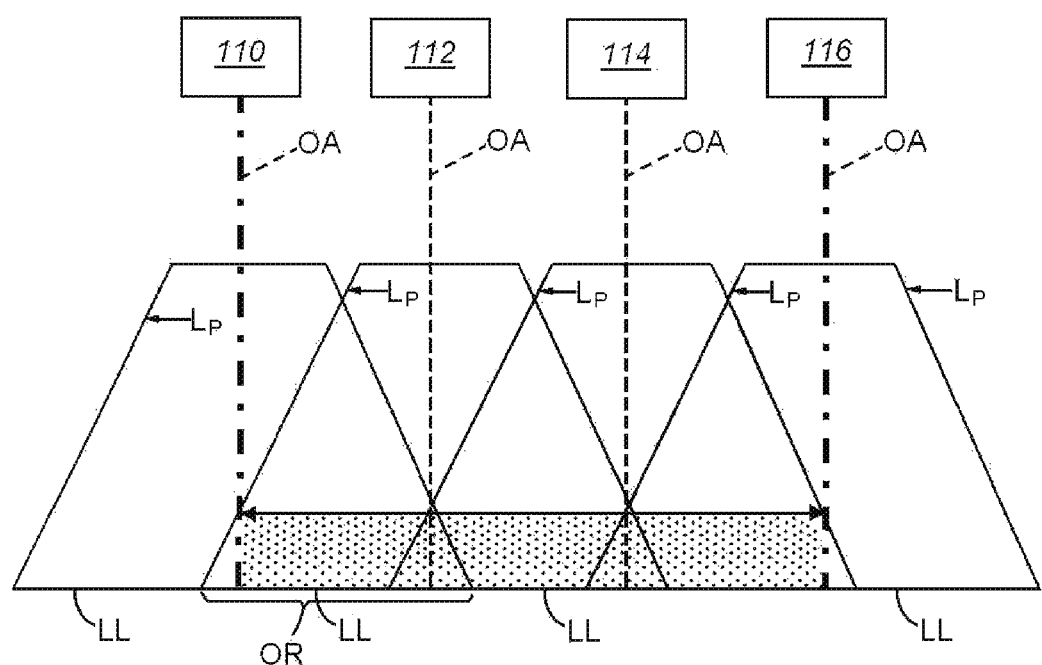
FIG. 4 is a front view of a plurality of sensors arranged with double-overlapping coverage to eliminate side occlusion of objects according to an exemplary side-by-side 3D sensor arrangement.

Notably, adjacent 3D sensors are mounted at an offset (at least) along the y-axis direction as indicated by the offset Yo1, Yo2 (from dashed line 190) of sensors 110, 114 with respect to sensors 112, 116. This offset ensures that there is no cross-talk or interference between the laser lines of each sensor. Each sensor's image is acquired separately and, as described below, is subsequently stitched together during the calibration process. Likewise, it is contemplated that each projected laser line LL, overlap at least one other line along the x-axis. This ensures that the entire surface of the object is fully imaged. As also described below, overlaps are aligned by the system and method during the stitching step. To further ensure that every portion of the object is viewed from both sides, thereby reducing opportunities for occlusion, FIG. 4 shows an optional arrangement in which the laser planes LP provide double-double coverage of the imaged scene. That is, the overlap region OR of each plane LP (e.g. sensor 110) is wide enough to cross the optical axis OA of an adjacent sensor (e.g. sensor 112). As shown, the plane of the first sensor (sensor 110) crosses into that of the next adjacent sensor (e.g. sensor 114) in this exemplary arrangement. Note that crosstalk between adjacent 3D sensors can be avoided by other mechanisms—some of which can allow sensors to be mounted substantially free of offset (Yo1, Yo2). For example, different-wavelength lasers can be projected in adjacent units coupled with narrowband filters on the associated sensor cameras/optics. Adjacent lasers with different polarizations and polarizing filters can be used in further embodiments. Additionally (or alternatively) the illumination controller(s) associated with each of the sensors can cause the respective, projected laser lines to be strobed in a synchronized manner such that each area where laser lines overlap can be imaged by the sensors while only the respective laser line associated with a given sensor is illuminated.

Figure 5:
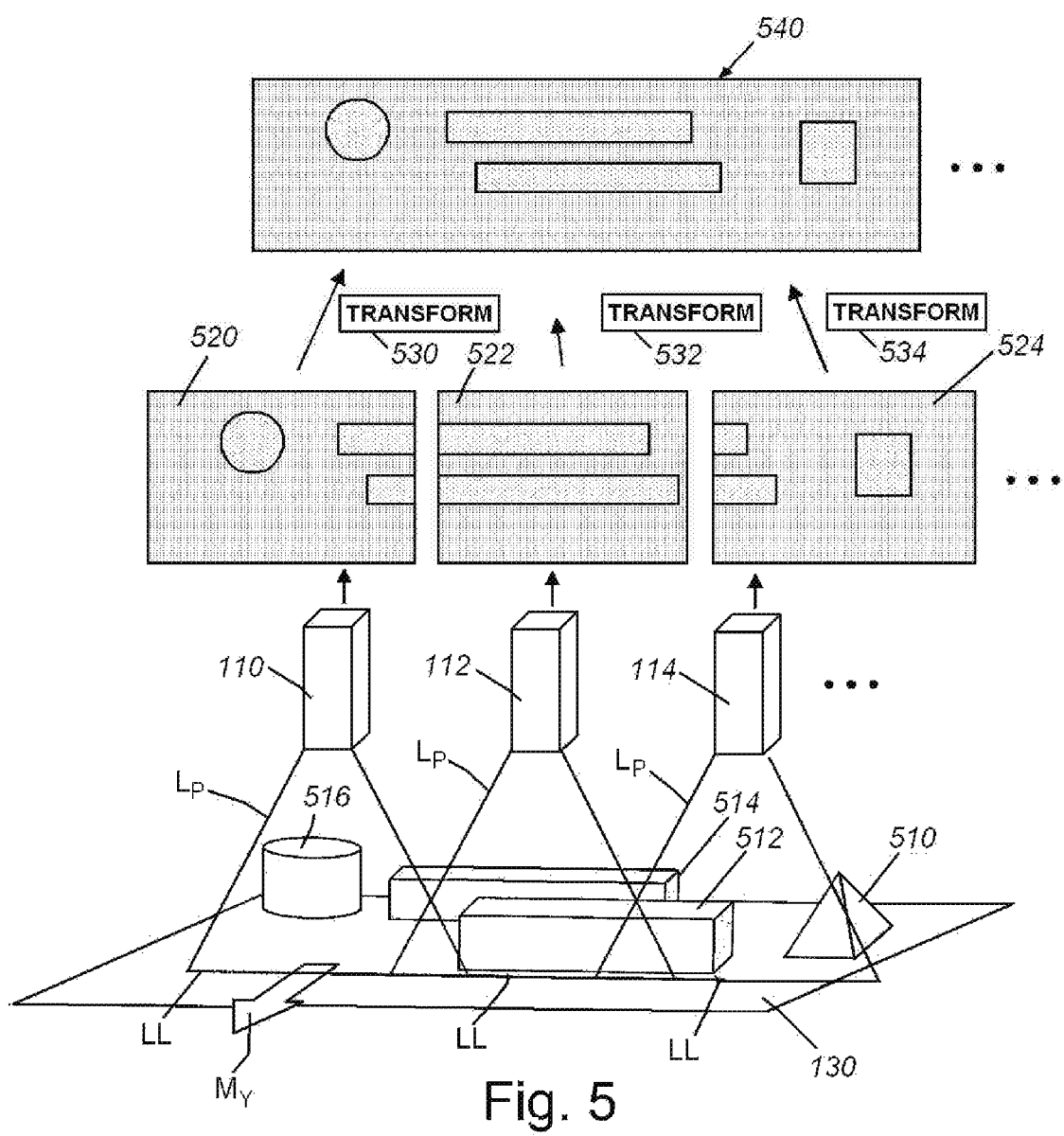
FIG. 5 is a diagram showing the stitching together of multiple 3D sensor images using the illustrative calibration system and method herein.

With reference now to FIG. 5, the system and method particularly facilitates stitching of runtime image data from multiple 3D sensors 110, 112, and 114 based upon the calibration process so as to define a single FOV and a common coordinate space. As shown, one or more object(s) 510, 512, 514 and 516 are moved (arrow My) with respect to the sensors 110, 112 and 114, which project planes LP with overlapping laser lines LL. In an embodiment, the lines can be offset from each other as shown in FIG. 1 (or otherwise arranged/selectively filtered) to prevent crosstalk and other undesirable conditions, as described herein. Each sensor 110, 112, 114 generates a respective image 520, 522, 524 of some, or a portion of, the object(s) 510, 512, 514 and 516 within its FOV in its local coordinate space. The calibration procedure generates a transform 530, 532, 534 that respectively transforms the coordinate space of each image 520, 522, 524 into a common coordinate space. The procedure also accounts for overlap between the images by blending overlap regions between images using (e.g.) techniques known to those of skill. The result is a stitched runtime image 540 in which the objects appear as part of a single, continuous FOV.

II. Definitions

Before discussing the details of the calibration system and method, the following definitions are provided to assist in understanding the concepts and terms presented herein.

Figure 7:
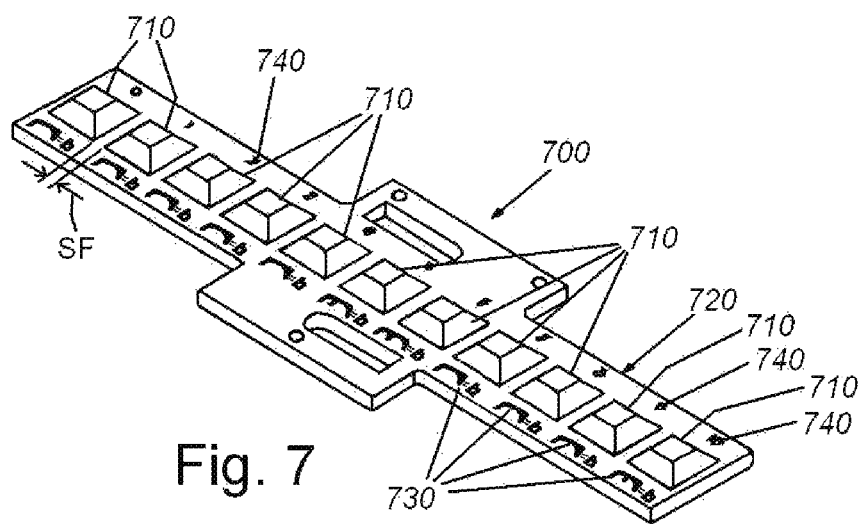
FIG. 7 is a perspective view of a unitary/monolithic calibration object defining a plurality of discrete frusta for use with the system according to an alternate embodiment.

| Term | Definition |
|---|---|
| Original Sensor $3D_{Sensor=i}$ | The coordinate space of range images acquired by sensor i of a plurality of sensors 0-n using only the factory calibration. Original Sensor $3D_{Sensor=i}$ is a not necessarily a physically accurate orthonormal space. Original Sensor $3D_{Sensor=i}$ has perpendicular x and z axes. The x axis, z axis, and origin of Original Sensor $3D_{Sensor=i}$ are based on the factory calibration. The y-axis corresponds to the motion direction (the y axis of Original Sensor $3D_{Sensor=I}$ is not necessarily perpendicular to the x and z axes. |
| Original Sensor $XZ3D_{Sensor=i}$ | A coordinate space which shares the x and z axes with Original Sensor $3D_{Sensor=i}$ but where the y axis is perpendicular to the x and z axes (as opposed to being based on the motion direction in the manner of Original Sensor $3D_{Sensor=i}$). |
| Sensor$3D_{Sensor=i}$ | The coordinate space of range images acquired by sensor i after incorporating this calibration. Sensor$3D_{Sensor=I}$ is a physically accurate orthonormal space. The origin of Sensor $3D_{Sensor=I}$ is at the origin of Original Sensor $3D_{Sensor=i}$. The z-axis of Sensor $3D_{Sensor=I}$ is parallel to the z-axis of Original Sensor $3D_{Sensor=i}$ and has unit length in Phys3D. The x-axis of Sensor $3D_{Sensor=I}$ is perpendicular to the z-axis of Sensor $3D_{Sensor=I}$ and has unit length in Phys3D and is in the x-z plane of Original Sensor $3D_{Sensor=i}$. The y-axis of Sensor $3D_{Sensor}$ is defined as the z-axis cross the x-axis. The coordinate axes of Sensor$3D_{Sensor=i}$ are parallel to the coordinate axes of Original Sensor $XZ3D_{Sensor=i}$ |
| Phys3D | A common consistent/shared coordinate space used to relate the sensors. Phys3D is a physically accurate orthonormal space. Phys3D is defined by the user-specified transform Object3DFromPhys3D$_{Pose=0}$ and the Object3D$_{Pose=0}$ coordinate space. |
| Sensor3DFromOriginalSensor $3D_{Sensor=i}$ | An affine transformation between Original Sensor$3D_{Sensor=i}$ and Sensor$3D_{Sensor=i}$ for sensor i |
| Sensor3DFromPhys$3D_{Sensor=i}$ | An orthonormal unit-length 3D transform between Sensor$3D_{Sensor=i}$ and Phys3D for sensor i |
| Calibration object | A 3D object comprised of one or more 3D frusta/subobjects |
| Object3D | An orthonormal physically accurate coordinate space affixed to the calibration object. |
| Object3D$_{Pose=p}$ | Coordinate space Object3D repositioned at Pose = p |
| Calibration object physical feature positions $F_{frusta, feature}$ | The (x, y, z) positions of individual features in the calibration object (specified with respect to the Object3D coordinate space). They can optionally be specified as inputs, or they can be automatically estimated by the displacement sensor calibration. |
| Measured feature positions $M_{pose, sensor, frusta, feature}$ | The measured (or estimated) (x, y, z) positions of features in the calibration target (measurements are in OriginalSensor3D$_{Sensor=i}$). |
| Object3DFromPhys3D$_{Pose=p}$ | The $p^{th}$ pose of the calibration object (with respect to Phys3D coordinates) - these transforms are estimated by the displacement sensor calibration. |
| OriginalSensor3DFromPhys $3D_{Sensor=i}$ | The relationship between the OriginalSensor3D$_{Sensor=i}$ coordinate space the of the $i^{th}$ sensor and Phys3D - this transform includes both the sensor's pose and non-rigid aspects of OriginalSensor3D$_{Sensor=i}$ |
| OriginalSensorXZ3DFrom Phys3D$_{Sensor=i}$ | The relationship between the OriginalSensorXZ3D$_{Sensor=i}$ coordinate space the of the $i^{th}$ sensor and Phys3D - these transforms are refined during the displacement sensor calibration refinement computation. |
| MotionVectorInPhys3D | The motion direction vector (measured with respect to Phys3D) - this vector is estimated by the displacement sensor calibration. | and retaining structures on the base plate in a manner that isolates them from deflection due to temperature variation, fastener tightening, etc. A variety of arrangements can be employed to attach the subobjects to the base plate. In an alternate embodiment, the subobjects can be attached to multiple base plates, or they can be attached to multiple rails. As described above, the spacing between subobjects should typically enable each sensor to image and register at least one subobject. Alternatively, as shown in the example of FIG. 7, the calibration object 700 can consist of a plurality of frusta (or other 3D shapes) 710 formed unitarily on a base plate 720 at an appropriate spacing SF therebetween. The size of the frusta and their relative spacing (SF) can allow more than one of the frusta 710 to be imaged and registered

III. Calibration Procedure

Figure 6:
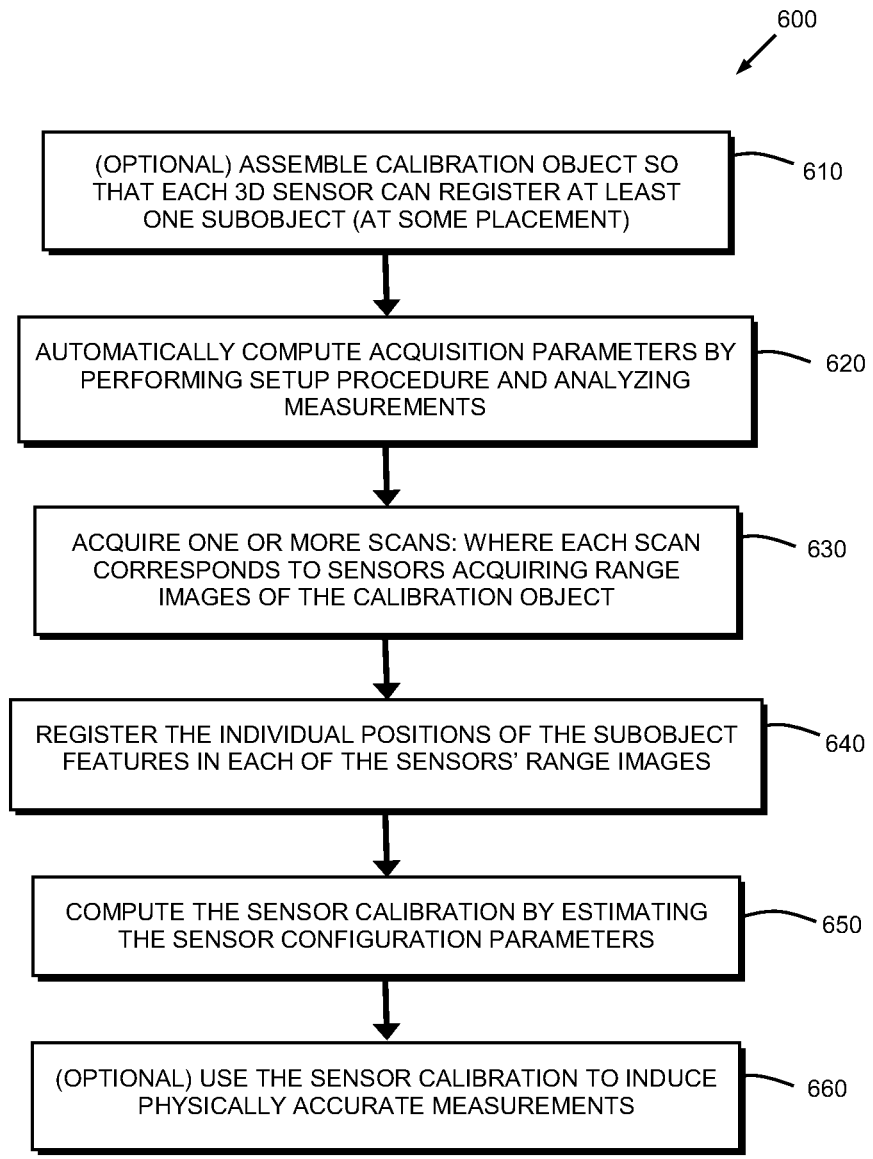
FIG. 6 is a flow diagram of a generalized calibration procedure according to an illustrative embodiment in which a plurality of sensors are concurrently calibrated to provide a continuous, stitched-together field of view (FOV)

Reference is now made to FIG. 6, which describes generalized calibration procedure 600 according to an illustrative embodiment. The procedure optionally includes step 610, in which a calibration object (e.g. object 120 in FIG. 1) is assembled using a plurality of spaced-apart, subobjects (e.g. 150, 152, 154, 156) on a base plate (e.g. base plate 122). The subobjects can be attached to slots or other mounting by each sensor, but typically at least one is imaged and registered. Fiducials 730 and/or numbers 740 can be used to uniquely identify each frustum 710. In an embodiment, the calibration object can include through-holes for mounting the calibration object to a mounting plate. In a further embodiment, those holes can reside in flexures so that the fixturing force minimizes (mechanically isolates) further distortion the calibration object (it is contemplated that the calibration object can be distorted but the goal is for the calibration object to be distorted to a stable shape). In a further embodiment, the calibration object can include built-in spacers on the bottom face of the calibration object so that the calibration object only contacts the mounting plate in local areas so as to minimize further distortion of the calibration object. In an alternate embodiment, a kinematic mount can be used so as to induce consistent distortion.

Next, in step 620, the procedure 600 automatically computes acquisition parameters by performing the illustrative setup procedure and analyzing measurements. By automatic, it is meant that the setup is commanded by a user in a manner that minimizes the need for particular numerical or parametric input, rendering the setup and calibration process relatively "user-friendly" and free-of the need of significant knowledge or training. Such actions as computing parameters and transforms between coordinate spaces, identifying and measuring features on calibration objects, and the like, are desirably self-contained (and invisible to the user) within the algorithms/processes of the system. As described below, the system and method allows for straightforward operation by a user through navigation of a series of prompts on associated GUI screens.

Figure 8:
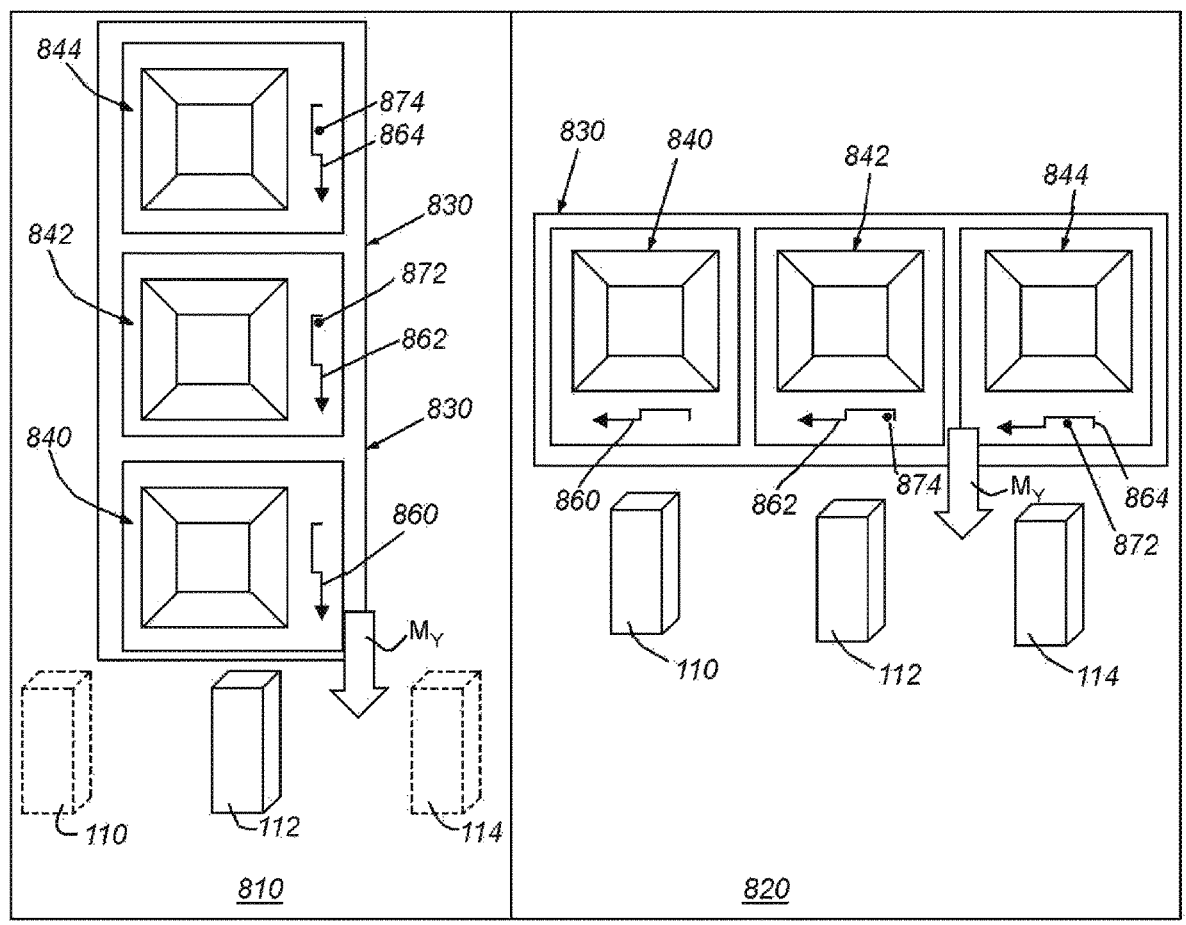
FIG. 8 is a diagram of an exemplary calibration object with a plurality of frustum-shaped subobjects showing scans by a plurality of 3D sensors along a "vertical" alignment and a "horizontal" alignment (relative to the conveyance motion direction) that respectively characterize a measurement and calibration phase of the overall calibration process according to an illustrative embodiment.

In step 630 of procedure 600, the user arranges the calibration object in a manner that allows it to be "scanned" (i.e. imaged by the one or more of the sensor(s)) (note also that the terms "scanned" and "imaged" refer to being measured) during motion of the conveyance a collection of 3D (range) images acquired from one or more displacement sensors (where all of the acquisitions involve the same conveyance) in a plurality of orientations with respect to the FOV(s) of the sensor(s). Note that the scans can alternatively output generic 3D data, and are not limited to particular range images. In an alternate embodiment, the 3D sensor calibration process can acquire and employ 3D point cloud data, instead of 3D (range) image data. With reference to FIG. 8, two separate scans 810 and 820 are shown, each performed by the calibration procedure (step 630). In the first scan 810, one displacement sensor (e.g. sensor 112) views all of the calibration subobjects 840, 842 and 844 (i.e. the entire calibration object 830). As described below, this sensor identifies and registers/aligns features in each subobject in the first scan 810. Then, in the second scan 820, each displacement sensor 110, 112, 114 images a respective calibration subobject 840, 842, 844, and uses the registered features from the first scan to perform a calibration, including the stitching together of each sensor's coordinate space into a common coordinate space. Note that each subobject 840, 842, 844 includes a respective, unique (e.g. printed, engraved, peened, etched and/or raised) fiducial 860, 862, 864. As shown, the fiducial is geometrically patterned to orient the features in each frustum in the subobject. The fiducial can also define a unique shape or include (or omit as in fiducial 860) a uniquely positioned and/or shaped indicia (e.g. dots 872, 874 in respective fiducials 862 and 864). As shown, the dots are omitted and/or positioned at various locations along the length of the fiducial to define respective subobjects. Alternatively, (e.g.) unique numbers can be used to identify each subobject, which are recognized by appropriate vision tools during the scan(s). More generally, the calibration object and subobjects can include markings, which disambiguate the otherwise symmetric and substantially identical calibration subobjects. These markings also indicate the handedness of the calibration subobjects, as well as providing a mechanism by which the system can uniquely identify each subobject. In an embodiment, a space/location can be provided on each subobject and a plurality of unique fiducial labels can be applied to each subobject on the calibration plate at the time of plate assembly (i.e. step 610 above).

Figure 9:
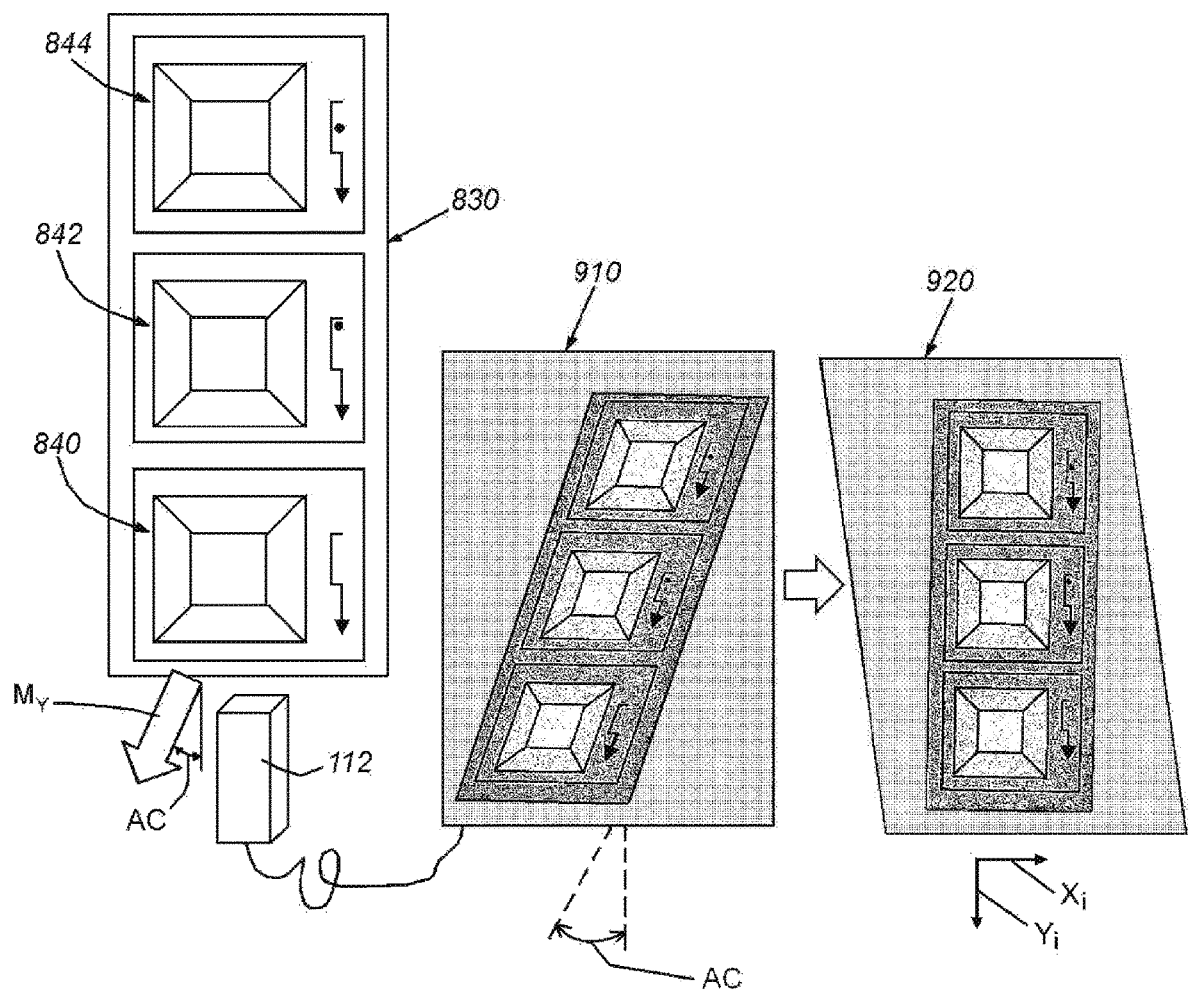
FIG. 9 is a diagram showing the scan of a skewed version of a "vertical" alignment to generate a skewed image that is subsequently rectified by the illustrative calibration process.

As part of the first scan, and as described further in FIG. 9, the calibration object 830 can be directed through the field of view of the 3D sensor (e.g.) 112 at a skew AC, as indicated by the conveyance motion arrow (vector) My in the Phys3D space. Thus, the conveyance and/or object need not be accurately aligned with the displacement sensor. In this case, the calibration process can be used to generate rectified, physically accurate measurements regardless of the conveyance direction (or magnitude). Hence the acquired image 910, with skew AC is rectified so that the object appears aligned with the sensor (i) coordinate space (i.e. Yi, Xi, Zi). In some displacement sensor systems, the user specifies the magnitude of the conveyance motion (for example, 0.010 millimeters per encoder tick) and this user-specified number may be incorrect. Notably, measurements extracted from acquired 3D images can be corrected by making use of the displacement sensor factory calibration information—by transforming the measurements according to the calibration transforms between the acquired range images and physically accurate coordinates.

It is expressly contemplated that the measurement step(s) (i.e. the first "scan" herein) can be omitted in various embodiments where the measurements of 3D features are available from a data file—for example based upon factory-provided data for the calibration object and/or a coordinate measuring machine (CMM) based specification of the object. In such cases, the measurement data is provided to the calibration step described below for use in the concurrent calibration of the 3D sensors.

In step 640 of the procedure 600 (FIG. 6), the system concurrently registers individual positions of subobject features in each sensors' 3D image. In this example, the calibration subobjects include planar features, and each group of three adjacent planes are intersected to measure 3D feature positions. In this example, each plane is measured from 3D data corresponding to a specified region of the calibration object, and by way of further example, those specified regions can be arranged so as to include data from the planar region, and exclude data not part of the planar region, and also exclude data relatively distant from the frustum. Each exemplary four-sided pyramidal (frustal) subobject, thus, yields eight 3D points. Measurement of 3D points from planes is known to those of skill in the art and various processes, modules and tools are available to perform such functions on an acquired 3D (range) image. For example, such tools are available from Cognex Corporation of Natick, Mass. In an embodiment, the measured regions used to measure the planes (which are used to measure the 3D feature positions) are symmetric on the calibration subobject. This is so that the measured 3D feature positions are unbiased with respect to the presentation of the calibration subobject.

Figure 10:
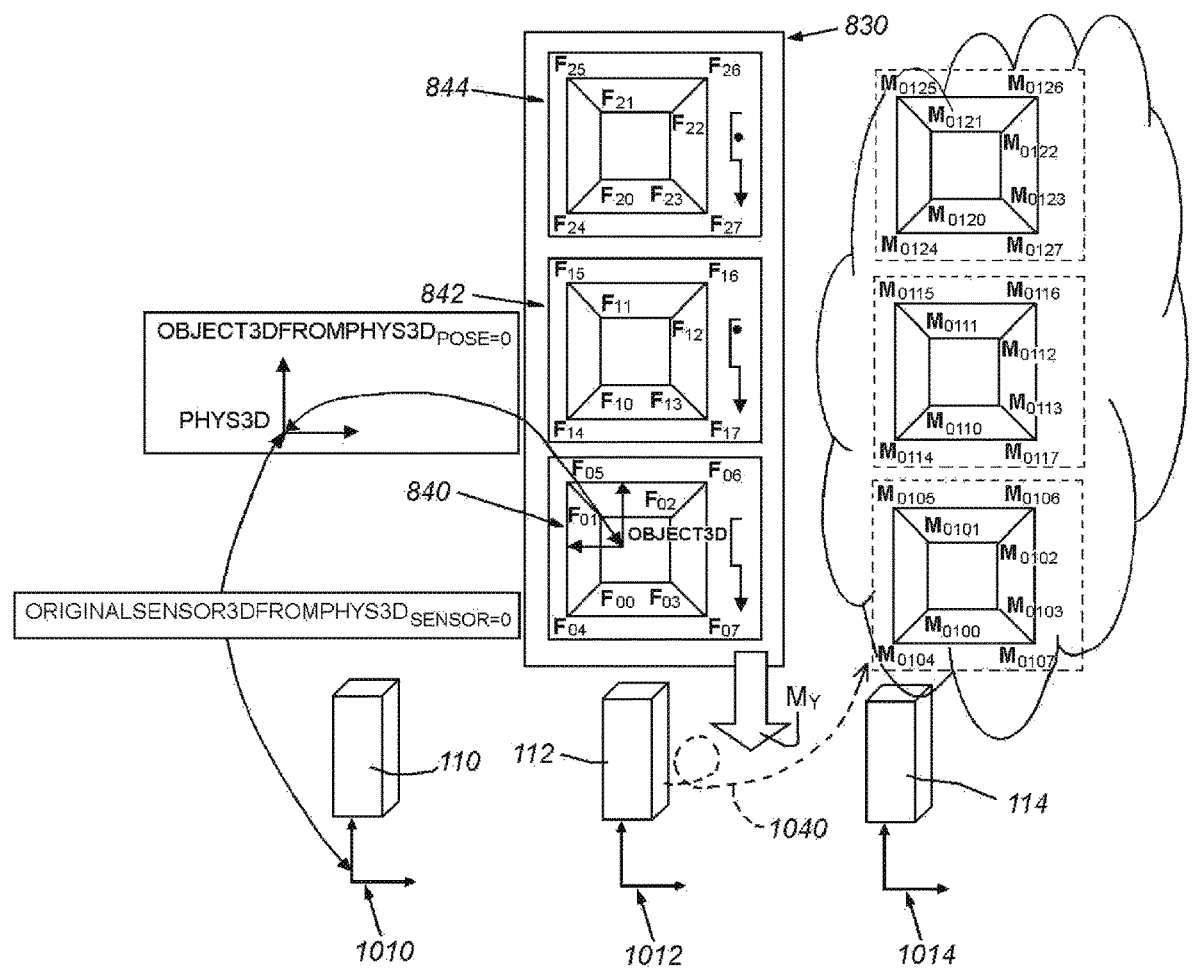
FIG. 10 is a diagram showing a physical calibration object with associated features (e.g. corners) defined by intersecting planes in a physical 3D coordinate space, transformed to a local sensors' image coordinate space according to the illustrative calibration process.

Referring to FIG. 10, The sensors 110, 112, 114 are each shown with associated, respective coordinate space Original Sensor 3DSensor=0, Original Sensor 3DSensor=1, Original Sensor 3DSensor=2 (i.e. axes 1010, 1012, 1014). The object 830 includes exemplary feature calibration object physical feature positions in Object3D space (e.g. corners on each subobject (840, 842, 844)), F00-F07 for subobject 840, F10-F17 for subobject 842 and F20-F27 for subobject 844. These are transformed (dashed arrow 1040) for each sensor as shown into the respective measured feature positions (e.g.) M0100-M0107, M0110-M0117 and M0120-M0127. In an embodiment, the feature detection tool/process checks that the same patches of the subobject are used in measuring the feature positions. The feature detection process estimates the portions of the 3D (range) image that correspond to each face of the measured frusta. Based on each face's expected region in the range image, the feature detection process counts the number of range image pels which were actually used to estimate the plane of that face. The feature detection process then computes the proportion of range image pels used to measure each face, which is equal to the number of range image pels used to estimate a plane divided by the number of range image pels in the region corresponding to that face. That proportion of the expected measurement regions which are used to estimate each plane of the frustum is compared to a proportion tolerance so that only almost completely measured features are used for the calibration computation. This occurs so that the 3D sensor calibration is invariant to the planarity/nonplanarity of each subobject. Such invariance is achieved because the same planar regions, and thereby 3D feature points, are used to measure each frustum plane during all scans of the displacement sensor calibration. In a further embodiment, the region measured for each subobject ignores the corners of the bottom feature when computing the proportion-used ratio for the goal of ignoring the corners is that these corners are the most likely to extend outside the associated 3D sensor's measurement region (and therefore cause the illustrative tolerance check to fail). It is desirable to achieve measurement consistency, which can be more effectively attained by omitting certain 3D image pels in the process.

With reference to the definitions above, the measured feature positions Mscan,sensor,subobject,feature are measured in OriginalSensor3D coordinates. These are the measured feature positions of the calibration subobjects detected by the feature detector for each of 3D sensors for each of the scans.

With reference now to step 650 of the procedure 600 (FIG. 6), the system computes the displacement sensor calibration (i.e. the "field calibration") for all sensors concurrently by estimating sensor configuration parameters. Based on the given measured feature positions Mscan, sensor,subobject,feature, the 3D sensor calibration involves estimating the following parameters:

Calibration object physical feature positions Ffrusta,feature
Object3DFromPhys3DPose=p
OriginalSensorXZ3DFromPhys3DSensor=i
MotionVectorInPhys3D
Note that, for each sensor i, OriginalSensor3DFromPhys3DSensor=i is computed by combining the x and z axes of OriginalSensorXZ3DFromPhys3DSensor=i with the y axis of MotionVectorInPhys3D. It follows:

$$Phys3DFromOriginalSensorXZ3D_{Sensor=i} = \begin{bmatrix} a & b & c & | & tx \\ d & e & f & | & ty \\ g & h & i & | & tz \end{bmatrix}$$

-continued $$Phys3DFromOriginalSensorXZ3D_{Sensor=i} * (x, y, z) =$$
$$(a^*x + b^*y + c^*z + tx, d^*x + e^*y + f^*z + ty, g^*x + h^*y + i^*z + tz)$$

$$MotionDirectionInPhys3D = (mx, my, mz)$$

$$Phys3DFromOriginalSensor3D_{Sensor=i} = \begin{bmatrix} a & mx & c & | & tx \\ d & my & f & | & ty \\ g & mz & i & | & tz \end{bmatrix}$$

$$Phys3DFromOriginalSensor3D_{Sensor=i} * (x, y, z) =$$
$$(a^*x + mx^*y + c^*z + tx, d^*x + my^*y + f^*z + ty, g^*x + mz^*y + i^*z + tz)$$

$$OriginalSensorXZ3DFromPhys3D_{Sensor=1} =$$
$$Phys3DFromOriginalSensorXZ3D^{-1}_{Sensor=i}$$

$$OriginalSensor3DFromPhys3D_{Sensor=1} =$$
$$Phys3DFromOriginalSensor3D^{-1}_{Sensor=i}$$

Note, in some embodiments, for selected sensors, where the vector cross product of the selected sensor's X and Z coordinate axes has a negative dot product with the measured y-coordinate motion direction, the negative of the MotionDirectionInPhys3D is treated as they axis for that some sensor's OriginalSensorXZ3D. The calibration object physical feature positions $F_{frusta,feature}$ are characterized by 3D points (x,y,z) for each feature. All but the first three feature positions are characterized by three numbers. Note that the first three feature positions herein illustratively define a canonical coordinate space, and, as such, their values are constrained. The feature points define a canonical coordinate space so that the Phys3D coordinate space constrains the feature pose; otherwise, if the feature positions were unconstrained, then the Phys3D coordinate space would be redundant with respect to the object coordinate space because the Phys3D coordinate space could be traded off against the feature positions. Illustratively, the first three calibration feature vertex positions are constrained (so that there are no redundant degrees of freedom). For example, the first vertex position is (0,0,0). The second vertex position is (x1,0,0) and the third vertex position is (x2,y2,0). In this manner, the calibration feature object illustratively defines a reference plane for further calibration computation steps.

Except for the first pose, p=0, the object poses Object3DFromPhys3D$_{Pose=p}$ each have six degrees of freedom (since they characterize 3D rigid transforms). Each object pose Object3DFromPhys3D$_{Pose=p}$ is characterized by three-value quaternion, and an identifier specifying which quaternion value is 1 (or −1), and a 3D vector characterizing the 3D translation. The first pose is constrained to be the identity transform so that the Phys3D coordinate space is not redundant (where, illustratively, gradient descent solvers have difficulty when there are redundant degrees of freedom). Three value quaternions characterize three of the four quaternion values where the characterization also includes an identifier which says which quaternion is fixed (to either+1 or −1) (Quaternions are classically characterized by four homogeneous values where $p^2+q^2+r^2+s^2==1$, and more generally, unit quaternions are used to represent 3D rotations, as is well known in the art==1). The use of three quaternion values and an identifier to characterize the 3D rotation is known to those of skills. By way of useful background information refer to U.S. Pat. No. 8,111,904, entitled METHODS AND APPARATUS FOR PRACTICAL 3D VISION SYSTEM, by Aaron S. Wallack, et al., the teachings of which are incorporated herein by reference.

The sensor poses OriginalSensorXZ3DFromPhys3D$_{Sensor=I}$ are each characterized by eight (8) values, including an x scale and a y scale, as well as a rigid transform. In an embodiment, each 3D sensor pose OriginalSensorXZ3DFromPhys3DSensor is characterized by a 3D vector for the x axis and a 2D vector for the z axis (where one of the coefficients is derived from the x axis and the two components of the z axis to arrive at a dot-product of 0 and an identifier saying which value the z axis is missing), and the y axis is computed as the unit length cross product of the z axis and the x axis, and the translation is a 3D vector characterized by three numbers. In another embodiment, each 3D sensor pose OriginalSensorXZ3DFromPhys3DSensor is characterized by a three-value quaternion, an identifier specifying which quaternion value is 1 (or −1), a 3D vector characterizing the 3D translation, and two additional numbers (one number for x scale and one number for z scale). In addition, the 3D vector MotionVectorInPhys3D has three independent degrees of freedom, and is characterized by three numbers.

Figure 11:
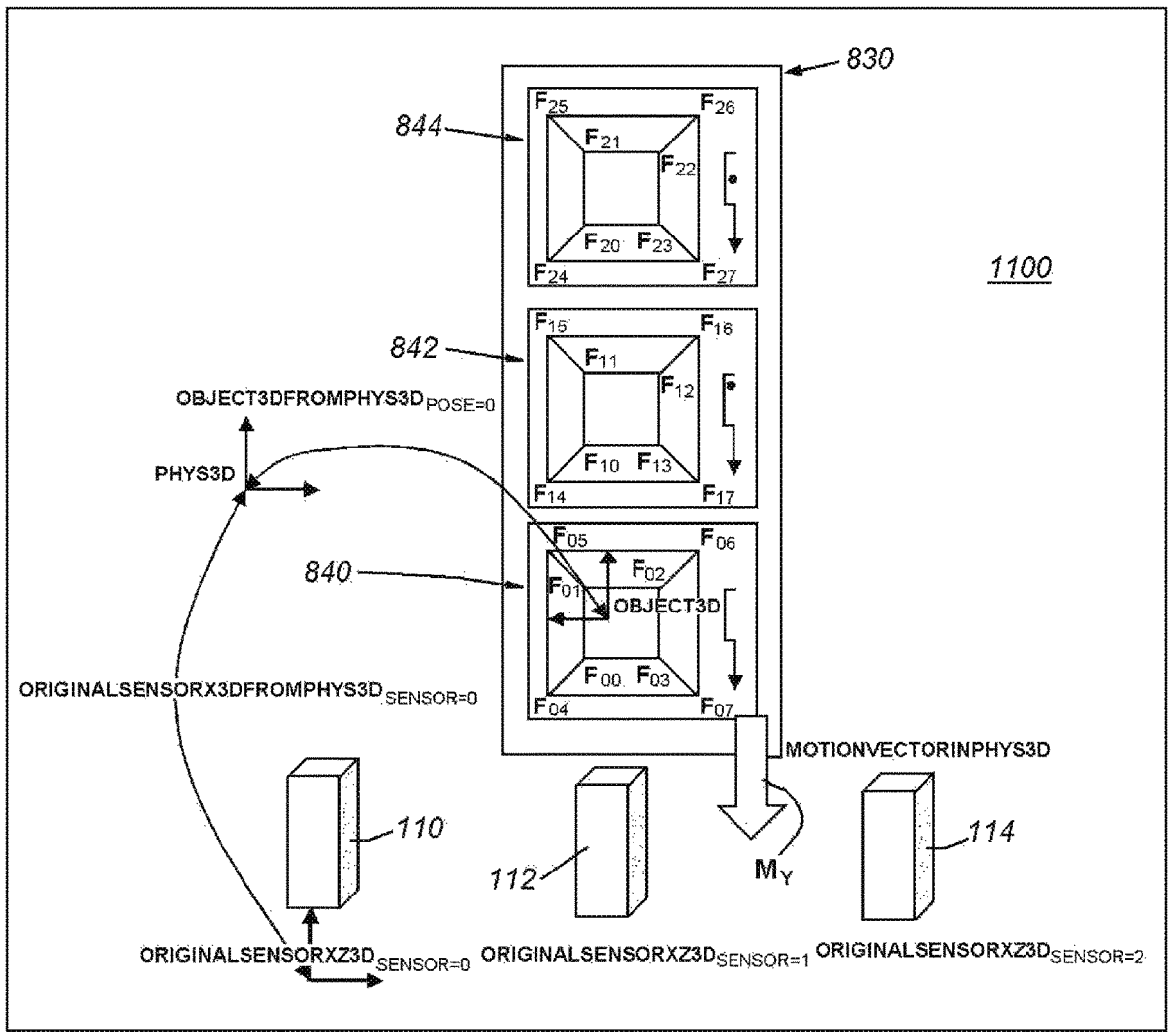
FIG. 11 is a diagram of the calibration object of FIG. 10 showing the associated features and transforms therein.

FIG. 11 is a further diagram 1100 showing the parameters associated with a physical calibration object 830 composed of at least three sub-objects 840, 842, 844.

In an embodiment, the 3D sensor calibration parameters can be estimated via least squares analysis. In an alternate embodiment, the 3D sensor calibration parameters can be estimated via sum of absolute differences. In another embodiment, the 3D sensor calibration parameters are estimated via minimizing the maximum error. Other numerical approximation techniques for estimating calibration parameters should be clear to those of skill. For an embodiment that estimates the calibration using least squares analysis for each measured feature position, the system computes its estimated feature position based on the parameters and then computes the difference between the estimated feature position and the corresponding measured feature position. The system then computes the square of the length of that difference (e.g. by dot-producting that difference vector with itself). All squared differences are then summed to compute a sum-of-squared differences (including contributions from all measured feature positions). This approach assumes that the parameters which induce the minimum sum-of-squares difference is the optimal 3D sensor calibration. Least squares analysis assumes that there is one particular set of parameters which induces the minimum squared error. For an embodiment employing the sum of absolute differences, the total error is computed as the sum of the absolute differences, and the parameters which induce the minimum sum of absolute differences provides an optimal 3D sensor calibration. For an embodiment employing the minimized maximum error, the parameters which induce the minimum maximum discrepancy provide optimal 3D sensor calibration.

Least squares analysis characterizes the sum squared error by an error function of the parameters given the measured feature points i.e., E( . . . |M)=E(Calibration object physical feature positions F$_{frusta,feature}$ [0 . . . X1], Object3DFromPhys3D$_{Pose=p}$,[0 . . . X2], OriginalSensorXZ3DFromPhys3D$_{Sensor=I}$ [0 . . . X3], MotionVectorInPhys3D|M$_{scan,sensor,subobject,feature}$) (the nomenclature [0 . . . num X] signifies that the error function includes multiple instances of each set of variables—one for each of the unknowns and the nomenclature "|M" signifies that the error function is a function of the measured features, M, but those measurements are not variables). Iterative methods are used to find the parameters which minimize E( . . . |M). The parameters which induce the minimum error characterizes the 3D sensor calibration.

Figure 12:
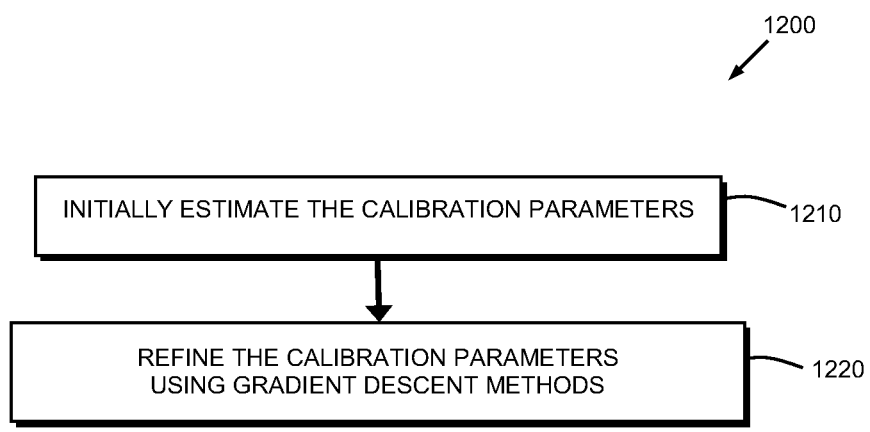
FIG. 12 is a flow diagram showing an illustrative procedure for refining calibration parameters using exemplary gradient descent techniques/methods.

FIG. 12 described a basic procedure 1200 for refining calibration parameters using gradient descent techniques. In step 1210, the system initially estimates the calibration parameters. The parameters are then refined in step 1220 using appropriate gradient descent techniques as described herein. For robustness, an illustrative embodiment includes refining the parameters using numerically computed derivatives (such as Levenberg-Marquardt gradient descent). A further embodiment can include performing the refinement using different step sizes (for the numerically computed derivative) to increase the probability of arriving at the global solution. Another embodiment can include running the refinement more than once, in an iterative manner, and for each run, employing a different set of step sizes, and then comparing the errors E( . . . |M) induced by the estimated parameters, and selecting the parameters which induced the lowest error E( . . . |M).

In various embodiments, the user specifies (in an embodiment, using the GUI, in other embodiments, via a stored file, and in further embodiments, via information encoded in the scene which is extracted from 3D data in a scan) the calibration object feature positions and these values are used, but not estimated. In these embodiments, the error function depends on the measured feature positions and the specified feature positions, but those measurements are not variables . . . , E( . . . |M,F)=E (Object3DFromPhys3D$_{Pose=p}$,[0 . . . X1], OriginalSensorXZ3DFromPhys3D$_{Sensor=I}$[0 . . . X2], MotionVectorInPhys3D|M$_{scan,sensor,subobject,feature}$, F$_{frusta,feature}$)

The estimated feature position can be computed in accordance with the following illustrative steps. Given a 3D feature position F$_{frusta,feature}$ (specified in Object3D coordinates) corresponding to scan pose p and sensor i, the first step is to compute that feature position in Phys3D coordinates by mapping it using the inverse of the Object3DFromPhys3D$_{Pose=p}$ transform to compute FPhys3D$_{frusta,feature}$:

$$FPhys3D_{frusta,feature}=(Object3DFromPhys3D_{Pose=p})-1*F_{frusta,feature}.$$

In the next step, the system computes the intersection plane in Phys3D, which involves mapping the sensorXZ's origin to Phys3D coordinates and mapping its y-axis (normal to its plane) to Phys3D coordinates.

$$SensorXZPhys3D_{origin}= (OriginalSensorXZ3DFromPhys3D_{Sensor=I})-1* (0,0,0)$$

$$SensorXZPhys3D_{yAxis}= (OriginalSensorXZ3DFromPhys3D_{Sensor=I})-1* (0,1,0)-SensorXZPhys3D_{origin}$$

The y-coordinate of the intersection corresponds to how many instances of motionVectorPhys3D must be added to the feature position in order to intersect the sensor plane. A 3D point traveling along direction motionVectorPhys3D changes its dot product with SensorXZPhys3D$_{yAxis}$ at a rate of (motionVectorPhys3D dot (SensorXZPhys3D$_{yAxis}$)). Originally the point FPhys3D$_{frusta,feature}$ differed in dot product from the plane SensorXZPhys3D$_{yAxis}$ by a value of (FPhys3D$_{frusta,feature}$−SensorXZPhys3D$_{origin}$) dot (SensorXZPhys3D$_{yAxis}$)), therefore the 3D moves by the following number of instances of motionVectorPhys3D to intersect the plane:

numInstances=(($F$Phys3D$_{frusta,feature}$−
SensorXZPhys3D$_{origin}$)dot
(SensorXZPhys3D$_{yAxis}$)))/motionVectorPhys3D
dot(SensorXZPhys3D$_{yAxis}$))

After those instances, the feature position intersects the plane at the intersectionPoint, intersectionPoint=$F$Phys3D$_{frusta,feature}$+
numInstances*motionVectorPhys3D in Phys3D
coordinates.

Figure 13:
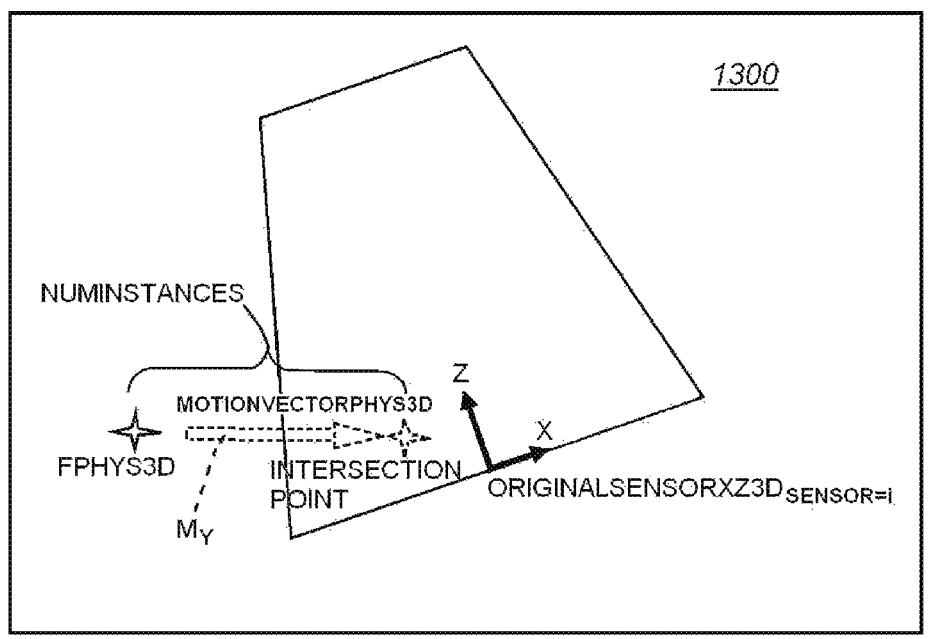
FIG. 13 is a diagram showing the expected measured feature position according to the illustrative calibration process.

The intersection point in OriginalSensor3D coordinates can be computed by mapping through the transform OriginalSensor3DFromPhys3D$_{Sensor=I}$.
Note that this mapping is linear for a given set of parameters, and it follows that the mapping OriginalSensor3DFromPhys3D$_{Sensor=I}$ is a linear transform and computable from OriginalSensorXZ3DFromPhys3D$_{Sensor=I}$ and MotionVectorPhys3D. The multiplicative factor 1/motionVectorPhys3D dot (SensorXZPhys3D$_{yAxis}$) is constant for a given parameter set. FIG. 13 is a diagram 1300 of the measured feature position based on numInstances described above.

The overall error function, E( . . . |M) characterizes the sum-square of the discrepancies between the measured feature positions and the estimated feature positions. Each measured feature position ($M_{scan,sensor,subobject,feature}$) is measured in its respective sensor's OriginalSensor3D coordinates. Each calibration object feature position is originally specified in Object3D coordinates. In order to compare each corresponding pair of positions, they must first be transformed into consistent coordinates. For the embodiment where the errors are measured in each sensor's OriginalSensor3D coordinates, the feature positions (which are originally specified in Object3D coordinates) are transformed into OriginalSensor3D coordinates by mapping through the Phys3DFromObject3D$_{Pose=p}$ transform, which is the inverse of the Object3DFromPhys3D$_{Pose=p}$ transform and then mapping through the transform OriginalSensor3DFromPhys3D$_{Sensor=I}$.

$E( \ldots |M)=E_{originalSensor3D}( \ldots |M)=$Sum|
($M_{scan,sensor,subobject,feature}$−
(OriginalSensor3DFromPhys3D$_{Sensor=I}$*
(Object3DFromPhys3D$_{Pose=p}$)$^{-1}$*$F_{frusta,feature}$)|$^2$ In an embodiment that measures the error in each sensor's OriginalSensor3D coordinates, the advantage of measuring the error in each sensor's OriginalSensor3D coordinates is that coordinates are not scaled because they are tied to measured feature positions. The disadvantage of measuring the error in each sensor's OriginalSensor3D coordinates is that the coordinates are not necessarily physically accurate or orthonormal, whereby the measurements in OriginalSensor3D coordinates may be biased by the presentation poses of the calibration object; for each sensor's OriginalSensor3D coordinates, the y coordinates correspond to the magnitude of the conveyance (the motionVectorInPhys3D) whereas the x coordinate and z coordinate were defined by the factory calibration, and the scale of the conveyance magnitude is one of the things that displacement sensor field calibration is estimating.

In another embodiment of the displacement sensor field calibration procedure, the displacement sensor field calibration computation is repeated after estimating the motionVectorInPhys3D and compensated for. Thus, the non-orthogonality of the OriginalSensor3D coordinates is reduced so that the bias due to computing the error in a non-orthonormal coordinate space is reduced. Alternatively, in an embodiment in which the errors are measured in each sensor's Sensor3D coordinates, the measured feature positions are transformed into each sensor's Sensor3D coordinates by mapping them through the coordinate change transform Phys3DFromOriginalSensor3D$_{Sensor=I}$ which is the inverse of OriginalSensor3DFromPhys3D$_{Sensor=I}$. The procedure then maps through the transform Sensor3DFromPhys3D$_{Sensor=i}$. The feature positions (which are originally specified in Object3D coordinates) are transformed into Sensor3D coordinates by mapping through the Phys3DFromObject3D$_{Pose=p}$ transform, which is the inverse of the Object3DFromPhys3D$_{Pose=p}$ transform. The procedure then maps through the transform Sensor3DFromPhys3D$_{Sensor=I}$.

$E( \ldots |M)=E_{Sensor3D}( \ldots |M)=$Sum|
((Sensor3DFromPhys3D$_{Sensor=I}$*
(OriginalSensor3DFromPhys
3D$_{Sensor=I}$)$^{-1}$*$M_{scan,sensor,subobject,feature}$)−
(Sensor3DFromPhys3D$_{Sensor=I}$*
(Object3DFromPhys3D$_{Pose=p}$)$^{-1}$*$F_{frusta,feature}$)|$^2$ In an embodiment in which the measured error is measured in Phys3D coordinates, the measured feature positions are transformed into Phys3D coordinates by mapping them through the coordinate change transform Phys3DFromOriginalSensor3D$_{Sensor=I}$, which is the inverse of OriginalSensor3DFromPhys3D$_{Sensor=I}$. The feature positions (which are originally specified in Object3D coordinates) are transformed into Phys3D coordinates by mapping through the Phys3DFromObject3D$_{Pose=p}$transform, which is the inverse of the Object3DFromPhys3D$_{Pose=p}$ transform.

$( \ldots |M)=E_{Phys3D}( \ldots |M)=$Sum|
(((OriginalSensor3DFromPhys
3D$_{Sensor=I}$)$^{-1}$*$M_{scan,sensor,subobject,feature}$)−
((Object3DFromPhys3D$_{Pose=p}$)$^{-1}$*$F_{frusta,feature}$)|$^2$ Note that the embodiment measuring the error in each sensor's Sensor3D coordinates and the embodiment measuring the error in Phys3D coordinates can be the same because distances are preserved under 3D rigid transforms and Sensor3D and Phys3D are related by a 3D rigid transform.

The following is a further description of the process of estimating initial parameters in view of the above-described error function E( . . . |M). The system and method illustratively employs gradient descent refinement techniques to compute the parameters which minimize E( . . . |M). Gradient descent techniques require an initial set of parameters (to initiate the process). Since the above-described error function can exhibit local minima, it is preferable that the initial parameters be nearby the optimal parameter estimates (because, then, the gradient descent method is more likely to converge on the true minima rather than converge to a local minima).

Illustratively, 3D sensor calibration involves estimating the initial values of the following parameters:
Calibration object physical feature positions;
Object3DFromPhys3D$_{Pose=p}$;
OriginalSensorXZ3DFromPhys3D$_{Sensor=i}$; and
MotionVectorInPhys3D.

Figure 14:
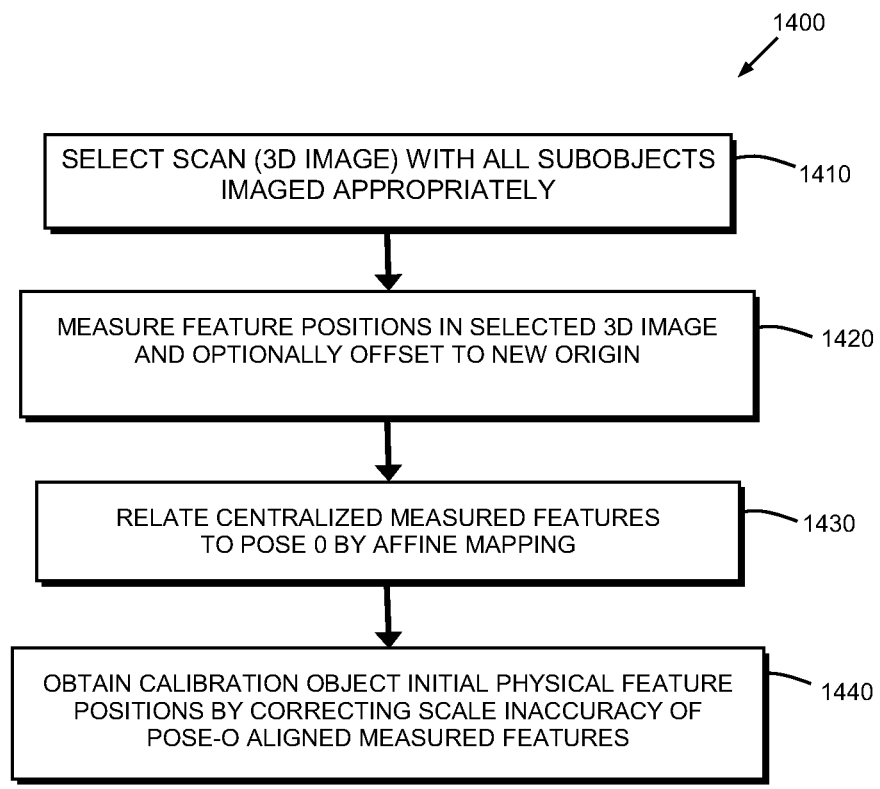
FIG. 14 is a flow diagram showing an illustrative procedure for estimating initial physical feature positions from measured feature positions of the calibration object.

In an embodiment, coarse estimation illustratively mandates that at least one sensor measure of the subobject features in one (i.e. initial) scan. In an alternate embodiment, coarse estimation illustratively mandates that the subobject features should be determinable by combining measurements from multiple scans. In a further embodiment, when multiple subobjects are measured by the same sensor within one scan, each pair of relative positions are computed (up to a linear transform due to the sensing modality), and one set of pairs of relative positions are boot-strapped to induce an estimate of all of the subobject feature positions. A coarse estimation procedure 1400 is shown in further detail with reference to FIG. 14, in which initial physical feature positions are estimated from measured feature positions of the calibration object. First, in step 1410 a scan (with corresponding pose p), or portion of a scan, is selected which includes a 3D (range) image (from sensor i) capturing all subobjects of the calibration object. This can occur by orienting the object "vertically" along the scan direction MotionVectorInPhys3D (My). Next, in step 1420, the feature positions (in OriginalSensor3D$_{Sensor=i}$) from this selected 3D image are measured, and then (optionally) the measured features are offset to determine the new coordinate origin at their average feature position. Then, in step 1430, the procedure 1400 relates the centralized measured features to the pose 0 (used for determining Phys3D) through the affine mapping of the feature positions of the first seen subobject at pose 0. For all of the following, pose 0 characterizes the first scanned pose. If no features are measured by any sensor in that pose, then the scan with minimum index with any measured features is used as pose 0. Next, in step 1440, the procedure obtains calibration object initial physical feature positions by correcting scale-inaccuracy of the pose 0-aligned measured features through an affine transform that is obtained by mapping from the first subobject's measured features to its model features.

Figure 15:
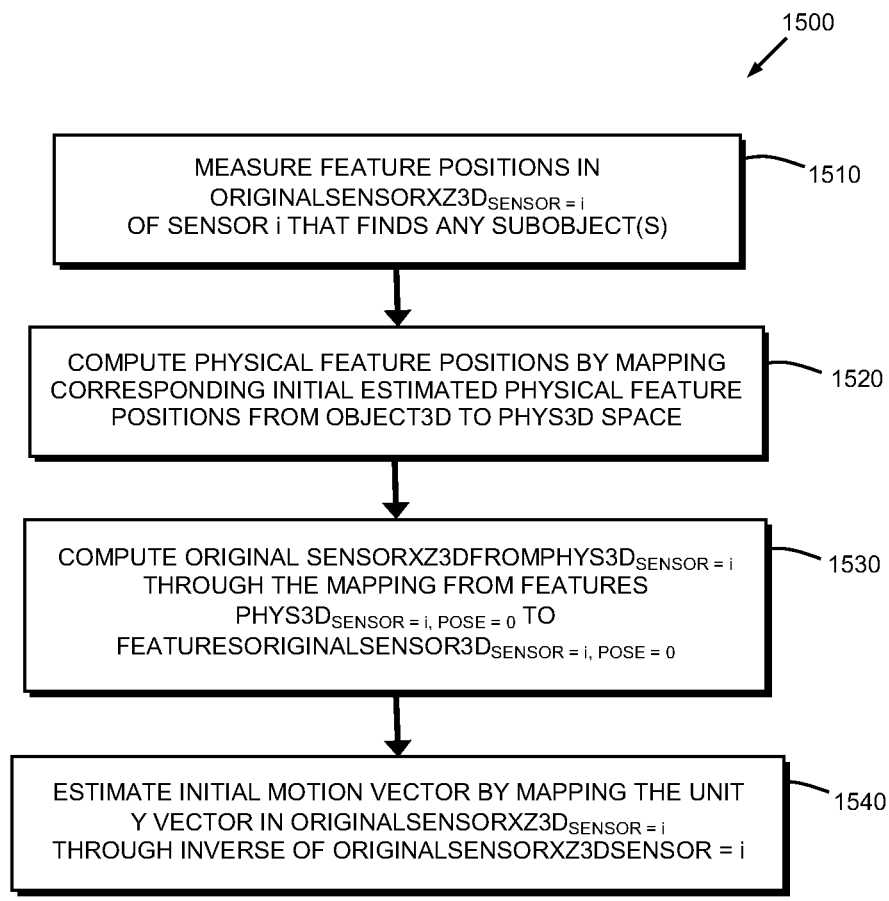
FIG. 15 is a flow diagram showing an illustrative procedure for estimating an initial motion vector for sensor i finding/recognizing any calibration subobject(s) at pose 0.

In an embodiment, the coarse parameter values corresponding to OriginalSensorXZ3D transforms are computed directly, and in this embodiment, transforms corresponding to OriginalSensorXZ3D are combined with the motion vector estimate to induce OriginalSensor3D transforms, where the derived OriginalSensor3D are used for computations. FIG. 15 details a procedure 1500 for estimating the initial motion vector for sensor i finding any subobject(s) at pose 0. In step 1510, the procedure 1500 measures feature positions (FeaturesOriginalSensor3D$_{Sensor=i, Pose=0}$) in OriginalSensorXZ3D$_{Sensor=i}$ of sensor i that sufficiently finds/recognizes any subobject(s) of the calibration object at pose 0. In step 1520, the procedure 1500 then computes physical feature positions (FeaturesPhys3D$_{Sensor=i, Pose=0}$) by mapping corresponding initial estimated physical feature positions from Object3D to Phys3D space (using the user provided Phys3DFromObject3D at pose 0) for the subobject(s) seen by sensor i at pose 0. Next, in step 1530, the procedure 1500 computes OriginalSensorXZ3DFromPhys3D$_{Sensor=i}$ through the mapping from FeaturesPhys3D$_{Sensor=i, Pose=0}$ to FeaturesOriginalSensor3D$_{Sensor=i, Pose=0}$. Then, the initial motion vector is computed in step 1540 by mapping the unit Y vector [0, 1, 0] in OriginalSensorXZ3D$_{Sensor=i}$ through the inverse of OriginalSensorXZ3DFromPhys3D$_{Sensor=i}$ of sensor i.

Figure 16:
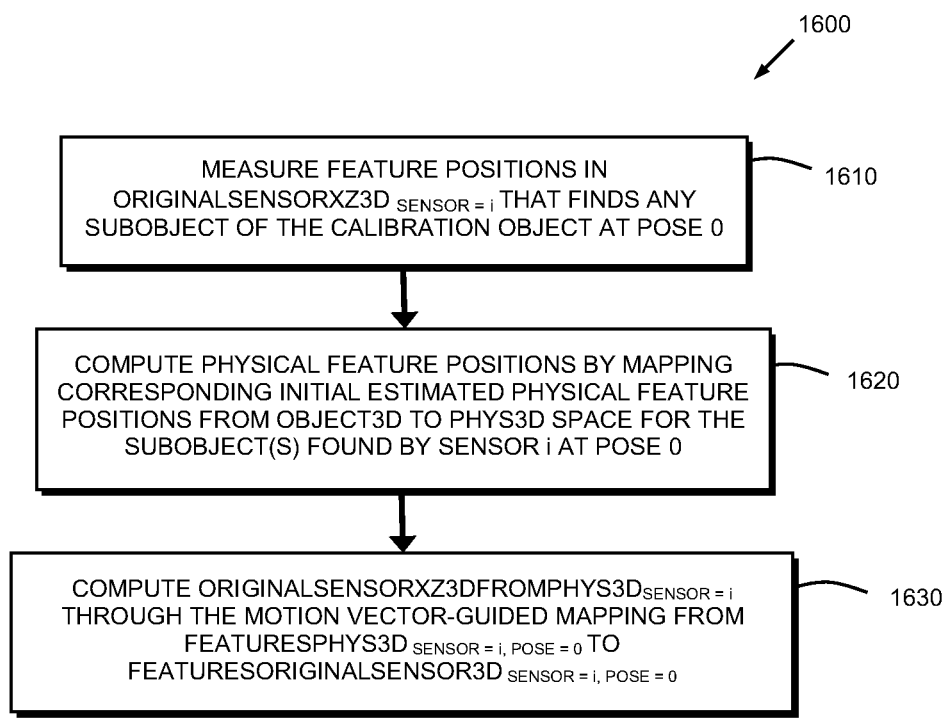
FIG. 16 is a flow diagram showing an illustrative procedure for estimating the initial transform OriginalSensorXZ3DFromPhys3DSensor=i for exemplary sensor i when finding/recognizing any calibration subobject(s) at pose 0.
Figure 17:
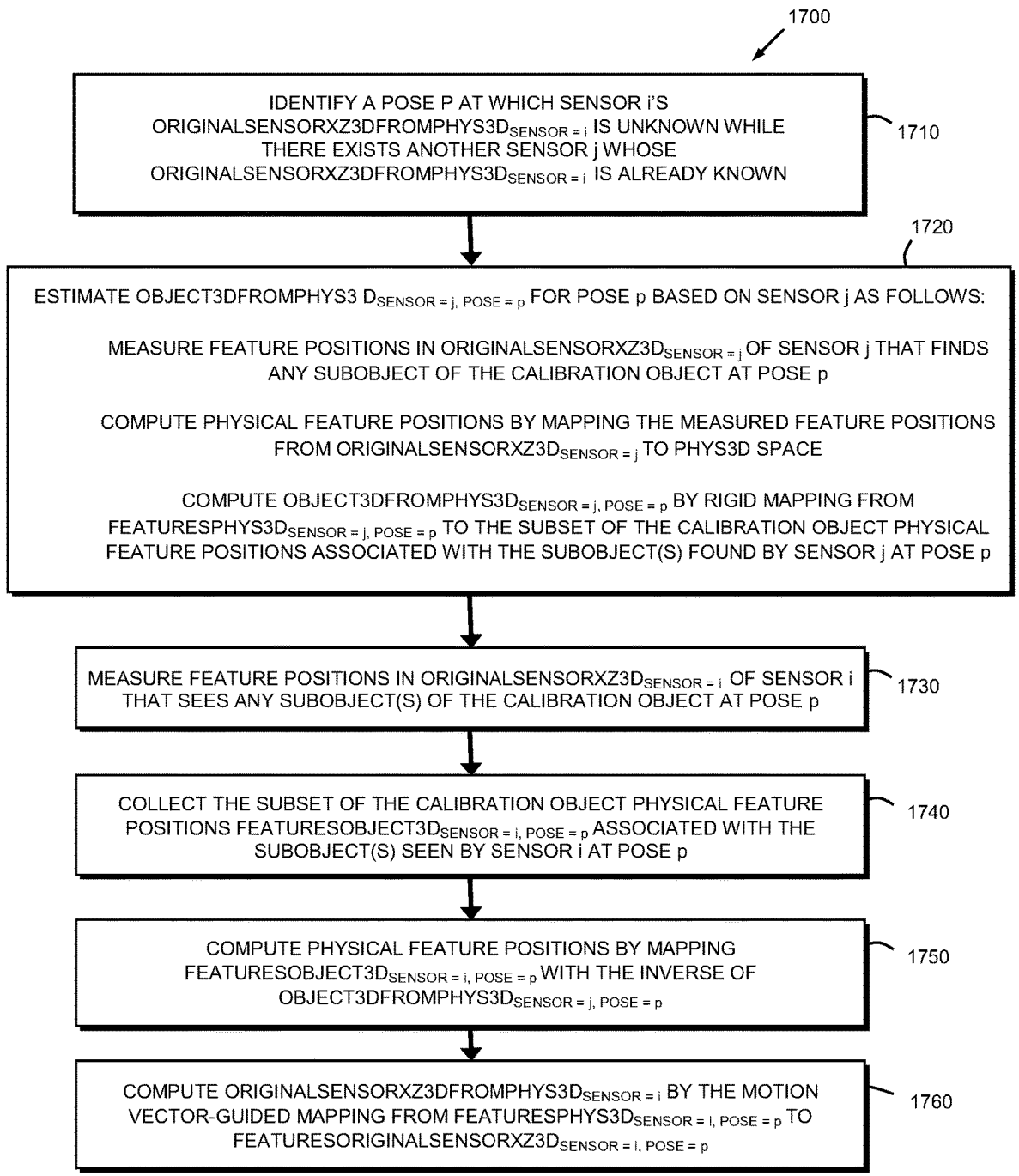
FIG. 17 is a flow diagram showing an illustrative procedure for estimating the initial transform for OriginalSensorXZ3DFromPhys3DSensor=i for exemplary sensor i when finding/recognizing no calibration subobject at pose 0.

FIG. 16 shows a procedure 1600 for estimating initial OriginalSensorXZ3DFromPhys3D$_{Sensor=i}$ for sensor i assuming that the sensor successfully finds/recognizes any (one or more) subobject(s) at pose 0. In step 1610, the procedure 1600 measures feature positions (FeaturesOriginalSensor3D$_{Sensor=i, Pose=0}$) in OriginalSensorXZ3D$_{Sensor=i}$ of sensor i that finds/recognizes any subobject(s) of the calibration object at pose 0. In step 1620, the procedure then computes the physical feature positions (FeaturesPhys3D$_{Sensor=i, Pose=0}$) by mapping corresponding initial estimated physical feature positions from Object3D to Phys3D space (using the user provided Phys3DFromObject3D at pose 0) for the subobject(s) found/recognized by sensor i at pose 0. Then, in step 1630, the procedure 1600 computes OriginalSensorXZ3DFromPhys3D$_{Sensor=i}$ through the motion vector-guided mapping from FeaturesPhys3D$_{Sensor=i, Pose=0}$ to FeaturesOriginalSensor3D$_{Sensor=i, Pose=0}$. Conversely, in FIG. 17, a procedure 1700 estimates the initial OriginalSensorXZ3DFromPhys3DSensor=i for sensor i where no subobject is found or recognized at pose 0. In step 1710, the procedure 1700 identifies a pose p (p≠0), at which sensor is OriginalSensorXZ3DFromPhys3D$_{Sensor=i}$ is unknown while there exists another sensor (j) whose OriginalSensorXZ3DFromPhys3D$_{Sensor=j}$ is already known, either due to initial estimation at pose 0 or from an estimation at an earlier non-zero pose. In step 1720, the procedure 1700 then estimates Object3DFromPhys3D$_{Sensor=j, Pose=p}$ for pose p based on sensor j. This step includes: (a) measuring feature positions (FeaturesOriginalSensor3D$_{Sensor=j, Pose=p}$) in OriginalSensorXZ3D$_{Sensor=j}$ of sensor j that finds/recognizes any subobject of the calibration object at pose p; (b) computing physical feature positions (FeaturesPhys3D$_{Sensor=j, Pose=p}$) by mapping the measured feature positions from OriginalSensorXZ3D$_{Sensor=j}$ to Phys3D space using sensor j's inverse of OriginalSensorXZ3DFromPhys3D$_{Sensor=j}$; and computing Object3DFromPhys3D$_{Sensor=j, Pose=p}$ by rigid mapping from FeaturesPhys3D$_{Sensor=j, Pose=p}$ to the subset of the calibration object physical feature positions associated with the subobject(s) seen by sensor j at pose p. In step 1730, the procedure 1700 then measures feature positions (FeaturesOriginalSensor3D$_{Sensor=i, Pose=p}$) in OriginalSensorXZ3D$_{Sensor=i}$ of sensor i that finds/recognizes any subobject(s) of the calibration object at pose p. The procedure 1700, in step 1740 then collects the subset of the calibration object physical feature positions (in Object3D), FeaturesObject3D$_{Sensor=i, Pose=p}$, associated with the subobject(s) found/recognized by sensor i at pose p. In step 1750, the procedure 1700 computes physical feature positions (FeaturesPhys3D$_{Sensor=i, Pose=p}$) by mapping FeaturesObject3D$_{Sensor=i, Pose=p}$ with the inverse of Object3DFromPhys3D$_{Sensor=j}$, Pose=p. Then, in step 1760 OriginalSensorXZ3DFromPhys3D$_{Sensor=i}$ is computed by the motion vector-guided mapping from FeaturesPhys3D$_{Sensor=i, Pose=p}$ to FeaturesOriginalSensor3D$_{Sensor=i, Pose=p}$.

Figure 18:
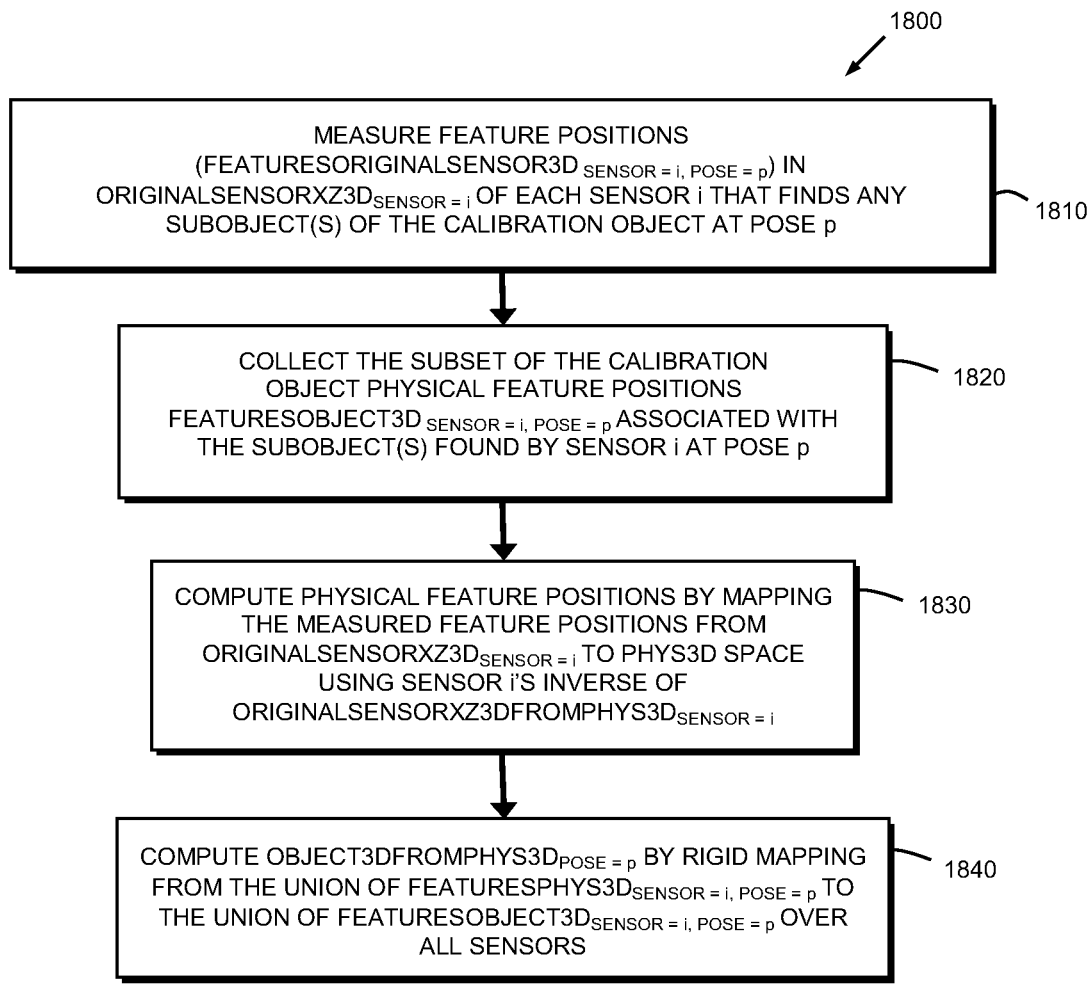
FIG. 18 is a flow diagram showing an illustrative procedure for estimating the transform for estimate initial Object3DFromPhys3DPose=p for pose p.

FIG. 18 details a procedure 1800 for estimating initial Object3DFromPhys3D$_{Pose=p}$ for pose p. In step 1810, the procedure 1810 measures feature positions (FeaturesOriginalSensor3D$_{Sensor=i, Pose=p}$) in OriginalSensorXZ3D$_{Sensor=i}$ of each sensor (sensor i) that finds/recognizes any subobject(s) of the calibration object at pose p. Then, in step 1820, the procedure 1800 collects the subset of the calibration object physical feature positions (in Object3D), FeaturesObject3D$_{Sensor=i, Pose=p}$, associated with the subobject(s) seen by sensor i at pose p. Next, the procedure, in step 1830, computes physical feature positions (FeaturesPhys3D$_{Sensor=i, Pose=p}$) by mapping the measured feature positions from OriginalSensorXZ3D$_{Sensor=i}$ to Phys3D space using sensor i's inverse of OriginalSensorXZ3DFromPhys3D$_{Sensor=i}$. Then, Object3DFromPhys3D$_{Pose=p}$ is computed in step 1840 by rigid mapping from the union of FeaturesPhys3D$_{Sensor=i, Pose=p}$ to the union of FeaturesObject3D$_{Sensor=i, Pose=p}$ over all sensors.

Figure 15A:
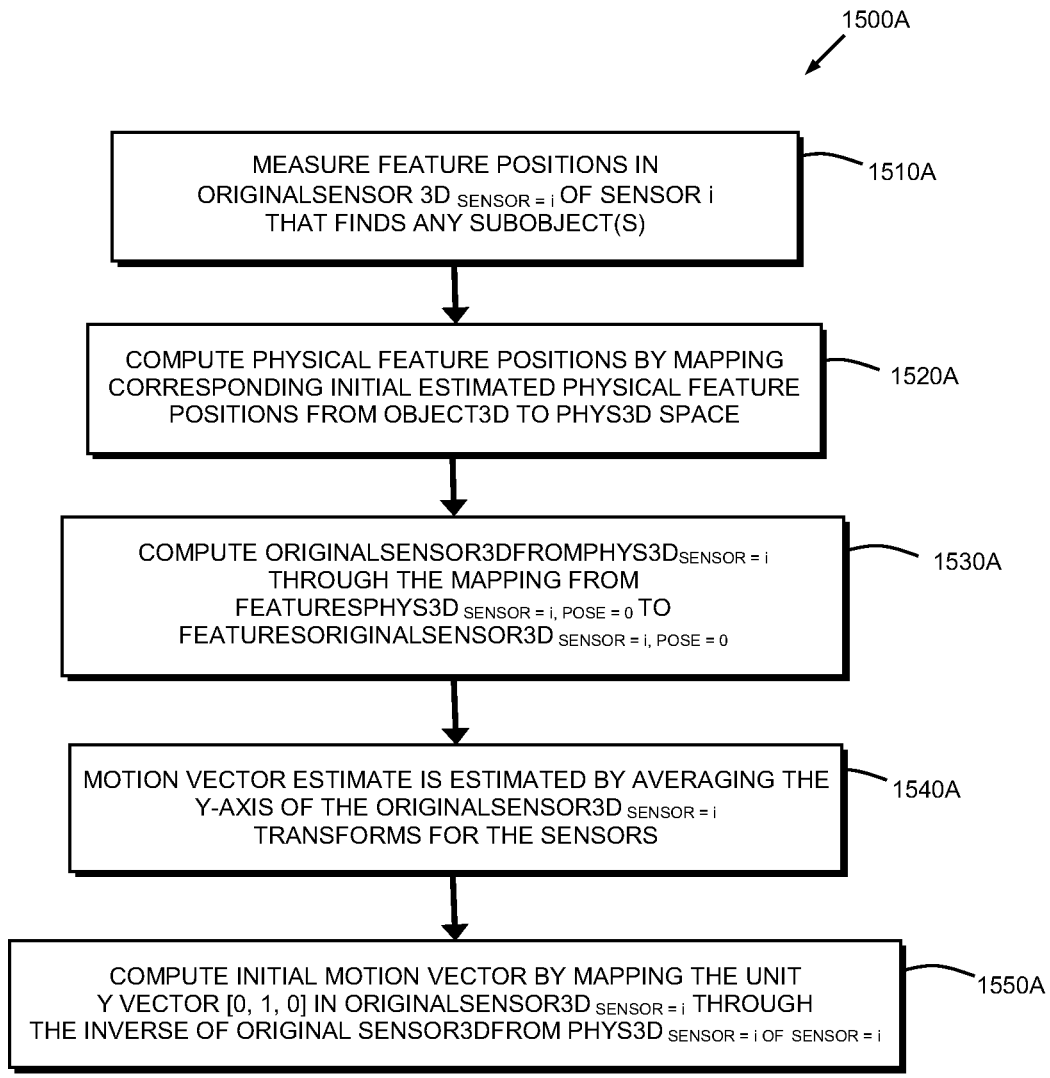
FIG. 15A is a flow diagram showing an alternate embodiment of an illustrative procedure for estimating an initial motion vector for sensor i finding/recognizing any calibration subobject(s) at pose 0.

In an alternate embodiment, the coarse parameter values corresponding to OriginalSensorXZ3D transforms are computed by estimating the OriginalSensor3D transforms, and then estimating the OriginalSensorXZ3D transforms from the OriginalSensor3D transforms. In various embodiments, the OriginalSensorXZ3D transforms are computed from these OriginalSensor3D transforms by replacing the y-axis of this transform with the cross-product of the x-axis and the z-axis. In further embodiments, the motion vector estimate is estimated by averaging the y-axes of the OriginalSensor3D transforms for the sensors. FIG. 15A details a procedure 1500A for estimating the initial motion vector for sensor i finding any subobject(s) at pose 0. In step 1510A, the procedure 1500A measures feature positions (FeaturesOriginalSensor3D$_{Sensor=i, Pose=0}$) in OriginalSensor3D$_{Sensor=i}$ of sensor i that sufficiently finds/recognizes any subobject(s) of the calibration object at pose 0. In step 1520A, the procedure 1500A then computes physical feature positions (FeaturesPhys3D$_{Sensor=i, Pose=0}$) by mapping corresponding initial estimated physical feature positions from Object3D to Phys3D space (using the user provided Phys3DFromObject3D at pose 0) for the subobject(s) seen by sensor i at pose 0. Next, in step 1530A, the procedure 1500A computes OriginalSensor3DFromPhys3D$_{Sensor=i}$ through the mapping from FeaturesPhys3D$_{Sensor=i, Pose=0}$ to FeaturesOriginalSensor3D$_{Sensor=i, Pose=0}$. Then, illustratively, the motion vector estimate is estimated in step 1540A by averaging the y-axes of the OriginalSensor3D$_{Sensor=i}$ transforms for the sensors. In an alternate embodiment, the initial motion vector is computed in step 1550A by mapping the unit Y vector [0, 1, 0] in OriginalSensor3D$_{Sensor=i}$ through the inverse of OriginalSensor3DFromPhys3D$_{Sensor=i}$ of sensor i.

Figure 16A:
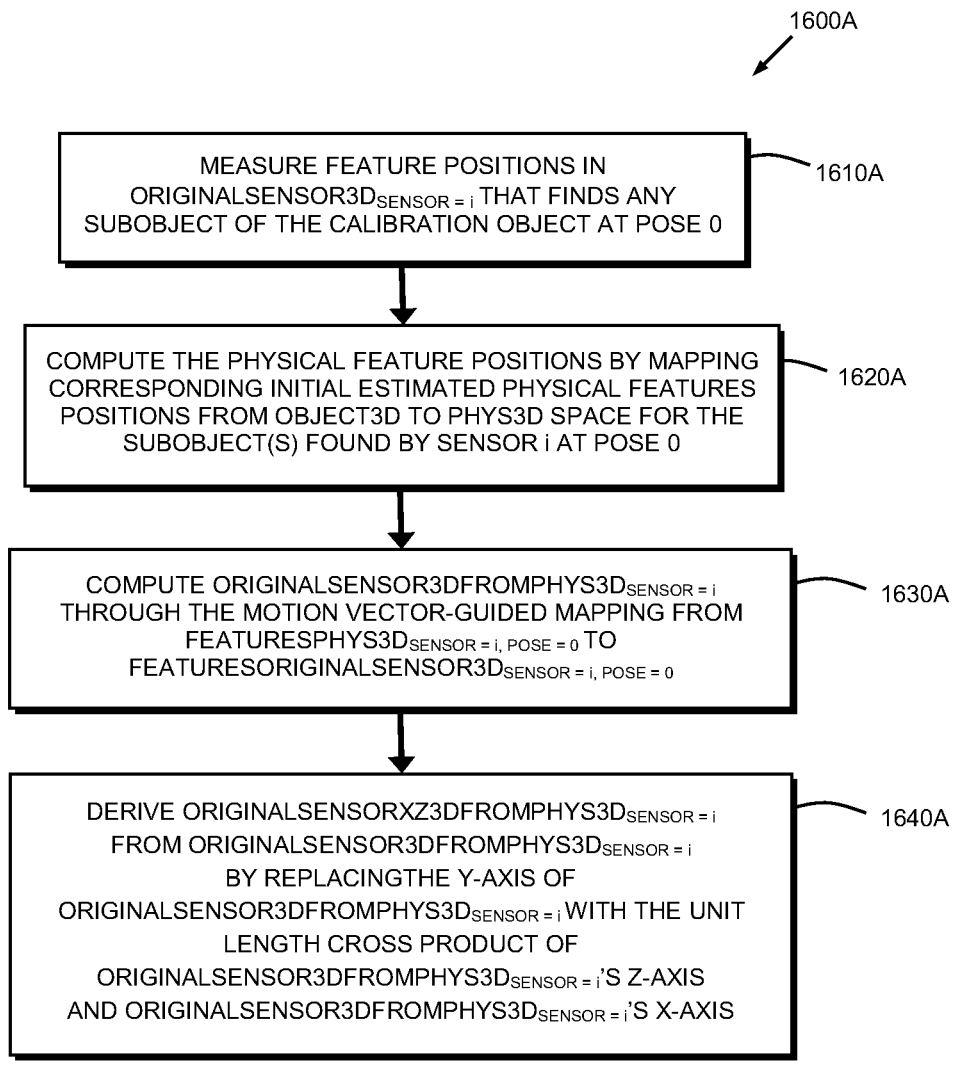
FIG. 16A is a flow diagram showing an alternate embodiment of an illustrative procedure for estimating the initial transform OriginalSensor3DFromPhys3DSensor=i for exemplary sensor i when finding/recognizing any calibration subobject(s) at pose 0.
Figure 17A:
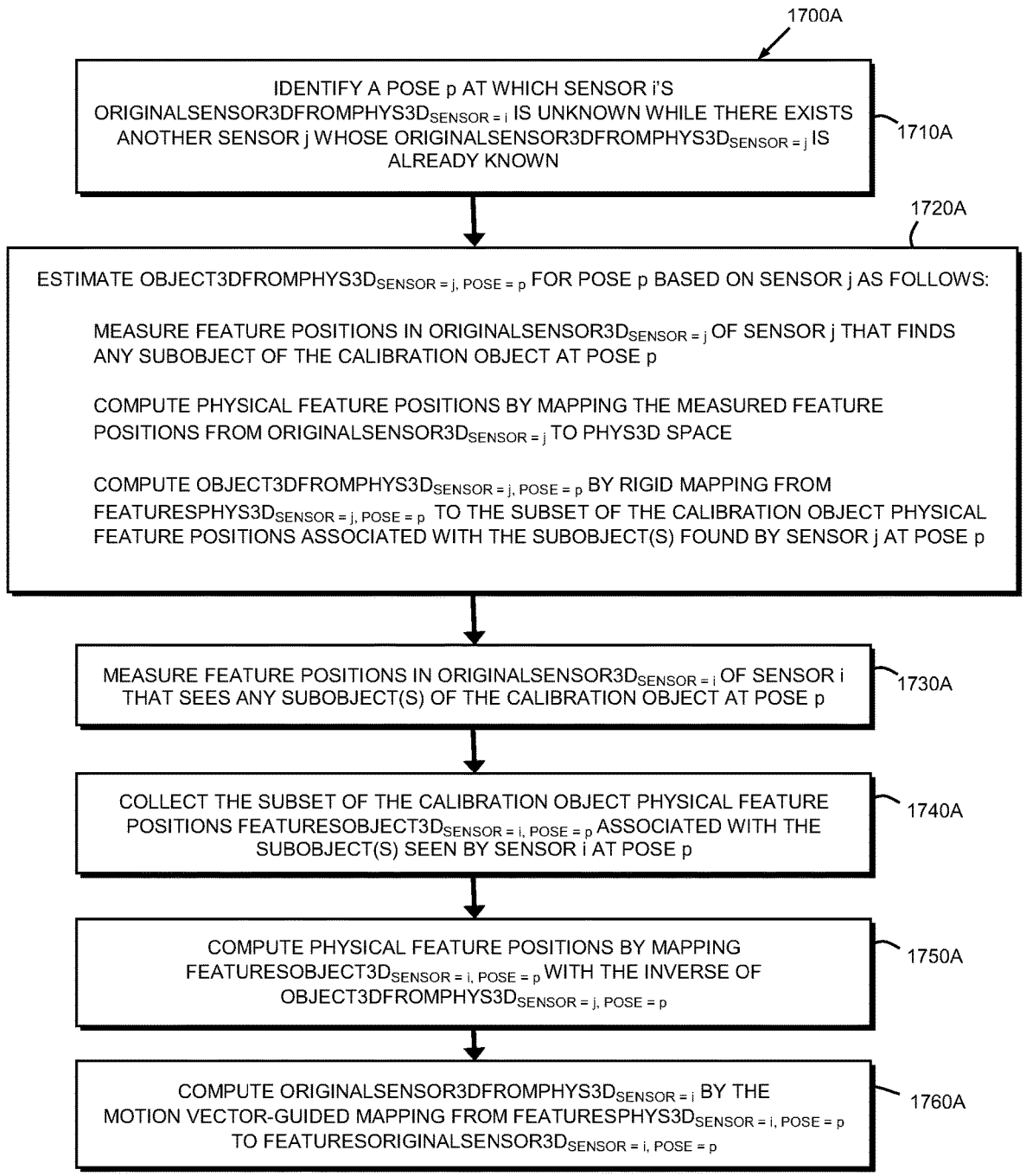
FIG. 17A is a flow diagram showing an alternate embodiment of an illustrative procedure for estimating the initial transform for OriginalSensor3DFromPhys3DSensor=i for exemplary sensor i when finding/recognizing no calibration subobject at pose 0.

FIG. 16A shows a procedure 1600A according to an alternate embodiment for estimating initial OriginalSensor3DFromPhys3D$_{Sensor=i}$ for sensor i assuming that the sensor successfully finds/recognizes any (one or more) subobject(s) at pose 0. In step 1610A, the procedure 1600A measures feature positions (FeaturesOriginalSensor3D$_{Sensor=i, Pose=0}$) in OriginalSensor3D$_{Sensor=i}$ of sensor i that finds/recognizes any subobject(s) of the calibration object at pose 0. In step 1620A, the procedure then computes the physical feature positions (FeaturesPhys3D$_{Sensor=i, Pose=0}$) by mapping corresponding initial estimated physical feature positions from Object3D to Phys3D space (using the user provided Phys3DFromObject3D at pose 0) for the subobject(s) found/recognized by sensor i at pose 0. Then, in step 1630A, the procedure 1600A computes OriginalSensor3DFromPhys3D$_{Sensor=i}$ through the motion vector-guided mapping from FeaturesPhys3D$_{Sensor=i, Pose=0}$ to FeaturesOriginalSensor3D$_{Sensor=i, Pose=0}$. OriginalSensorXZ3DFromPhys3D$_{Sensor=i}$ is derived in step 1640A from OriginalSensor3DFromPhys3D$_{Sensor=i}$ by replacing the y-axis of OriginalSensor3DFromPhys3D$_{Sensor=i}$ with the unit length cross product of OriginalSensor3DFromPhys3D$_{Sensor=i}$'s z-axis and OriginalSensor3DFromPhys3D$_{Sensor=i}$'s x-axis. Alternately, in FIG. 17A, an illustrative procedure 1700A estimates the initial OriginalSensor3DFromPhys3D$_{Sensor=i}$ for sensor i where no subobject is found or recognized at pose 0. In step 1710A, the procedure 1700A identifies a pose p (p≠0), at which sensor i's OriginalSensor3DFromPhys3D$_{Sensor=i}$ is unknown while there exists another sensor (j) whose OriginalSensor3DFromPhys3D$_{Sensor=j}$ is already known, either due to initial estimation at pose 0 or from an estimation at an earlier non-zero pose. In step 1720A, the procedure 1700A then estimates Object3DFromPhys3D$_{Sensor=j, Pose=p}$ for pose p based on sensor j. This step includes: (a) measuring feature positions (FeaturesOriginalSensor3D$_{Sensor=j, Pose=p}$) in OriginalSensor3D$_{Sensor=j}$ of sensor j that finds/recognizes any subobject of the calibration object at pose p; (b) computing physical feature positions (FeaturesPhys3D$_{Sensor=j, Pose=p}$) by mapping the measured feature positions from OriginalSensor3D$_{Sensor=j}$ to Phys3D space using sensor j's inverse of OriginalSensor3DFromPhys3D$_{Sensor=j}$; and computing Object3DFromPhys3D$_{Sensor=j, Pose=p}$ by rigid mapping from FeaturesPhys3D$_{Sensor=j, Pose=p}$ to the subset of the calibration object physical feature positions associated with the subobject(s) seen by sensor j at pose p. In step 1730A, the procedure 1700A then measures feature positions (FeaturesOriginalSensor3D$_{Sensor=i, Pose=p}$) in OriginalSensor3D$_{Sensor=i}$ of sensor i that finds/recognizes any subobject(s) of the calibration object at pose p. The procedure 1700A, in step 1740A then collects the subset of the calibration object physical feature positions (in Object3D), FeaturesObject3D$_{Sensor=i, Pose=p}$, associated with the subobject(s) found/recognized by sensor i at pose p. In step 1750A, the procedure 1700A computes physical feature positions (FeaturesPhys3D$_{Sensor=i, Pose=p}$) by mapping FeaturesObject3D$_{Sensor=i, Pose=p}$ with the inverse of Object3DFromPhys3D$_{Sensor=j, Pose=p}$. Then, in step 1760A OriginalSensor3DFromPhys3D$_{Sensor=i}$ is computed by the motion vector-guided mapping from FeaturesPhys3D$_{Sensor=i, Pose=p}$ to FeaturesOriginalSensor3D$_{Sensor=i, Pose=p}$.

Figure 18A:
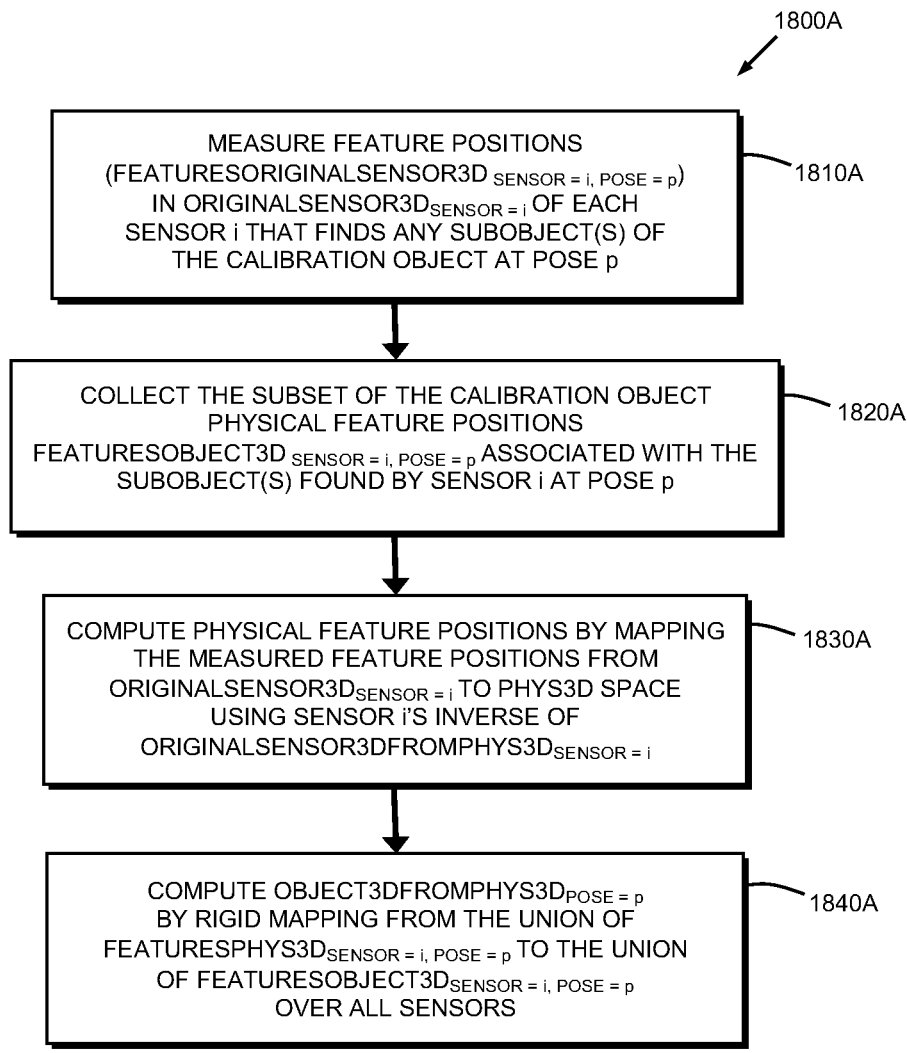
FIG. 18A is a flow diagram showing an alternate embodiment of an illustrative procedure for estimating the transform for estimate initial Object3DFromPhys3DPose=p for pose p.

FIG. 18A details a procedure 1800A, according to an alternate embodiment, for estimating initial Object3DFromPhys3D$_{Pose=p}$ for pose p. In step 1810A, the procedure 1810A measures feature positions (FeaturesOriginalSensor3D$_{Sensor=i, Pose=p}$) in OriginalSensor3D$_{Sensor=i}$ of each sensor (sensor i) that finds/recognizes any subobject(s) of the calibration object at pose p. Then, in step 1820A, the procedure 1800A collects the subset of the calibration object physical feature positions (in Object3D), FeaturesObject3D$_{Sensor=i, Pose=p}$, associated with the subobject(s) seen by sensor i at pose p. Next, the procedure, in step 1830A, computes physical feature positions (FeaturesPhys3D$_{Sensor=i, Pose=p}$) by mapping the measured feature positions from OriginalSensor3D$_{Sensor=i}$ to Phys3D space using sensor i's inverse of OriginalSensor3DFromPhys3D$_{Sensor=i}$. Then, Object3DFromPhys3D$_{Pose=p}$ is computed in step 1840A by rigid mapping from the union of FeaturesPhys3D$_{Sensor=i, Pose=p}$ to the union of FeaturesObject3D$_{Sensor=i, Pose=p}$ over all sensors. It is contemplated that the transforms employed herein can differ from those described in FIGS. 15-18 and 15A-18A in accordance with skill in the art.

III. User Interface

Before describing further details of the 3D sensor calibration process, reference is made to FIGS. 19A-19M, which show exemplary GUI screen displays for various functions of the 3D (e.g. displacement) sensor calibration process and associated vision system according to an illustrative embodiment. Note that these screen displays are exemplary of a wide variety of possible screens and functions that can be presented to the user, and have been simplified to describe specific functionality of the overall system and process. Thus, additional interface screen displays can be provided for other functions contemplated herein, including, but not limited to, refinement of calibration, system errors, file upload, download and storage, networking, sensor setup, conveyance setup and confirmation of tasks and commands. These additional GUI screens and associated functions can be implemented in accordance with skill in the art. In general, the GUI exemplifies the "automatic" nature of calibration, in which the user is required to enter a minimum of substantive numerical or parametric data and is, essentially, guided by the system through the overall calibration process.

Figure 19A:
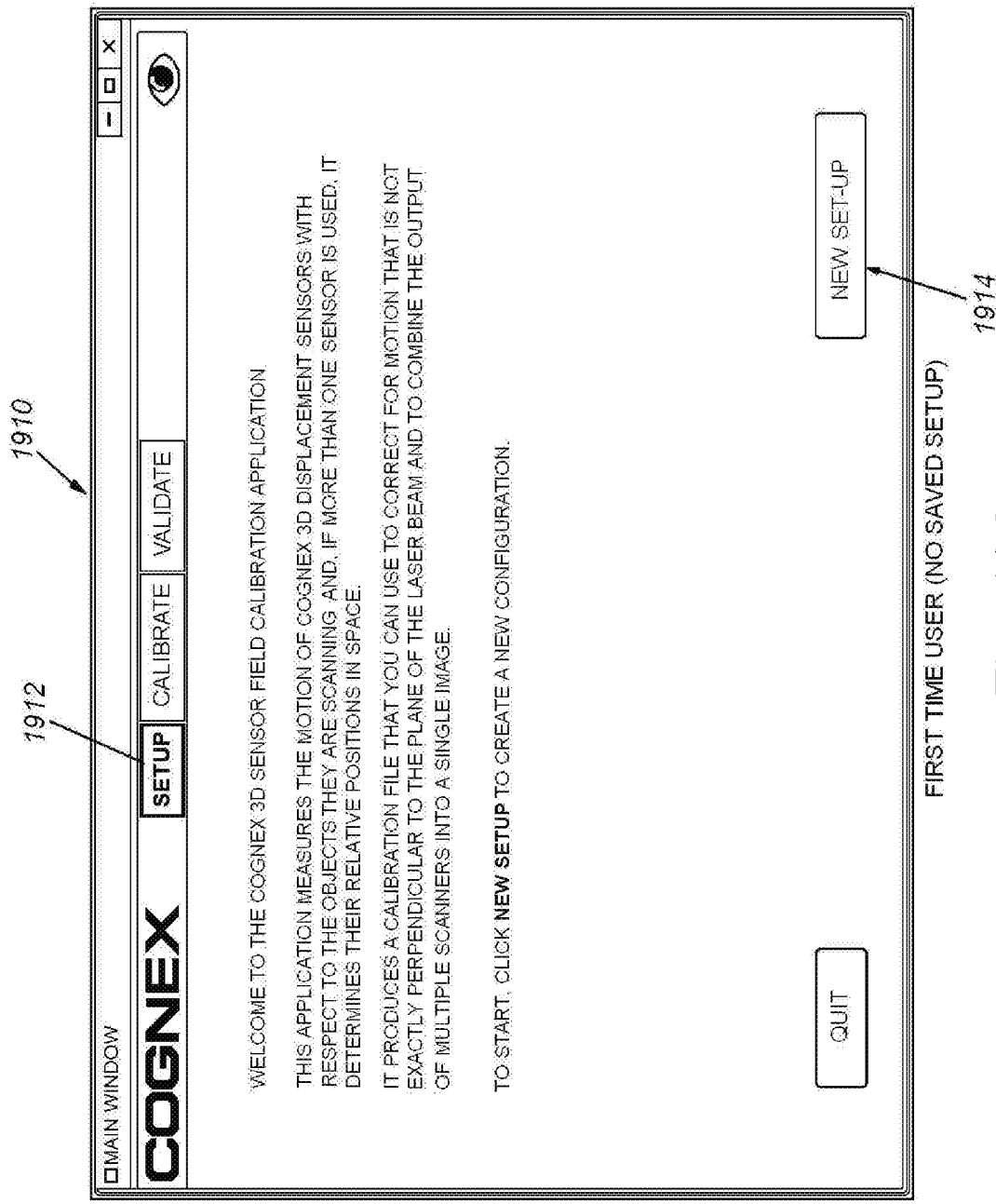
FIGS. 19A-19M are diagrams of exemplary GUI screen displays showing various stages of the operation of the setup and calibration procedures according to an illustrative embodiment.

With reference to FIG. 19A, the depicted GUI screen display 1910 represents a setup phase (tab 1912), in which the user is prompted (button 1914) to begin a new setup. It is assumed that the 3D sensors have been mounted to image the scene and interconnected with the vision system processor (e.g. a PC) via appropriate wired or wireless links, and that the conveyance can appropriately transmit motion data (e.g. via encoder clicks or pulses) to the processor.

Figure 19B:
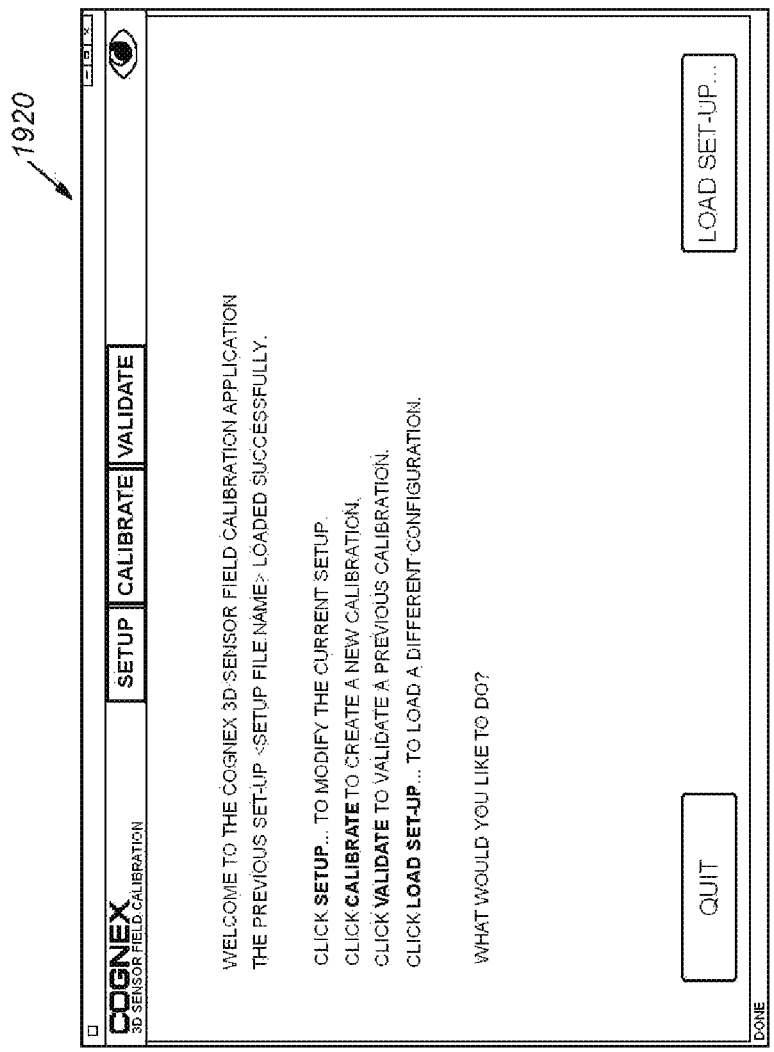
Figure 19C:
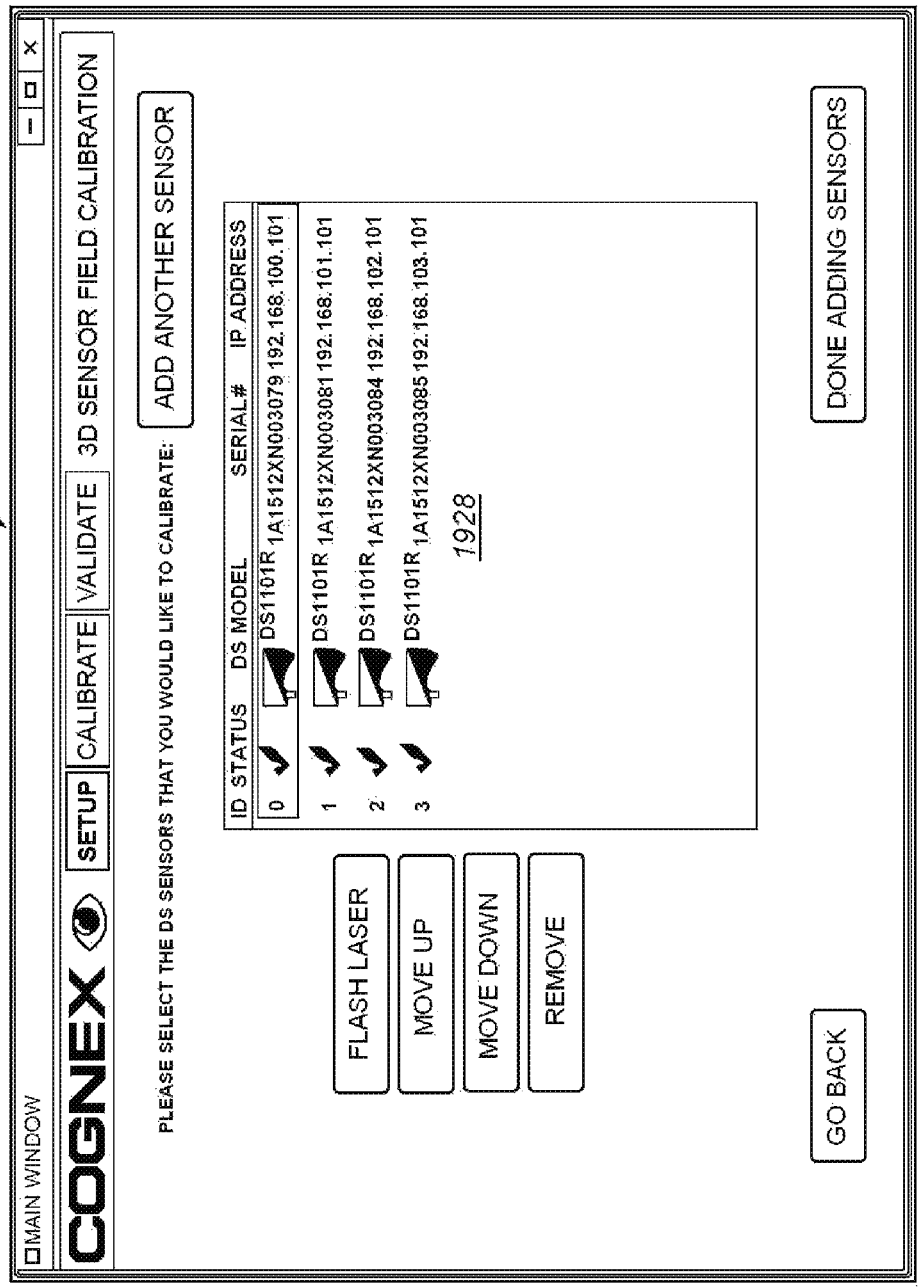
Figure 19D:
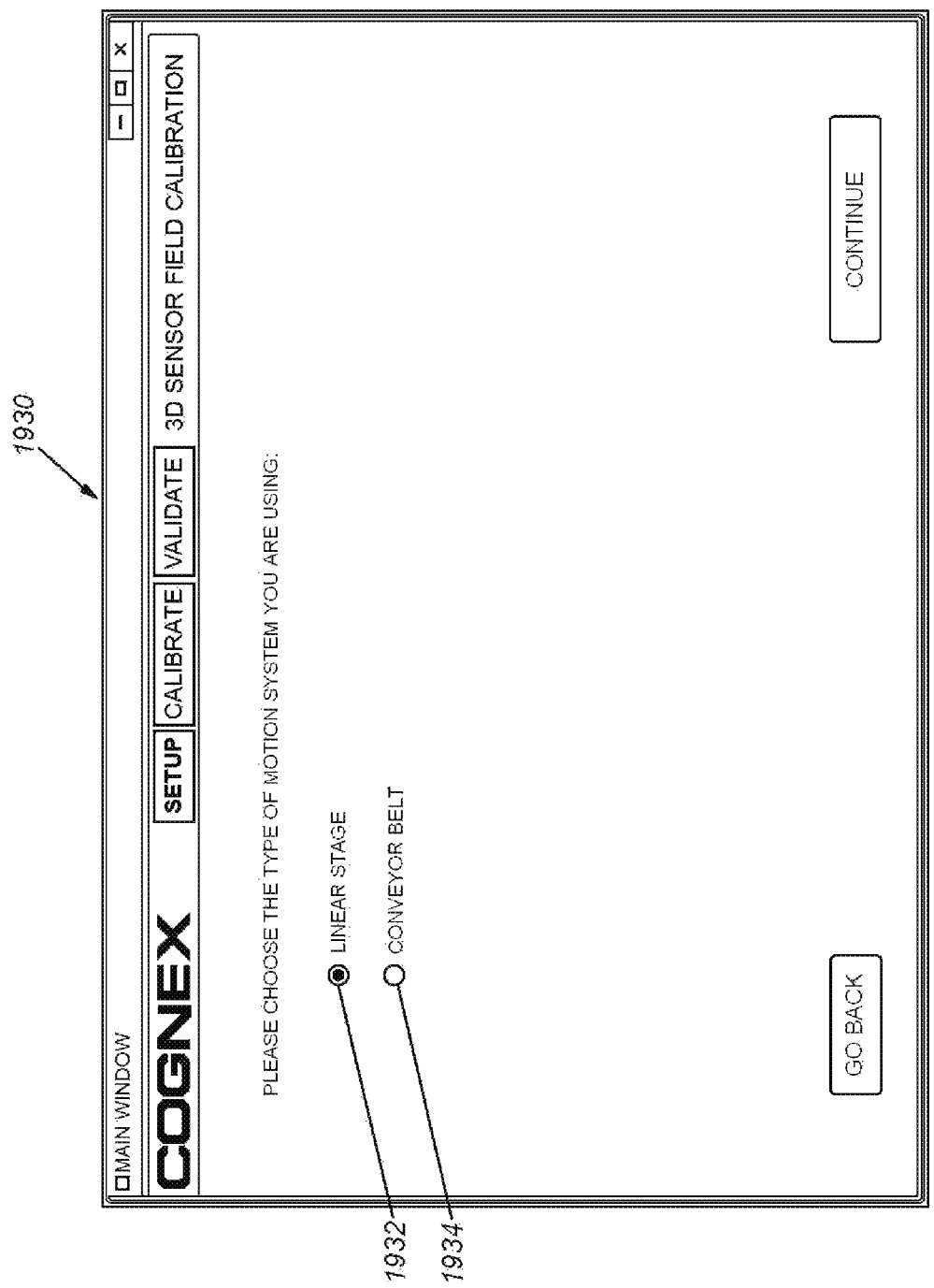

In FIG. 19B, a welcome screen 1920 is presented after the user performs and saves a setup or is relying on a previously loaded setup. Screen 1926 in FIG. 19C identifies the displacement sensors (in window 1928) that are part of the setup. Note that the sensors communicate with the system via a LAN connection using discrete IP addresses. Screen 1930 in FIG. 19D continues the setup process by allowing the user to select the type of conveyance via radio buttons 1932 and 1934 (e.g. a linear motion stage and conveyor belt, respectively). Other types of conveyances (e.g. robot manipulators, moving camera gantries, etc. can be provided as appropriate. In this example, the conveyance is selected as a moving linear stage.

Figure 19E:
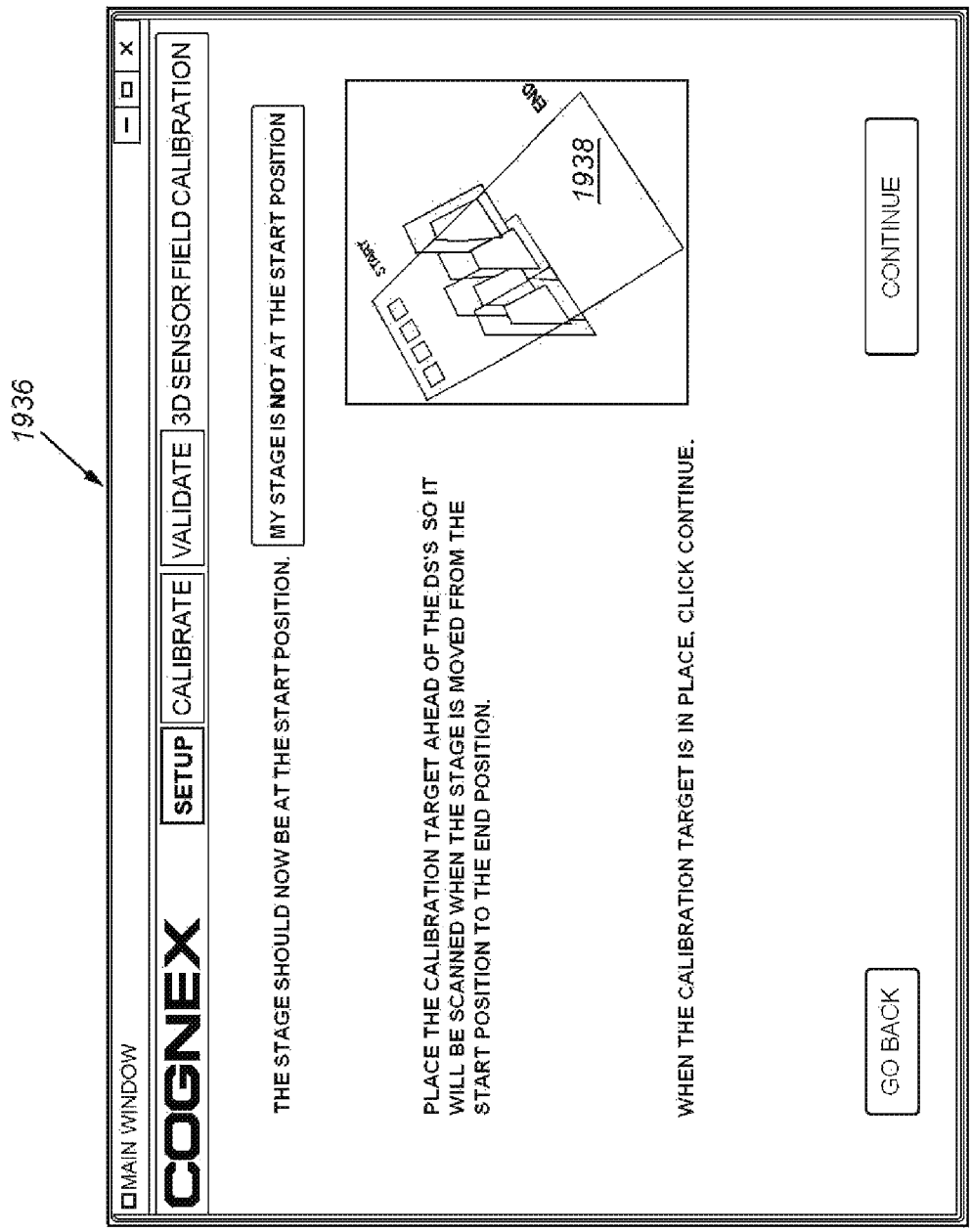

In FIG. 19E, the screen 1936 prompts the user to set up the calibration object on the conveyance and depicts, in window 1938, a desired orientation (herein referred to as "horizontal"), for the object with respect to the conveyance and sensors wherein the elongate length of spaced apart subobjects on the calibration object extends transverse/perpendicular to the conveyance motion direction.

Figure 19F:
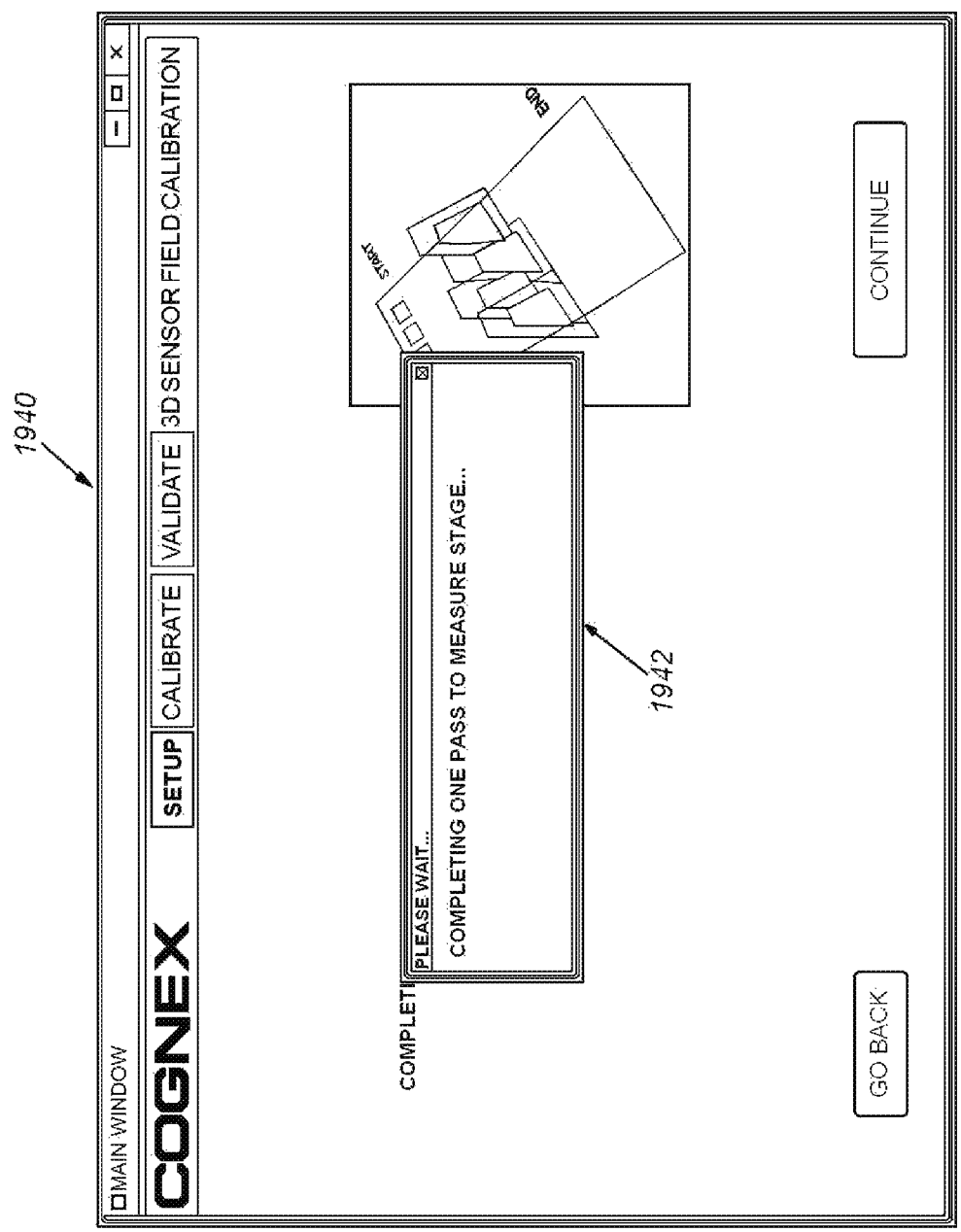
Figure 19G:
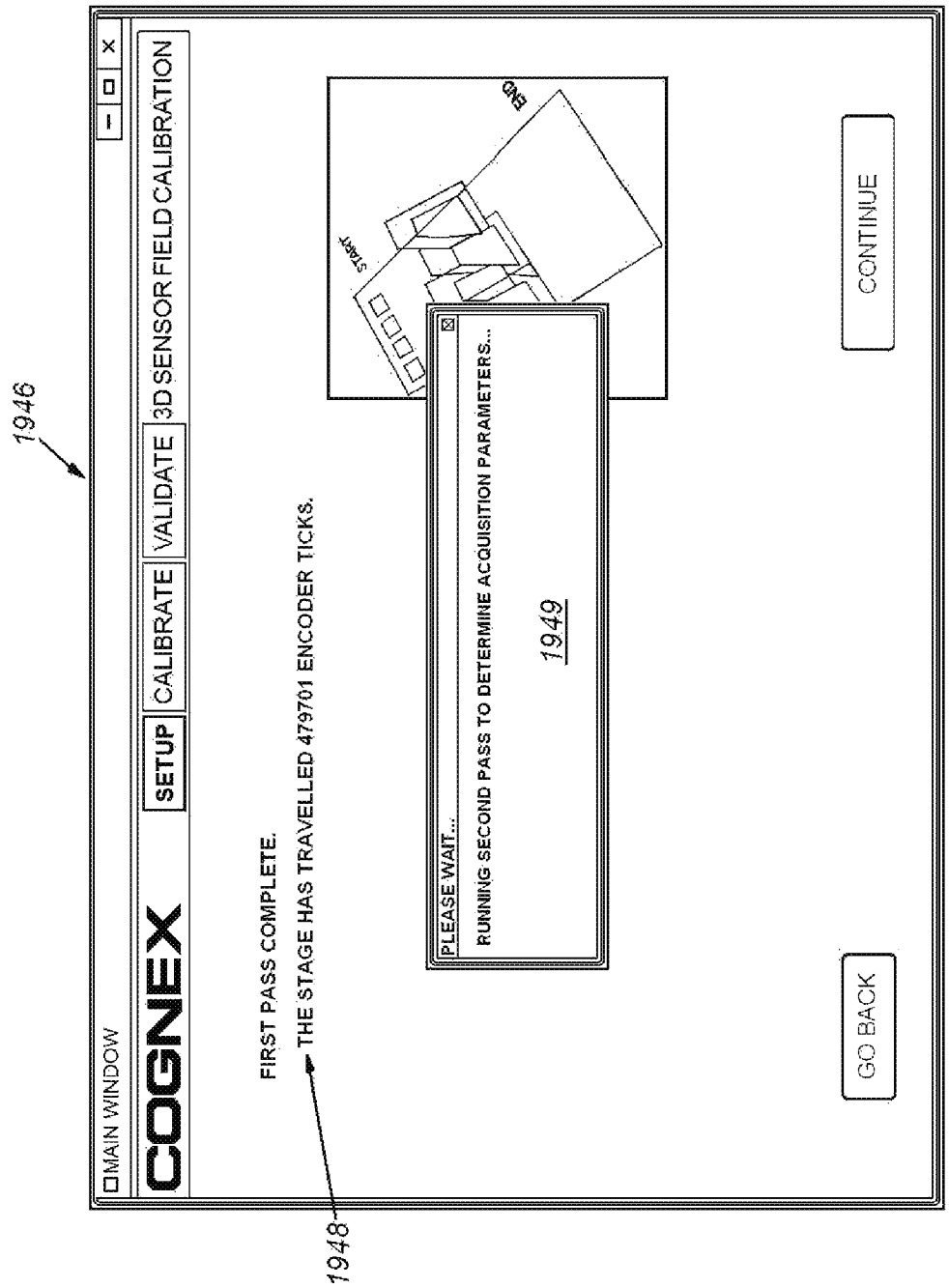
Figure 19H:
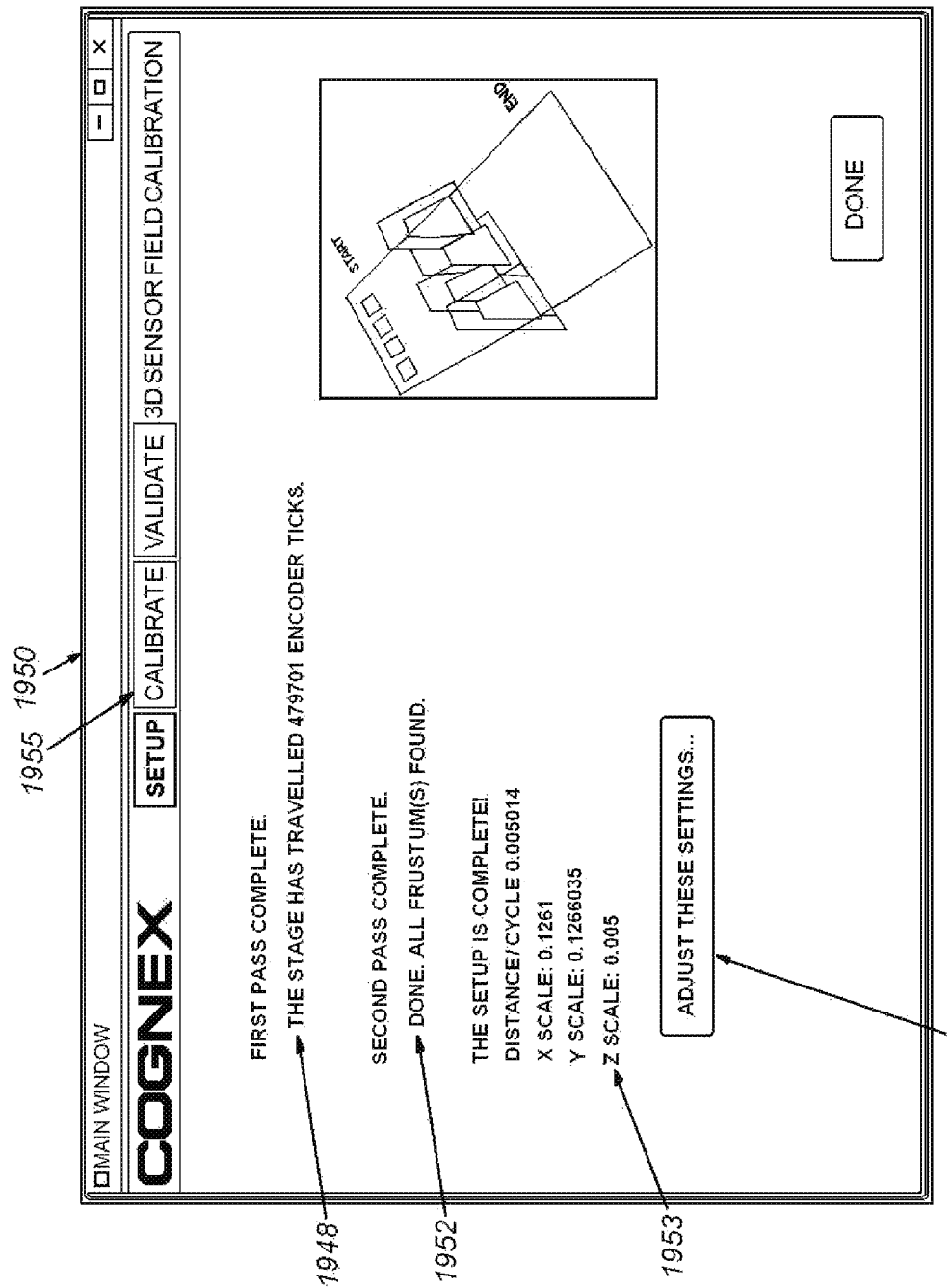

Once the user initiates a scan, the screen 1940 in FIG. 19F reports (box 1942) that the conveyance is running through a first pass. This pass establishes the limits of the motion stage, typically counting encoder pulses. This information is reported in screen 1946 in FIG. 19G as comment 1948. This screen also indicates in box 1949 that a second scan has initiated to determine the acquisition parameters of the system. Typically, as shown, the calibration object is positioned horizontally so that the sensors can finds/recognize all subobjects (e.g. frusta). If all are found, then this is reported in screen 1950 at comment 1952. The scale of the axes is reported at screen area 1953. The user has an opportunity to adjust various settings based on additional scans or user-defined parameters via button 1954. Otherwise, setup is considered complete as shown. A further description of the setup procedure is provided with reference to FIG. 21 and procedure 2100 below. The user can now toggle the calibrate tab 1955 to initiate the calibration phase—typically with the same calibration object as used in setup, or with a different object.

Figure 19I:
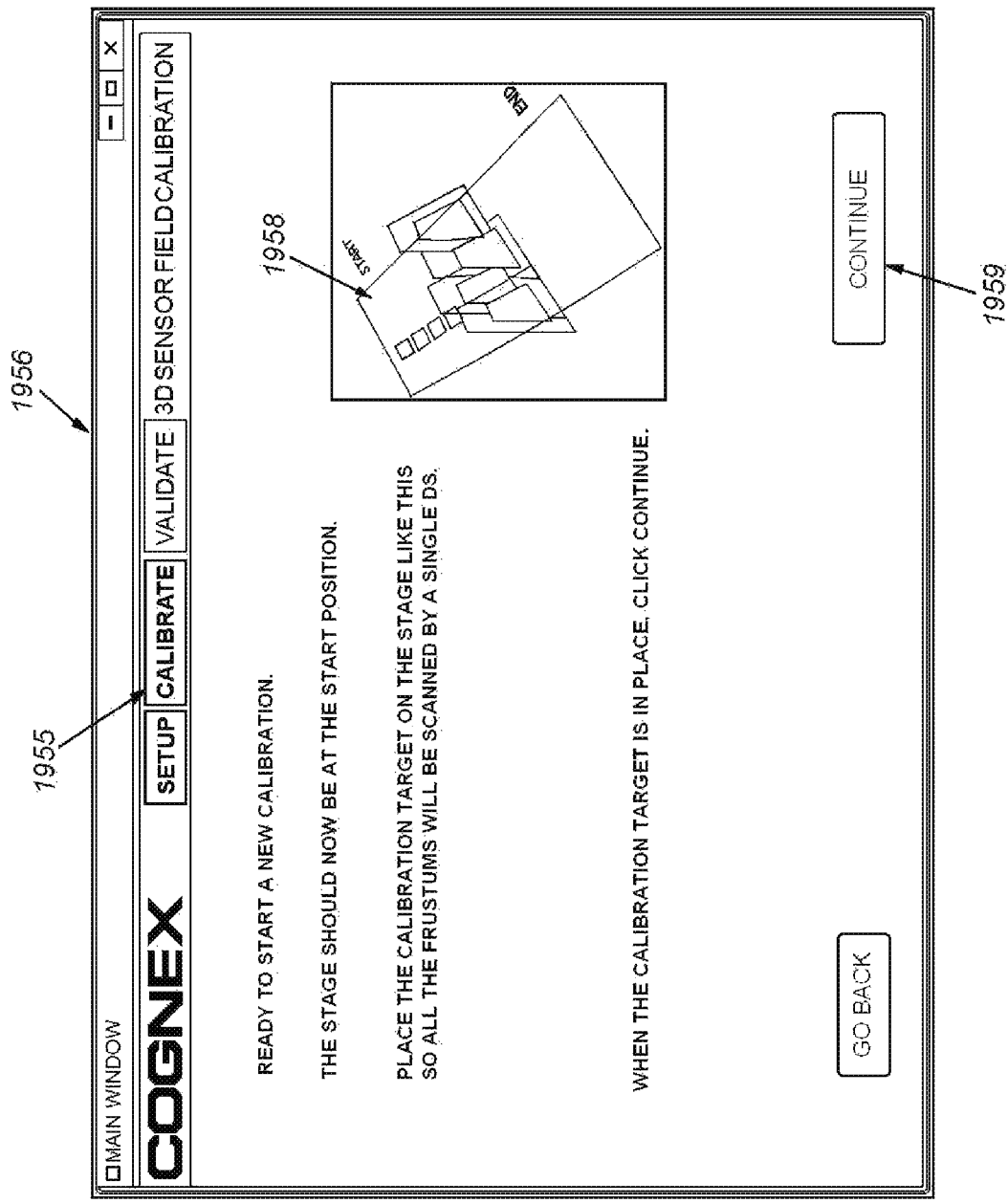
Figure 19J:
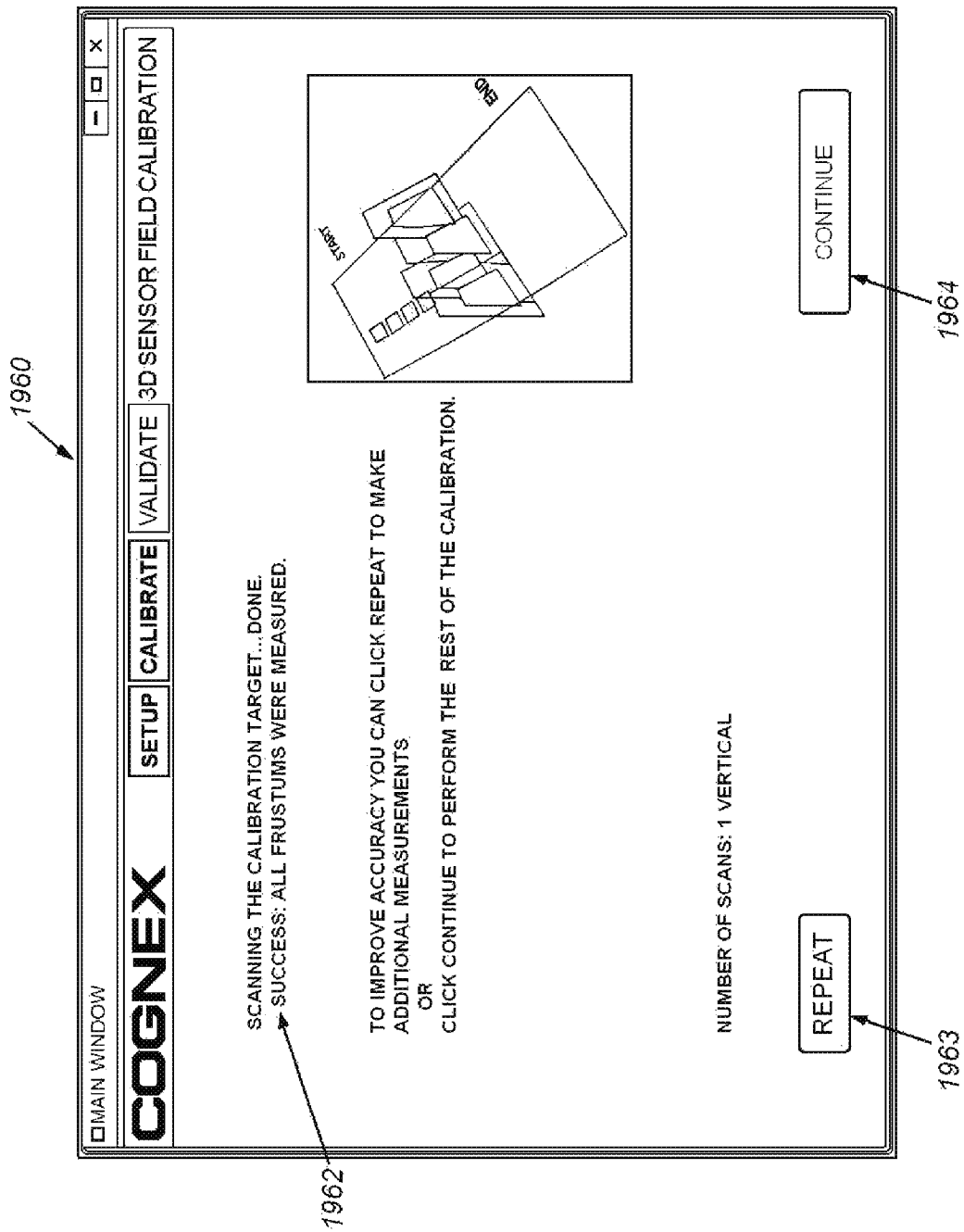
Figure 19K:
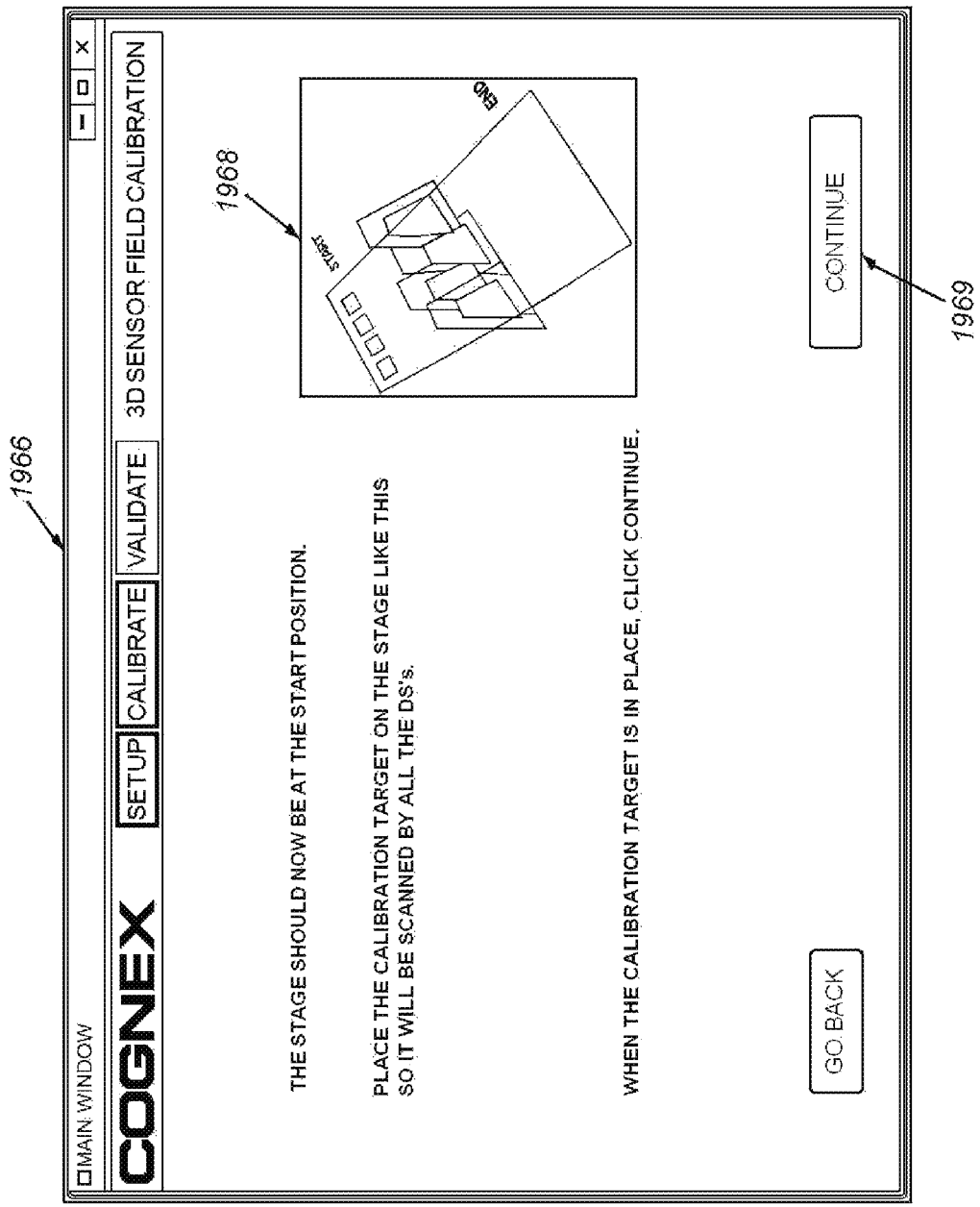

With reference to FIG. 19I and GUI display screen 1956, the system has entered calibration mode following setup (either newly established/saved or loaded from a saved file). The user is prompted to place the calibration object in a vertical position on the conveyance as depicted in the window 1958. The vertical alignment should allow one of the sensors to image all of the subobjects. Once the object is aligned, the user is prompted to press the continue button 1959, and begin scanning. In FIG. 19J and screen 1960 the system reports that all subobjects (frusta) were measured by a single sensor (comment 1962). The user can improve accuracy by repeating this process (using the repeat button 1963) so that an average measurement is obtained from multiple scans/measurements. When complete, the user presses the continue button and moves to the next calibration step. Thus, screen 1966 in FIG. 19K prompts the user to orient the calibration object on the horizontal as depicted in window 1968. This will allow each sensor to scan a discrete subobject. When aligned, the user can press the continue button 1969 to begin calibration.

Figure 19L:
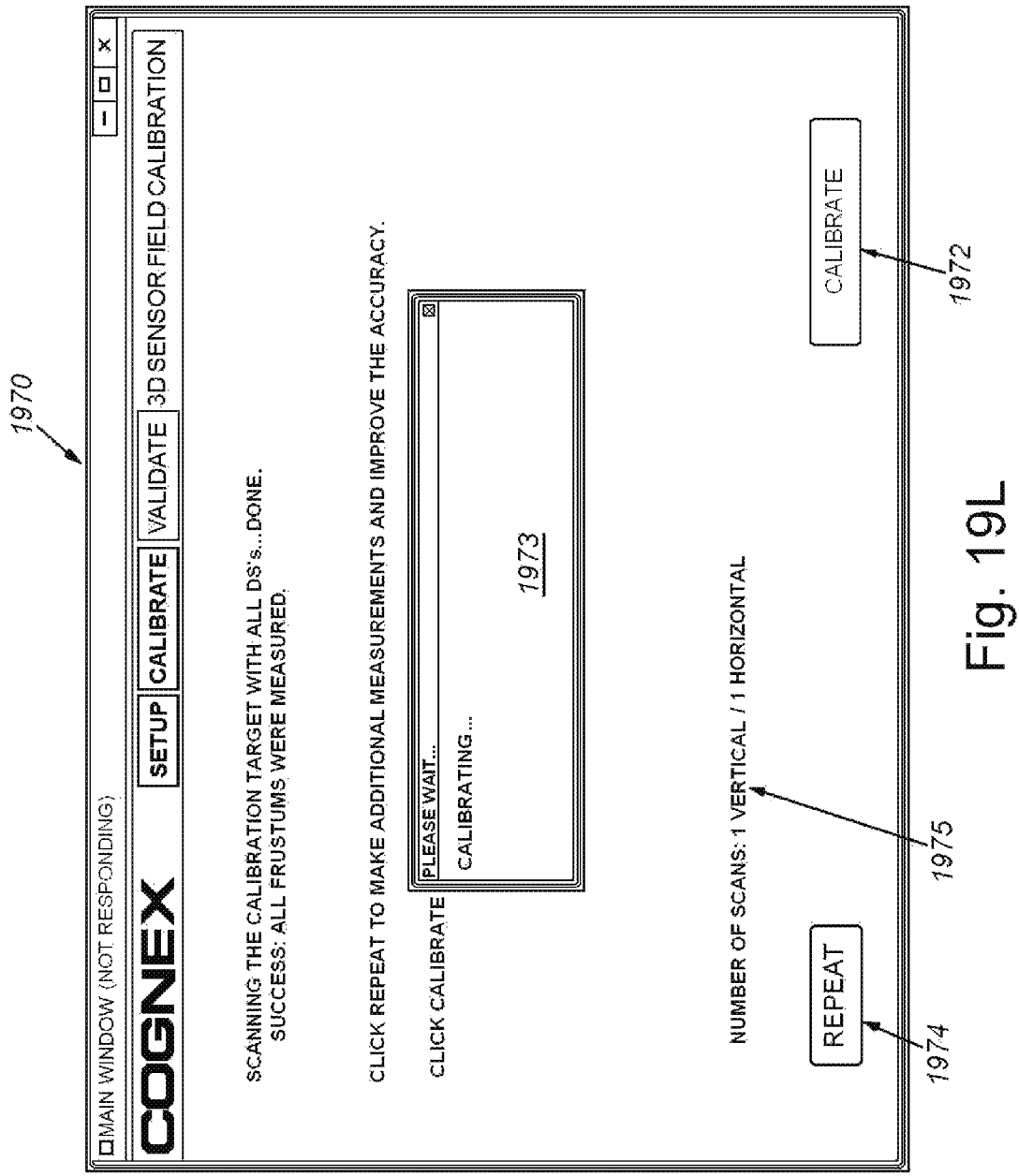

When calibration has initiated (typically via a separate screen (not shown), in which the user toggles a calibrate button 1972), GUI display screen 1970 in FIG. 19L then reports that calibration scan and computation is occurring via box 1973. This process, like (vertical) measurement in FIG. 19J can be repeated to improve accuracy using the repeat button 1974. The screen comment 1975 reports the current number or vertical and horizontal scans in the calibration process.

Figure 19M:
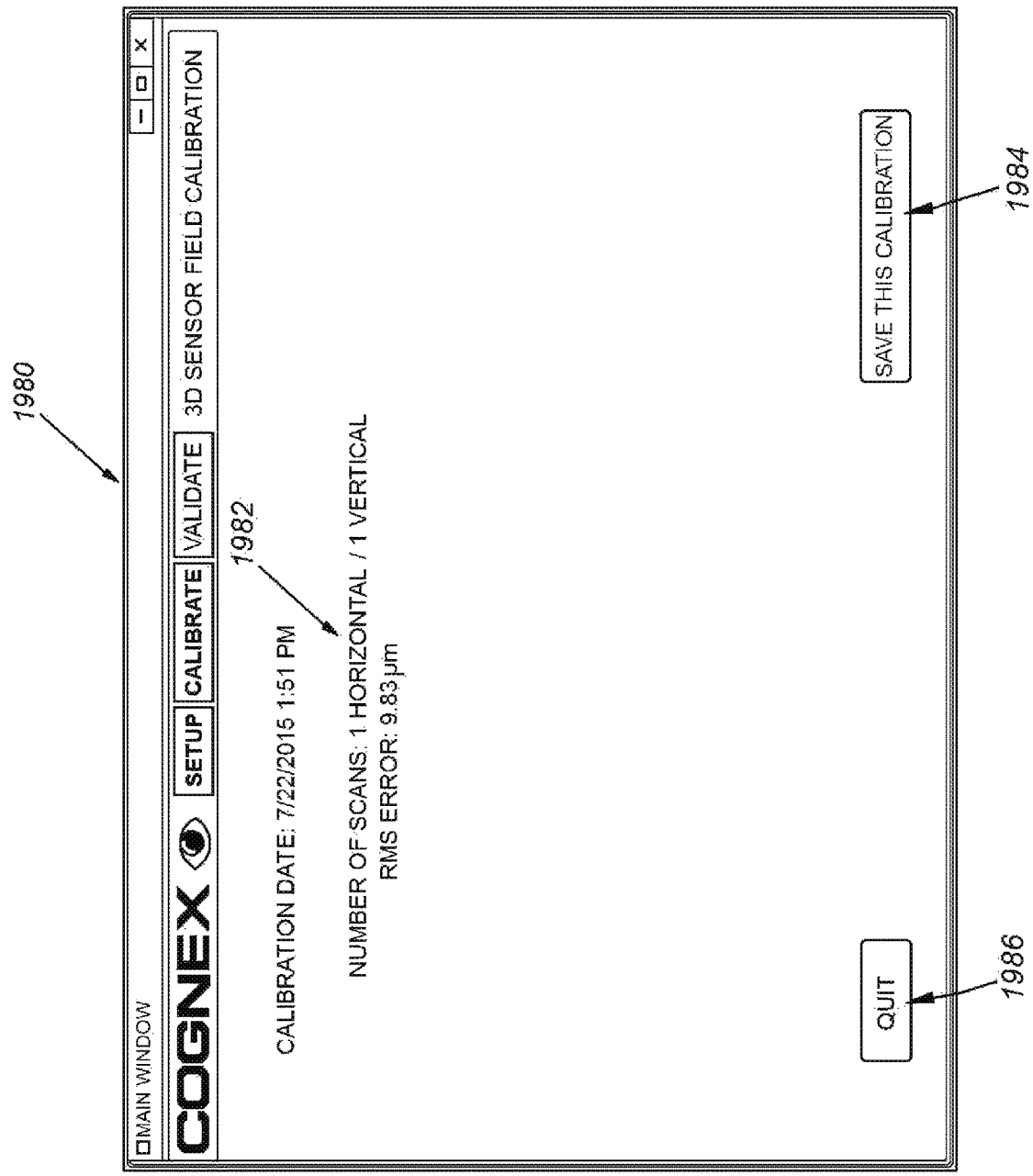

When calibration is complete, the user is presented with GUI display screen 1980 in FIG. 19M, in which the total number of scans and RMS error (e.g. in microns) is reported in comment 1982. The user can save the calibration results to an appropriate file via the calibration button 1984 or quit without saving via button 1986. The saved calibration can be loaded in a subsequent runtime operation in which the system provides runtime-object-measurement results (using up to the full calibrated width of the sensor array) to other applications, such as quality control applications, surface inspection applications, robot manipulation applications, etc.

IV. Thermal Calibration

It is contemplated that changes in temperature can affect the accuracy of the calibration as described above. In an illustrative embodiment, multiple field calibrations are performed at various temperatures so that the overall calibration can be interpolated for a given runtime temperature. In a further embodiment, this interpolation includes linearly interpolating two transforms for calibrations below the expected runtime (environmental) temperature and above the runtime temperature. Temperature can be varied based upon natural variations in ambient conditions or applying external heating/cooling. In another embodiment, this interpolation includes nonlinearly interpolating between transforms for calibrations and the nonlinear interpolation is a function of the runtime temperature and the calibration-time temperatures. In yet another embodiment, this interpolation includes interpolating between the motionVectorInPhys3D using linear interpolation and interpolating between 3D rigid transforms (such as for Sensor3DFromPhys3D) using practices known in the art, such as references found (by way of useful background information on the World Wide Web at the URL address http://www.engr.colostate.edu/ECE555/reading/article_8.pdf, or techniques such as interpolating between R0 and R1 by an amount a by using the equation: Ri=(R1*(inverse(R0)))^a*R0 where we R^a is defined as an operation that gives us a rotation about vector [kx,ky,kz] by a*theta.

Figure 20:
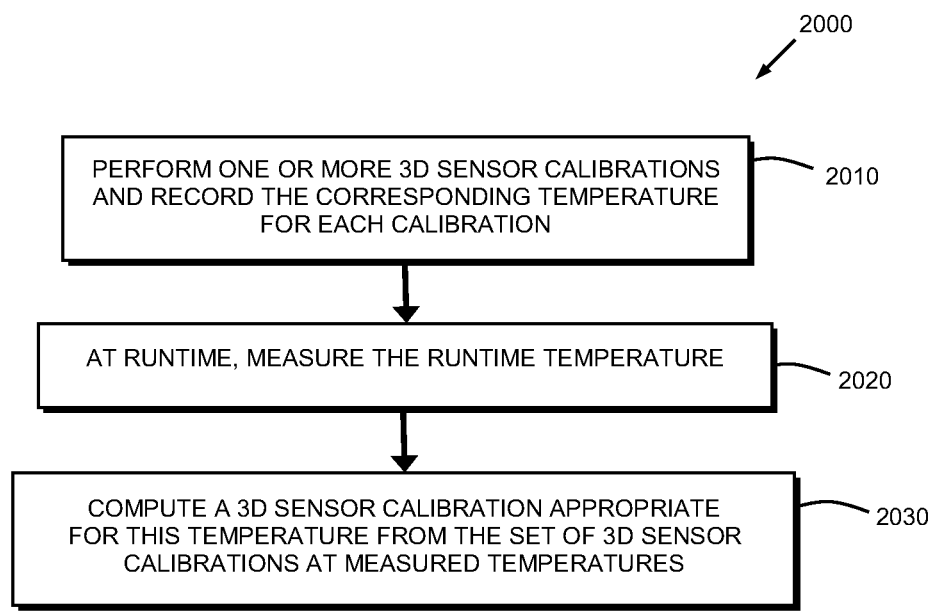
FIG. 20 is a flow diagram showing a procedure for performing calibration in the presence of temperature variations according to an illustrative embodiment.

FIG. 20 details a generalized procedure 2000 for calibration in view of temperature variations. In step 2010, one or more 3D sensor calibrations are performed by the user according to the procedures described above. These are each stored in the system via the GUI. In step 2020, the temperature is measured at runtime (and/or an average temperature over a period of runtime operation is established). Then, in step 2030, the 3D sensor calibration appropriate for the runtime temperature is computed using the recorded calibration values from step 2020 (based upon at least one of the above-described embodiments (e.g. interpolation, etc.)).

Figure 21:
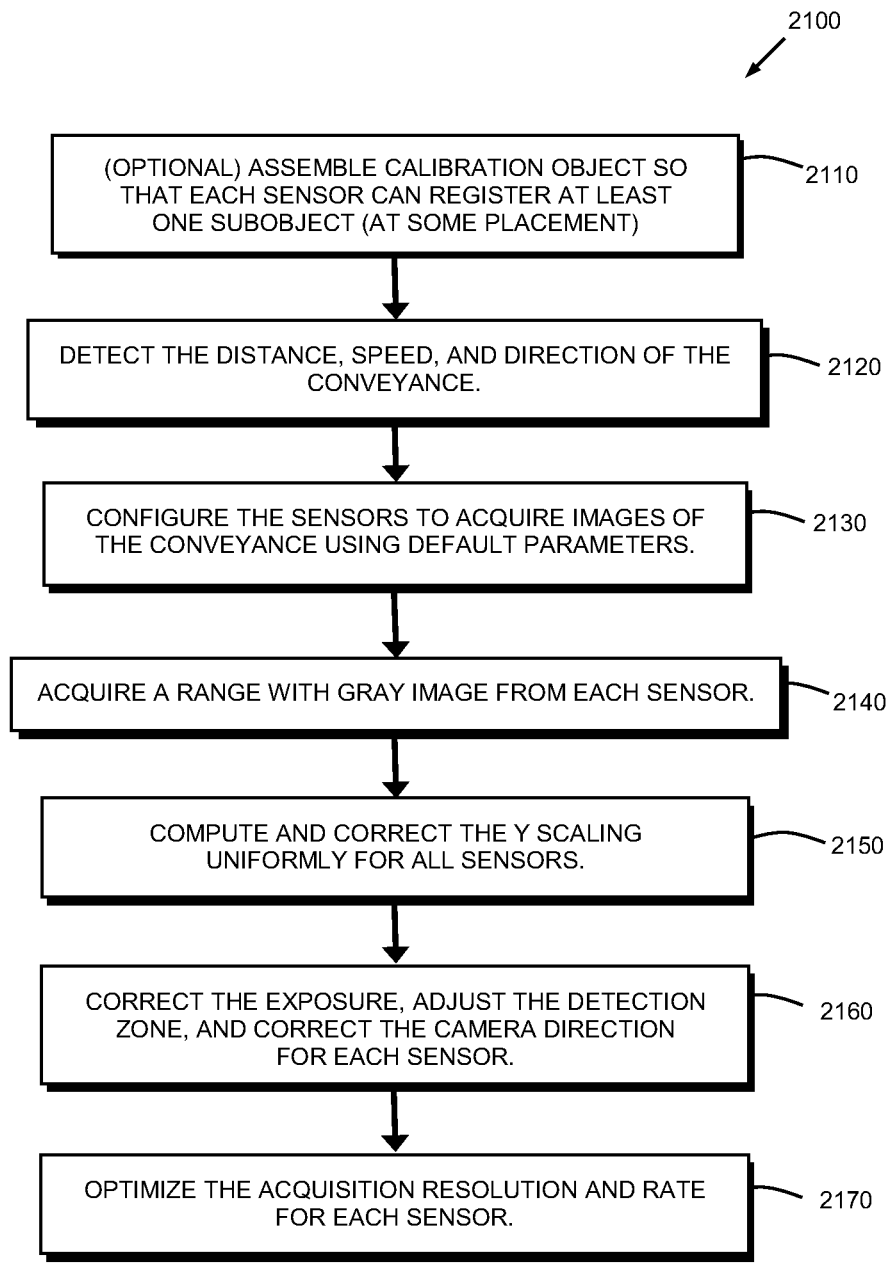
FIG. 21 is a flow diagram showing a setup procedure for use in the overall calibration process according to an illustrative embodiment.

V. System Setup 3D sensor calibration relies upon the sensors being appropriately configured in order to provide useable data. The exemplary displacement sensors include a multiplicity of parameters that are carefully set (e.g. exposure, detection zone, acquisition rate, camera direction, acquisition length, and resolution) to produce effective data. If multiple sensors are employed, the some of these parameters should also be consistent between sensors. If any of these parameters are selected improperly, then the data inaccuracy can compromise field calibration or be completely incompatible. Automated setup in accordance with an illustrative embodiment is an optional two-step process of deriving these parameters without any prior knowledge of the setup or conveyance for an arbitrary set of displacement sensors. It is constructed and arranged to overcome certain limitations of the sensors' functionalities. Reference is now made to FIG. 21, showing a setup procedure 2100. As described above (FIG. 6), a calibration object can be assembled so that each sensor registers at least one subobject in step 2110. In step 2120 the procedure detects the distance, speed and direction of motion of the conveyance. The system can recognize the conveyance via the hardware encoder signal. This step is desired for encoder-driven displacement sensors that only support predefined acquisitions (e.g. does not support rolling acquisitions). By way of example, the conveyance is characterized by the change in encoder ticks/pulses as a function of time. The total change in encoder tick captures the traversal distance of the conveyance. The rate of the encoder tick captures the motion speed of the conveyance. The polarity of the encoder tick change captures the direction of the conveyance. These characteristics allow images to be acquired for all sensors, regardless of their functional capabilities.

Next in step 2130 of the procedure 2100, the system optimizes acquisition parameters for each sensor. Each sensor (simultaneously or serially) acquires 3D data (which in one exemplary embodiment is a range image, in another exemplary embodiment is a range with gray image, in another exemplary embodiment is 3D point cloud data, and in yet another exemplary embodiment is 3D point cloud data including gray information) of the calibration object using a set of default parameters. After acquiring an image, the system first computes and corrects the YScale of the clientFromImage transform. One approach is to exploit the symmetrical design of square frustums and the accuracy in the X-axis to search for rectangular blobs in the range image and correct them to a square. Since all the sensors share the same conveyance and driver, the corrected YScale can be shared by every sensor.

Next in step 2140, an acquired gray image from each sensor is used to correct the exposure. By exploiting the correlation between exposure and gray pixel value and knowledge of a sensor model's optimal gray value, the exposure of each sensor can be tuned to avoid saturation while minimizing missing pixels. This corrects for differences in the sensors and calibration subobjects. Assuming that all the subobjects of the calibration object have the same reflectivity (i.e. darkness) then the differences in gray values derive from variations in the sensor sensitivity (e.g. laser intensity). Otherwise, any additional differences would stem from variations between subobjects. In one embodiment, if subobject variations are to be accounted for, then an additional acquisition in which all the subobjects are found/recognized by a single sensor is desired to isolate and characterize variations in subobject reflectivity.

The detected subobjects form the lower bound window for the detection zone in which subsequent acquisitions should expect to find the calibration object as measured by each sensor. Since the accuracy and field of view scales with the distance from the sensor, the distance from the sensor is also used to optimize the 3D resolutions and field of view. In step 2150, the target YScale resolution is also balanced against the motion speed of conveyance to avoid overruns. The orientation of the detected subobject is used to correct coordinate space of the images such that they are consistent.

Additional optional functionalities are available to support edge case scenarios. In an embodiment, if the motion is not very consistent (i.e. the instantaneous speed can be much higher than the average speed), then a tolerance factor can be manually or automatically increased if the displacement sensor cannot poll the encoder quickly enough to adequately read the instantaneous speed (step 2170). In an embodiment, if the motion speed is significantly fast relative to the maximum acquisition rate of the sensor, then the initial detection zone can be reduced to support that higher speed (step 2160). In various embodiments, these optional functionalities can be manually or automatically driven. Additional a priori knowledge, such as the traversal distance or motion speed, can be optionally entered to speed up the process.

VI. Additional Parameter Refinement

As described above coarse estimation employs at least one scan of the calibration object with at least one sensor, which is referred to as the base sensor. Generally, the base sensor should be able to measure all of the subobject features in that scan. This provides an initial definition of Phys3D coordinates. It is assumed that the motion direction is (0,1,0) in OriginalSensorXZ3D of the sensor used for estimation and can thereby estimate that sensors pose. This coarse estimation scan can be used to bootstrap the poses of the other sensors by analyzing other scans in which one sensor already has a computed pose and another sensor has not, and the scan includes data from both sensors. Since the system has knowledge of the relationship between the feature positions, this knowledge can be extrapolated to determine each other sensor's pose. This bootstrapping approach continues until the system has estimated the poses for all of the sensors subsequently, for each scan, the system can estimate the scan poses since it has generated estimates for each sensor as well as estimates for the calibration object features.

Figure 22:
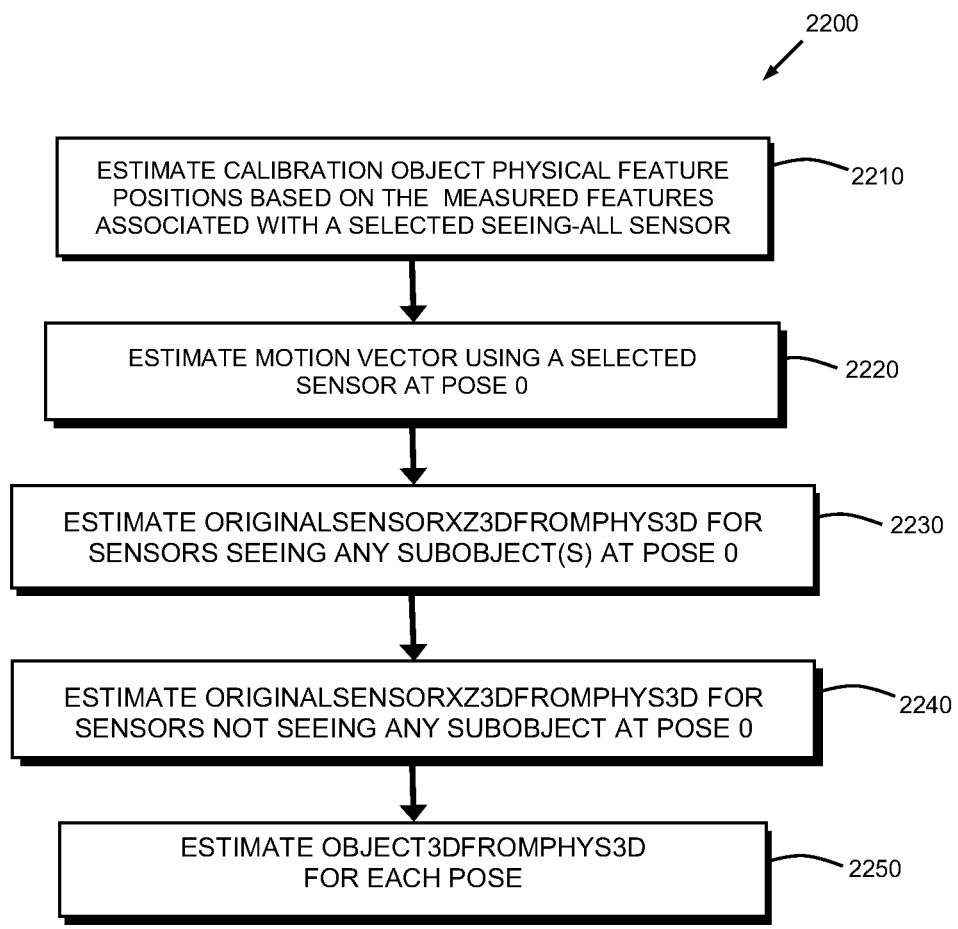
FIG. 22 is a flow diagram showing basic initial parameter estimation for use in the calibration process according to an illustrative embodiment.

Given a set of measured feature positions of the calibration object, which is positioned at different poses and captured by different sensors (where the term "captured" characterizes that the object has been measured), FIG. 22 depicts a block diagram 2200 for providing estimates of the initial values of the following initial parameters: calibration object physical feature positions (block 2210); MotionVectorInPhys3D (block 2220), OriginalSensorXZ3DFromPhys3D (blocks 2230 and 2240); and Object3DFromPhys3D (block 2250). These estimations of initial parameters are performed generally as described in the procedures of FIGS. 14-18. In this case, the measured feature positions used to estimate the calibration object physical feature positions are associated with a selected sensor while MotionVectorInPhys3D is estimated using a selected sensor at pose 0. With a same set of measured feature positions, estimated parameters would change and produce different feature prediction errors as any of the two selected sensors varies. With multiple scans involved for field calibration, there can be multiple sensors that see all calibration subobjects at different pose. As such there are various options available to determine one of selected sensors for estimation according to FIG. 22. Such options exist where multiple sensors find/recognize subobjects at pose 0.

In an embodiment, multiple sensors are selectively applied as the base sensor, and the computations are re-performed for that sensor. The sum squared errors generated from the computations for each base sensor are then compared. The base sensor which induced the minimum sum squared error is selected and is used to select its corresponding displacement sensor field calibration. In another embodiment, the subobject feature positions are specified, in which case, the initial parameter estimation step which estimates the subobject feature positions is skipped (and the specified feature positions are used).

Figure 23:
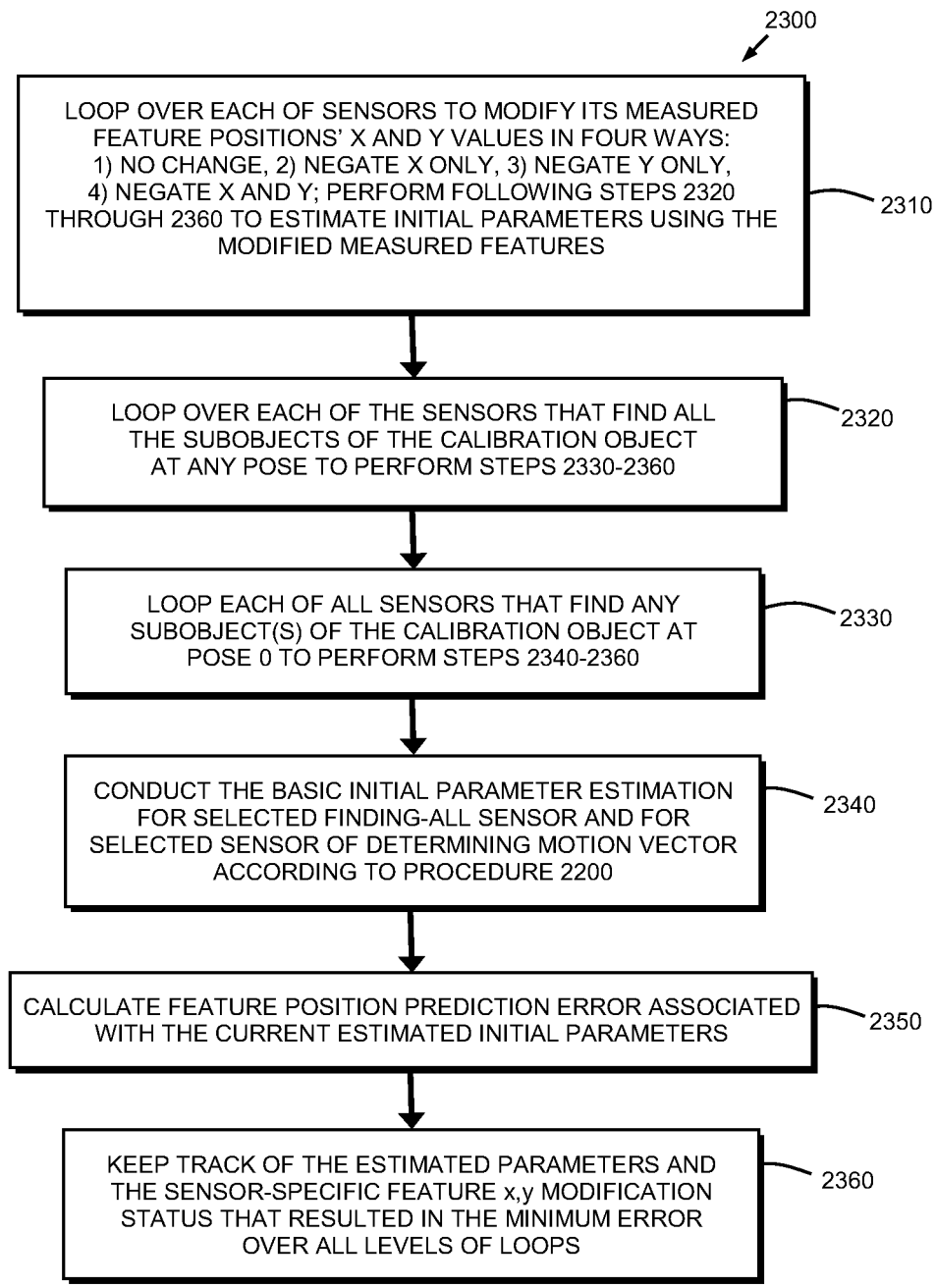
FIG. 23 is a flow diagram showing advanced initial parameter estimation for use in the calibration process according to an illustrative embodiment.

The quality in the estimated initial parameter values directly affects the performance of the displacement sensor field calibration, e.g., whether it can converge to the minimum through the refinement and how fast if converging. Thus, in a further embodiment, to overcome the discrepancy in final calibration results that can possibly be caused by the uncertainty in initial estimated parameters, an advanced initial parameter estimation procedure 2300 is provided in FIG. 23. This advanced procedure 2300 first tries each of four possible modifications of measured feature positions by whether negating their x or y values associated with each sensor. This allows each of the sensors to be calibrated configurable in its acquisition direction ("Laser-to-Lens" or "Lens-to-Laser") independently from other sensors and from the scan motion direction. To compensate the possible modified features, a post-process is employed to ensure the final calibration results (after the refinement) recovering from the effect of the modifications made on the measured features. The procedure 2300 also tries (loops through) all possible sensor candidates whose measured feature positions are used to estimate the initial values of the calibration object physical feature positions and MotionVectorInPhys3D to search for the best result. In step 2320, the procedure 2300 then loops over the sensors that find/recognize all subobject of the calibration object at any pose to perform steps 2330 through 2360 below. In step 2330, the procedure loops over sensors that find/recognize any subobjects of the calibration object at pose 0 to perform steps 2340 through 2360 below. Then, in step 2340, the procedure 2300 conducts a basic initial parameter estimation for the selected sensor that finds/recognizes all subobject(s) (where the term "finding/recognizing" characterizes the state in which a subobject was found/recognized, in other words, "seen") in a range image which was acquired by a sensors, and for the selected sensor that determines the motion vector in accordance with the procedure 2200. In step 2350, the procedure 2300 then calculates the future position prediction error associated with the current estimated initial parameters. Next, in step 2360, the procedure 2300 keeps track of estimated parameters and the sensor-specific feature x, y modification status that resulted in the minimum error over all levels of loops.

Advantageously, the above-described procedure(s) grant the best possible initial parameter estimation that results in the minimum feature predication error for given measured feature positions. They ensure the correct configuration status regarding sensors' acquisition directions and motion direction, which makes the latter refinement process converge on the measured feature position (possibly modified). The procedure(s) also overcome the uncertainty in estimated initial parameter values for a given set of measured feature positions and further lead to deterministic calibration results even if the ordering of calibration scans are changed. Moreover, regardless of each sensor's configuration in acquisition direction and the motion direction, the initial parameter estimation automatically fixes the inconsistency existing among feature positions measured by different sensors, ensuring the field calibration algorithm to reach consensus among the sensors in term of a converged small prediction error. The procedure(s) also enhance the flexibility in the setup/installation of multiple displacement sensors and the motion of moving the objects to be captured, which reduces the effort in configuring displacement sensors applied to a broad range of applications. Also advantageously, the procedure(s) support calibration of sensors whose captured 3D data (such as range images or point clouds) derived feature positions are represented either left-handed or right-handed due to respective sensors being differently configured.

Illustratively, the system and method employs a Levenberg-Marquardt gradient descent procedure to refine the parameter estimates. According to a further embodiment, the system can (a) normalize the input data so as to condition the input data (b) translate the input positions so that each scan's mean positions are (0,0,0); (c) scale all the input positions so that the standard deviation of the input positions are 1.0; and (d) after renormalizing the data for the gradient descent, undo the translation and upscale the estimated parameters. For robustness, one embodiment can include refining the parameters using numerically computed derivatives (such as Levenberg-Marquardt gradient descent), and a further embodiment can include using different step sizes (for the numerically computed derivative) to increase the probability of arriving at the global solution.

Figure 24:
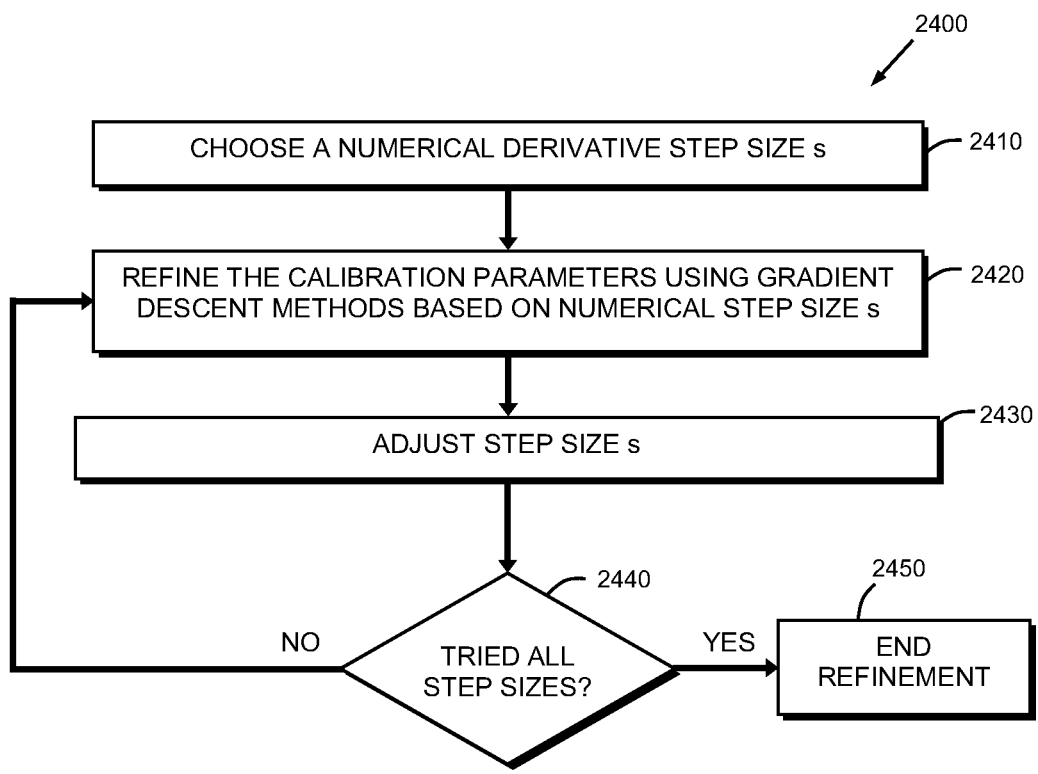
FIG. 24 is a flow diagram showing a gradient descent technique for finding the global solution to calibration parameters by varying the step size used to compute numerical derivatives (e.g. for Levenberg-Marquardt), for use in the calibration process according to an illustrative embodiment.

With reference to FIG. 24, a procedure 2400 can be employed to increase the probability of the gradient descent technique finding the global solution by varying the step size used to compute numerical derivatives (for Levenberg-Marquardt). In step 2410, a numerical derivative step size s is selected. The calibration parameters are then refined in step 2420 using gradient descent techniques based on the numerical step s. Then, in step 2430 the step size s is adjusted. Steps 2410-2430 are repeated for different step sizes (via decision step 2440) until all step sizes have been exhausted (note this can be a user-defined or pre-programmed value). The refinement is then complete (step 2450).

Figure 25:
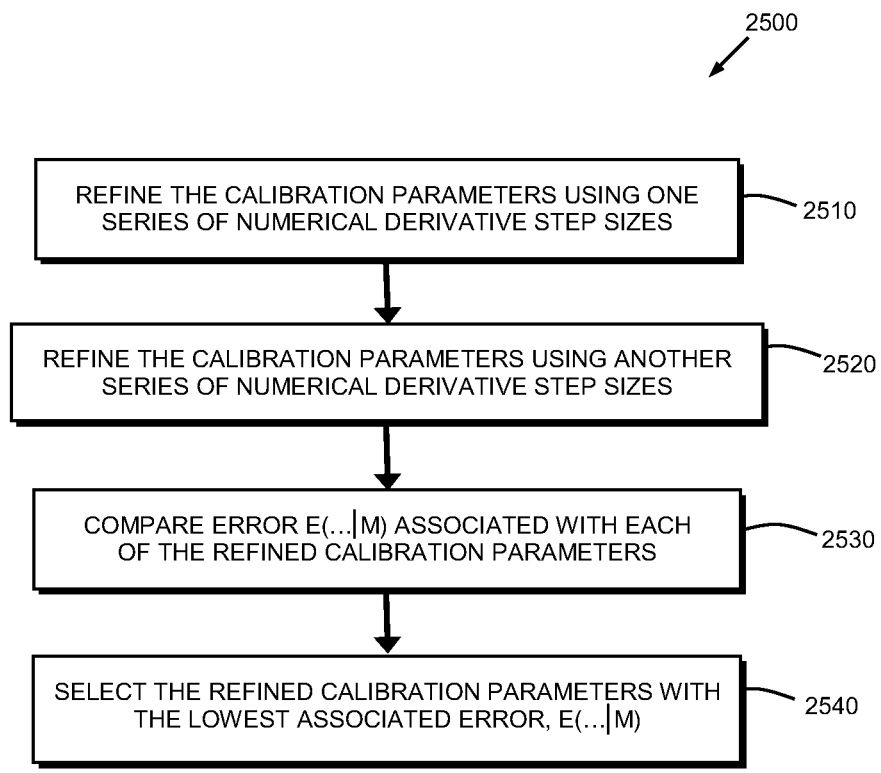
FIG. 25 is a flow diagram of a procedure for increasing robustness of the technique of FIG. 24 by applying multiple sets of numerical derivative step sizes according to an embodiment.

For robustness, an embodiment can include a procedure (2500 in FIG. 25) that try a plurality (at least two) series' of numerical derivative step sizes (steps 2510 and 2520) and compare the final parameter estimates based on their respective E( . . . |M) errors (step 2530), selecting the parameter estimate with the lowest corresponding E( . . . |M) error (step 2540). In an alternate embodiment in which the 3D object feature positions are specified, a similar procedure can be employed, which compares parameters inducing E( . . . |M,F) errors to select the parameter estimate with the lowest corresponding E( . . . |M,F) error.

VII. Grayscale Rendering

With reference again to the generalized calibration procedure 600 of FIG. 6, the system can optionally employ the calibration to induce physically accurate measurements of the object under inspection (step 660). One use for such measurements is to generate a rendered, physically accurate 3D (range) image that can include a grayscale representation of the object's 3D surface features. The rendering routine can take as input 3D point data, 3D faceted data, 3D (range) images (which characterize the Z height at each (i,j) pixel location), or peak data, the native output of a displacement sensor before it has been transformed into physical coordinates. There are certain advantages to inputting the peak data, including minimizing the number of rendering steps because each rendering involves quantization (and, thereby, introduces quantization error), and that peak data allows a geometric heuristic to be employed which intentionally disregards artificial features. In an embodiment, four-way connected neighbors are decomposed into two triangular facets by characterized by the (e.g.) upper left, upper right, and lower left vertices and the upper right, lower left, and lower right vertices.

A description of an illustrative procedure for rendering physically accurate 3D (range) images using calibration data is now provided. By way of background, machine vision systems are often adapted to process 2D images, and so it is sometimes useful to generate calibrated 3D (range) images (with physically accurate coordinates and Z measurements). Rendering field calibrated data includes combining the measured sensor data with the field calibration to generate field calibrated data, and then rendering 3D images from such data. For individual rendered range images, the user specifies a destination client coordinate space—for example, the destination client coordinate space could be Sensor3DSensor=i, which is aligned to particular sensor i and is a physically accurate coordinate space. The user also specifies a desired pixel size (in x and y) and a desired z level quantization. In an alternate embodiment, the user also specifies a desired gray level quantization. The 3D (range) image rendering function can automatically determine the extents of the 3D image based on the measured 3D data, the destination 3D image coordinate space, and the 3D image pixel size and quantization. Alternatively, the user can specify the desired extents of the 3D image via (e.g.) the GUI. When multiple sensors are used, it can be advantageous to render all of their individual 3D (range) images into the same coordinate space, because this simplifies the task of merging the individual 3D images into a composite range image (because, then, the system is only required to process corresponding pel values and can avoid performing any resampling in the merging step).

Figure 26:
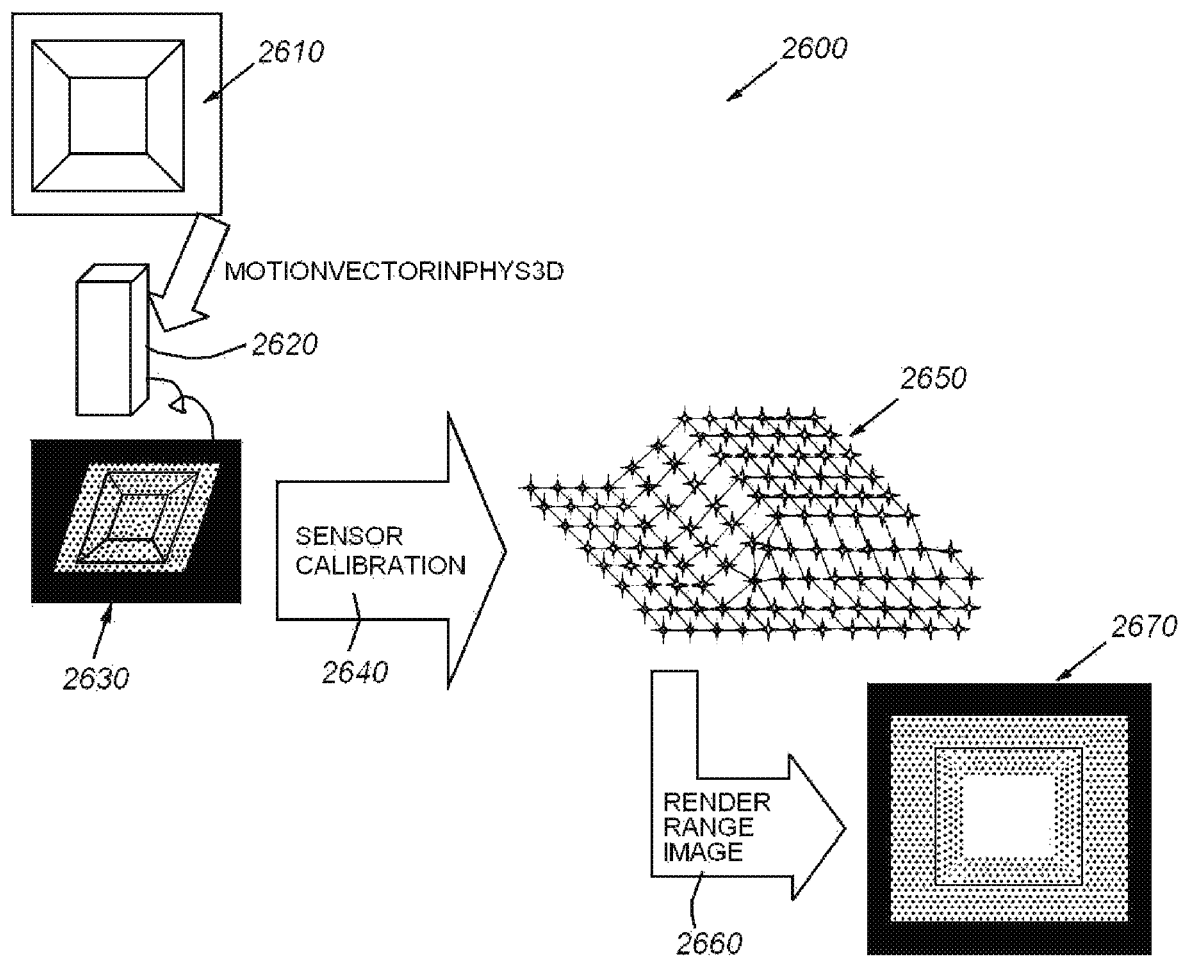
FIG. 26 is a diagram of a generalized procedure for applying 3D calibration to measurements from a 3D sensor so as to produce physically accurate 3D data, and then rendering a 3D (range) image from those physically accurate 3D data.

Reference is now made to FIG. 26, which shows a diagram of a process 2600 for applying a calibration generated in accordance with the illustrative system and method to measurements from one or more 3D sensor(s) so as to produce physically accurate 3D data, and then rendering a 3D (range) image from those physically accurate 3D data. As shown, the physical object 2610 is imaged (where the term "imaged" characterizes that the object has been measured) by the sensor(s) 2620 into an image 2630. The above-described calibration procedure 2640 is performed (the term "sensor calibration" can refer to the above-described calibration procedure). As described above, this generates 3D data 2650. The data is then used to render (2660) an accurate rendering 2670 of the original 3D surface 2610. In an embodiment, a 3D image is generated by facetizing the 3D data, and then sampling that facetization along lines (along the Z axis of the desired range image) through the centers of the pels of the desired range image.

Figure 27:
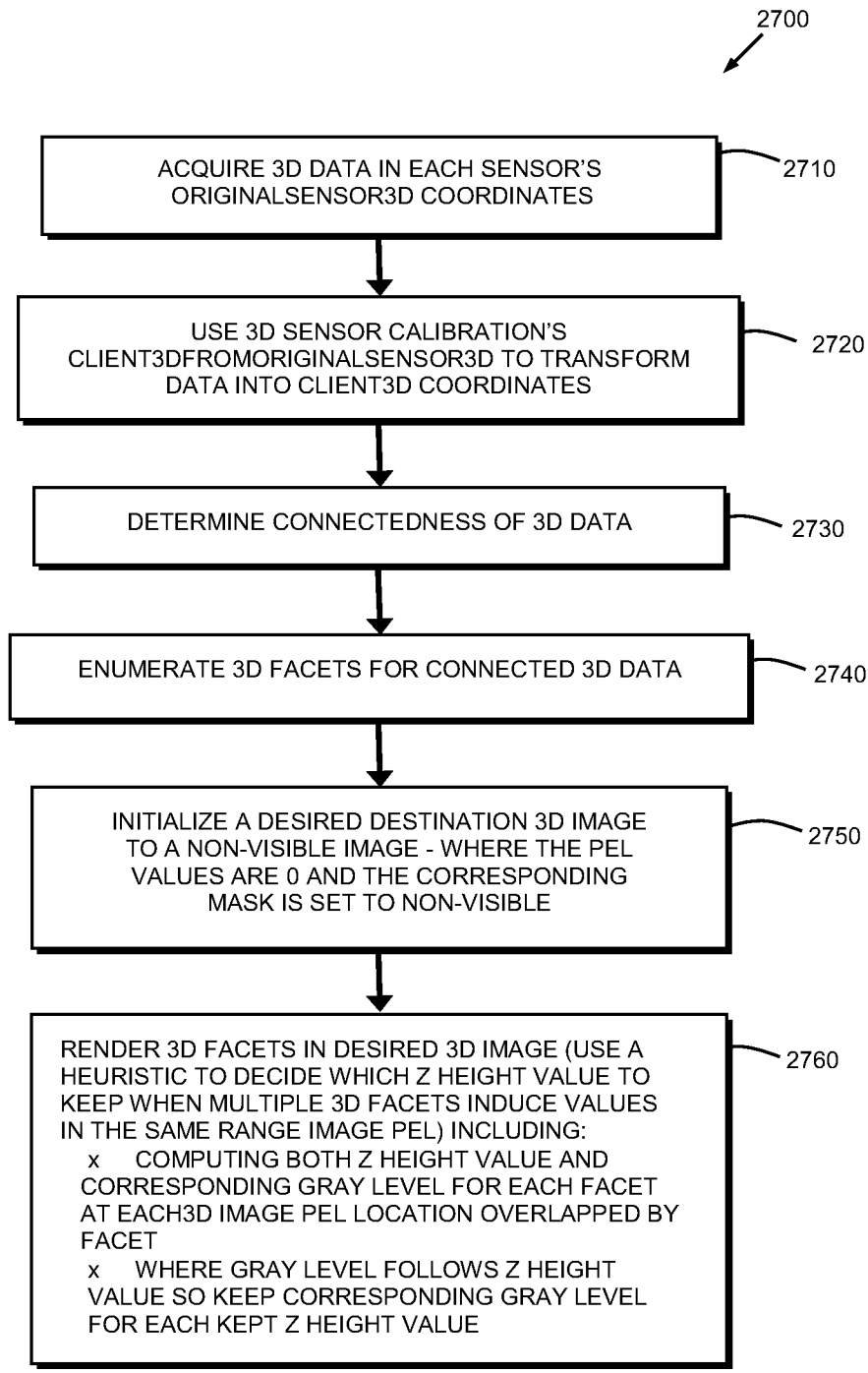
FIG. 27 is a flow diagram showing a procedure for rendering an accurate 3D grayscale image of an object using the calibration generated in accordance with the illustrative embodiment.

With further reference to the procedure 2700 of FIG. 27, each sensor acquires 3D data in the sensor's OriginalSensor3D coordinates (step 2710). Then, in step 2720 the procedure 2700 employs the 3D sensor calibration's Client3DFromOriginalSensor3D to transform the 3D data into Client3D coordinates. In an embodiment, the user specifies a Phys3DFromClient3D transform, which is composed with the computed OriginalSensor3DFromPhys3D transform (for each sensor) to derive the Client3DFromOriginalSensor3D transform for each sensor. In an another embodiment, the user specifies a Client3DFromOriginalSensorXZ3D transform for one of the sensors, and the computed MotionVectorInPhys3D vector and the computed OriginalSensorXZ3DFromPhys3D transforms are used to derive the Client3DFromOriginalSensor3D transform for each sensor. Other user-provided transforms for specifying the desired range image coordinates should be clear to those of skill. Step 2730 then determines the connectedness of the 3D data, and step 2740 enumerates 3D facets for the connected 3D data. Then, in step 2750, a desired destination 3D (range) image is initialized to a non-visible image. In this case, the pel values are set to 0 and the corresponding mask is set to non-visible. Next, in step 2760, the procedure 2700 renders 3D facets in the desired 3D (range) image. Note, in an embodiment, rendering 3D facets involves computing both the Z height value and the corresponding gray level value for each facet at each range image pel location that the facet overlaps. In an embodiment, the Z height value and gray level value are interpolated at the (x,y) center of each range pel. In another embodiment. In an another embodiment, the Z height value and gray level value are computed as the weighted average Z height value and gray level of the portion of the facet overlapping the (x,y) extents of the range pel. Illustratively, a heuristic can be employed to decide which Z height value to retain when multiple 3D facets induce values in the same 3D (range) image pel. In another embodiment, Z values (where the simplified terms "Z" and "Z value" refer to the Z height value) corresponding to multiple 3D facets in the same 3D (range) image pel are averaged. In one embodiment, the gray level value follows the Z value—for whichever Z value is retained, the corresponding gray level value is likewise retained (where the term "kept" is also used to characterize the step of retaining the data value(s) for further processing). In an alternate embodiment, the gray level values corresponding to the same 3D (range) image pel are averaged. Such heuristics, facetization and other techniques used in the rendering process described above should be clear to those of skill. Notably, the use of calibration data allows multiple 3D (e.g. displacement) sensors to be used to efficiently and accurately render grayscale images of a 3D surface at both calibration time and runtime.

VIII. Two-Sided Calibration Target

Figure 28:
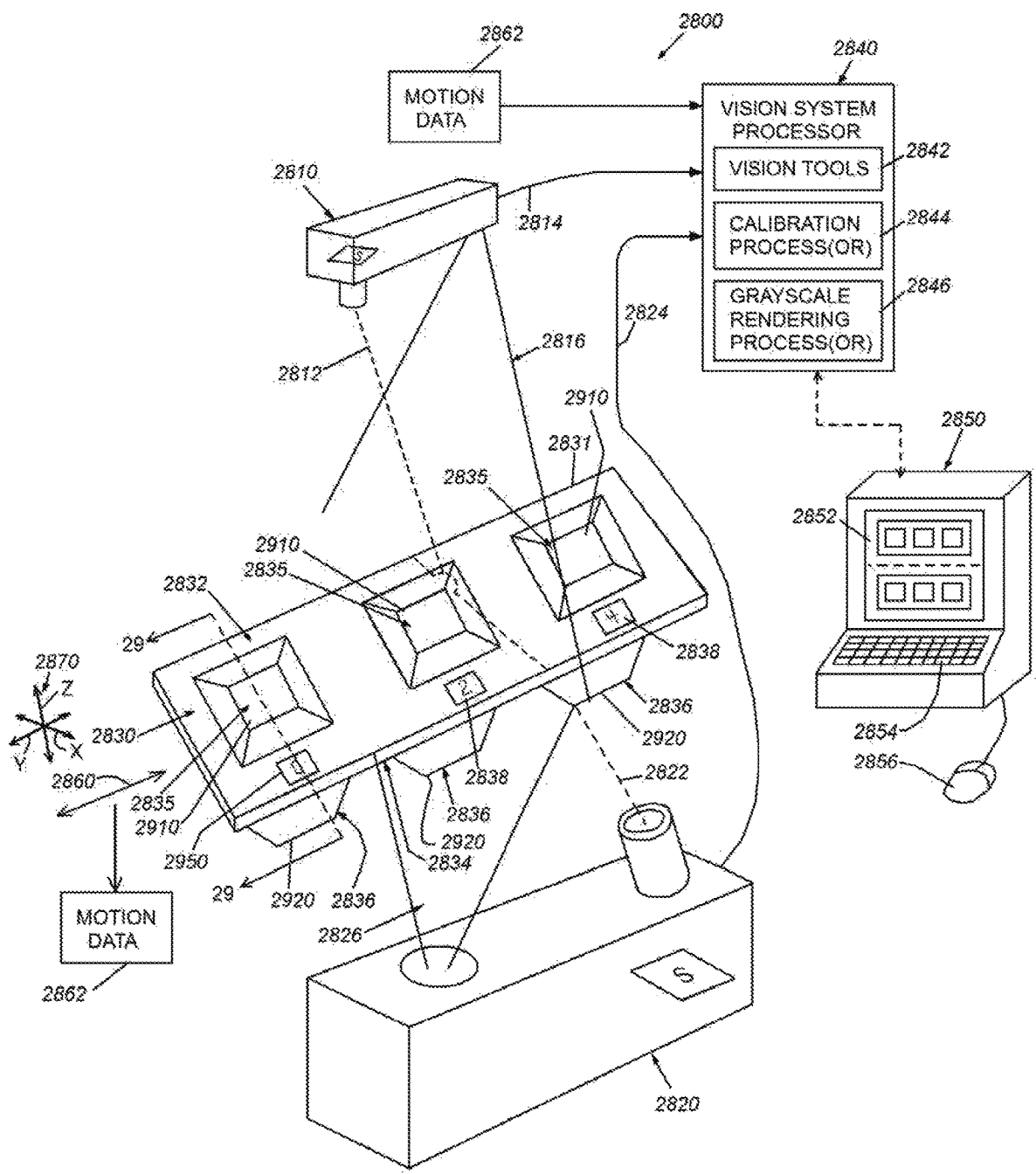
FIG. 28 is a diagram of an exemplary vision system arrangement employing a plurality of 3D sensors oriented to image opposing sides (e.g. above and below) an object in a scene (e.g. a calibration object as shown and/or runtime object under inspection) according to an embodiment.

FIG. 28 depicts a vision system 2800 having at least two vision system camera assemblies 2810 and 2820, located to image opposing sides of a scene—i.e. located so that associated optical axes 2812 and 2822 are arranged at (e.g.) 180-degrees with respect to each other (or another relative angle—for example 160 degrees-220 degrees). As described generally above, each sensor 2810 and 2820 transmits image data from an image sensor S via an appropriate wired or wireless link 2814 and 2824, respectively, to a vision system processor 2840 that can be structurally and/or functionally similar to the processor 170 (FIG. 1) described above. The image data in this example, consists of laser line information, generated by a respective laser "fan" 2816 and 2826 of sensors 2810 and 2820, on the each of opposing surfaces 2832 and 2834 of an object 2830 in the scene. In this example, the object 2830 is a novel two-sided calibration objector target described in detail below. The processor 2840 can be part of a standalone PC 2850 as shown, or any other general purpose of custom computing device, with appropriate user interface controls (e.g. display and/or touch-screen 2852, keyboard 2854 and mouse 2856. The processor 2840 can comprise various functional modules and/or processes/processors, including, but not limited to, vision tools 2842, a calibration process(or) 2844, and a grayscale rendering process(or)—all as described generally above. The calibration target 2830 and/or sensors 2810, 2820 can be in relative motion (double-arrow 2860) to obtain a full 3D profile of the object surface. Motion can be provided by a conveyor, motion stage, robot manipulator or any other acceptable conveyance device. Motion data 2862 (via an encoder or other mechanism) can be transmitted to the processor 2840 for use in registering the image data (consisting of a series of lines in respective image frames) along (e.g. the y-axis) of a coordinate system 2870.

Note that the type and number of 3D sensors employed herein are highly variable. In alternate embodiments, 3D sensors can be based upon stereoscopic cameras, LIDAR, time-of-flight sensing, or any other technology that provides the desired image resolution and accuracy.

The calibration target 2830 is a one-piece, unitary or integral structure that includes a base 2831, which is generally defined by the opposing, substantially planar surfaces 2832, 2834. The base 2831 surrounds a series of three-dimensional elements that, in this example, comprise one or more frusta 2835 and 2836, on each opposing face 2832, 2834, respectively, as described generally above. With further reference to the cross section of the object 2830, shown in FIG. 29, the frustum/frusta 2835 and 2836 on each side of the base 2831 define a flat top surface 2910 and 2920, respectively. This surface defines at least four corners 2932 and 2942 with respect to the angled side walls 2930 and 2940. These corners provide some of the features that are resolved in the calibration process described generally above.

Notably, the calibration target 2830 can be constructed from any acceptable material with dimensional stability at normal environmental temperatures—e.g. between 20 and 120 degrees Fahrenheit. By way of non-limiting example, such materials can include aluminum, titanium, steel, magnesium, nickel and/or associated alloys thereof, glass, certain machineable polymers and/or composites, and/or any other material that can be subjected to the processes of this description. The structure can be formed, for example, by molding, casting, machining of a billet. It can be unitary or integral—for example with separate frusta attached to a base by an appropriate attachment mechanism (e.g. welding, adhesives, rivets, screws, snap-fit, etc.). Notably, the base 2831 includes printed, adhered or unitarily formed (stamped, molded, cast, etc.) indicia 2950 and 2952, located adjacent to each of the frusta 2835 and 2836. Each indicia is discrete and unique. That is, the indicia on each of opposing faces 2832 and 2834 of the target 2830 is a discrete symbol—for example, sequential letters, numbers, etc. in the Arabic, Roman, Latin, Greek, etc. alphanumeric system. In the depicted, exemplary embodiment, the first two, opposing indicia 2950 and 2952 are raised numbers (e.g. 0 and 1, respectively). These indicia are unitarily formed into the base 2831. In an embodiment, the remaining indicia 2838 on each side of the base 2831 can be applied decals (either flat-printed or raised-letter) with appropriate, discrete values. These decals can be varied as desired by the user. As described above, the decals allow the user to associate various frusta with images acquired by the camera assemblies and register the images of the target within a common (global) coordinate system-which can be a 360-degree coordinate system in this embodiment.

Figure 29:
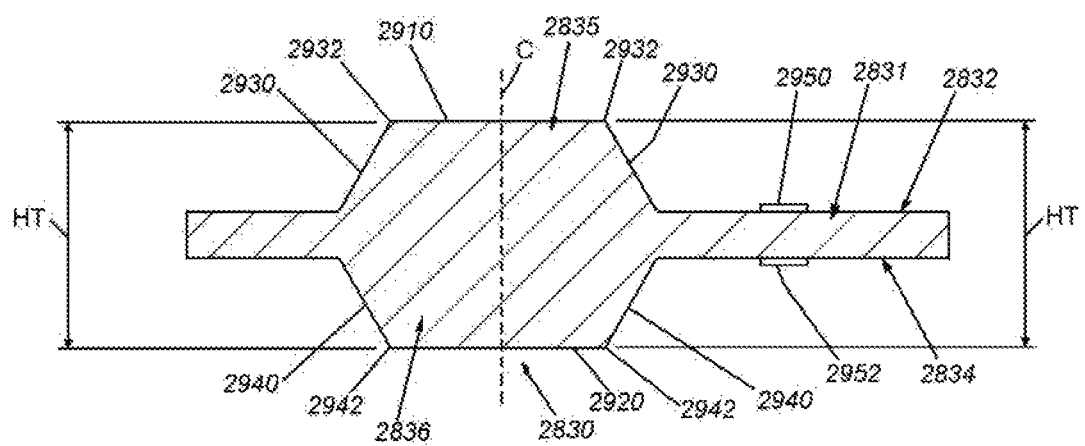
FIG. 29 is a side cross section of the exemplary two-sided calibration object for use in the vision system, taken along line 29-29 of FIG. 28

With particular reference to the cross section of FIG. 29, the calibration target 2830, the target can be formed in a manner that is relatively inaccurate, but that resolves the z-axis calibration between opposing camera assemblies by providing highly accurately parallel opposing frusta tops 2910 and 2920. The height dimension HT between opposing frusta tops 2910 and 2920 is constant and accurately known. In this embodiment, the opposing frusta (or other three-dimensional calibration elements) 2835 and 2836 are relatively similar or identical in size and shape and centered with respect to a center line C that passes perpendicularly through the base plane(s). In alternate embodiments, the three dimensional calibration elements on opposing sides can vary with respect to each other and/or be misaligned relative to the center line C.

Figure 30:
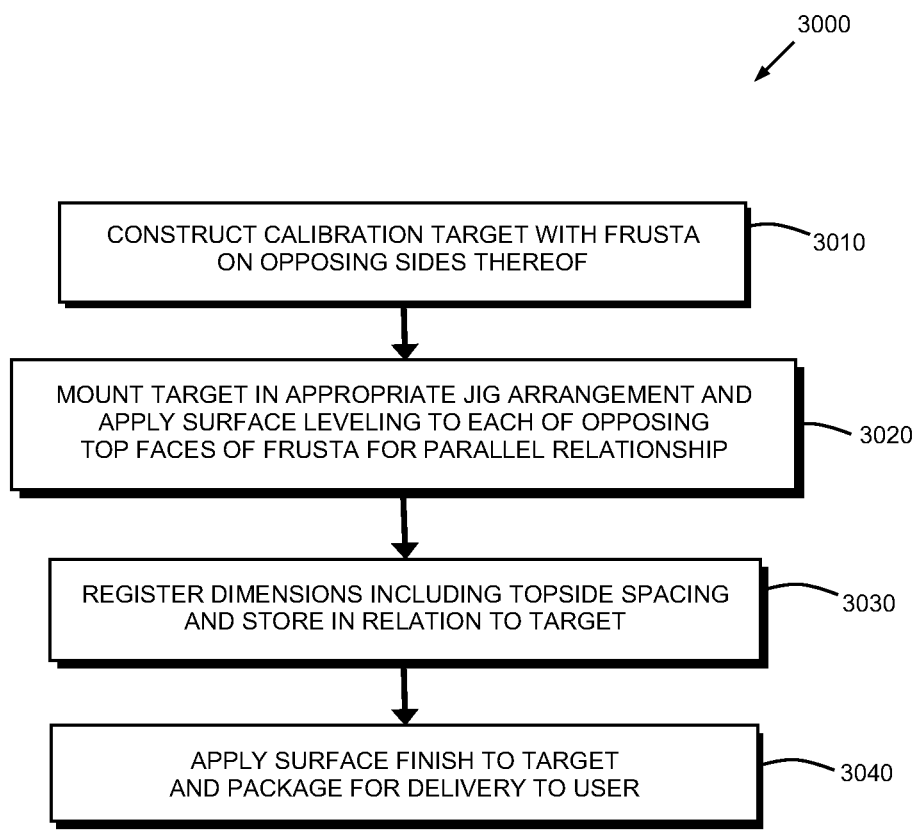
FIG. 30 is a flow diagram of an exemplary procedure for constructing a calibration target for use in calibrating the vision system of FIG. 28.

FIG. 30 describes a procedure 3000 for constructing a calibration target (e.g. target 2830) in accordance with an exemplary embodiment. In step 3010, the target is initially formed by an appropriate manufacturing technique, including, but not limited to molding, casting machining, etc. The target can be a unitary structure (i.e. formed from a single piece of material) or can be integral (i.e. formed from separate pieces of material that are joined together to make the final target structure). One or more indicia can be formed in conjunction with step 3010. In step 3020 the formed target is mounted in an appropriate machining device-generally known to those of skill, and at least one top surface is used as a reference to register the device in (e.g. a clamping arrangement and/or a purpose made jig) of the machining device. For example, the machining device can be a CNC planer or surface grinder with high accuracy (for example-micron-level accuracy). The device is then operated to plane or grind the exposed top surface into a parallel orientation of known height with respect to the registered, opposing top surface. Since the CNC device can be programmed to achieve a given height value, the thickness (along the z-axis) between opposing top surfaces is known and repeatable. This value can be provided to the user as a calibration parameter (step 3030). A non-deforming surface finish can then be applied to the target in step 3040 on some or all of the 3D element surfaces (e.g. frusta surfaces) and base to ensure accurate reflection of illumination light (e.g. a laser line of a DS sensor) to the camera assembly, thereby providing measureable and repeatable features to the vision system. Such surface finishes can include sandblasting, bead blasting, chemical etching, chemical coating, anodizing, bluing, etc. Note that prior to machining in step 3020, the opposing top surface, used for registration can be initially planed, ground, or otherwise rendered substantially planar/flat so as to ensure consistent dimensions and surface characteristics on each side of the target.

Figure 31:
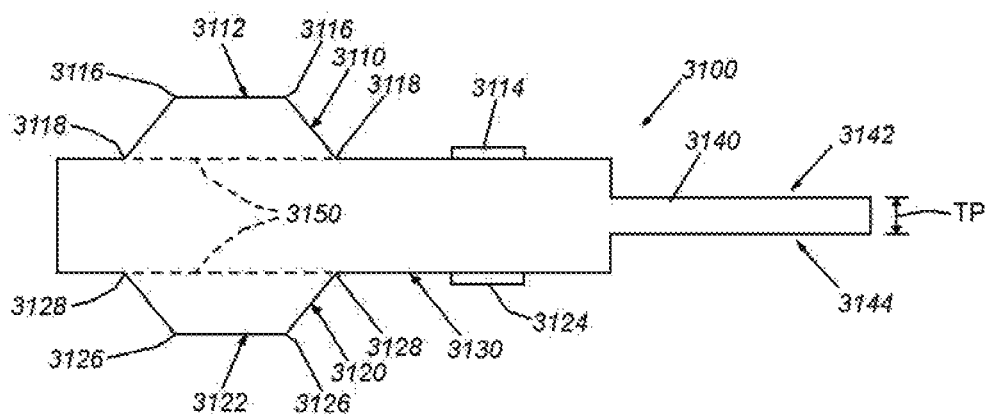
FIG. 31 is a side view of a two-sided calibration target according to an alternate embodiment in which a flange have a predetermined thickness and parallelism is appended to the target base for use in calibrating a 3D vision system as shown generally in FIG. 28.

More generally, the calibration target can be fabricated in a manner in which the two opposing 3D elements are not precise with respect to each other, but that is finished, by an appropriate machining technique to include two opposing parallel surfaces that are dimensionally precise, parallel surfaces (i.e. defining z-spaced-apart parallel planes) where the z-axis spacing is known via the machine tool's setting and/or subsequent metrology operations (e.g. use of a caliper, micrometer, coordinate measuring machine (CMM), etc.). By way of non-limiting example, reference is made to a FIG. 31, which shows a calibration target 3100 according to a further embodiment. The target includes aligned 3D elements 3110 and 3120 (e.g. frusta) on each of opposing sides of the base 3130. One or more 3D elements can be provided on each side as described above. The tops 3112 and 3122 of each respective 3D element can be flat and relatively parallel with respect to the other, opposing element. These surfaces are not considered highly accurate, parallel or at known spacing in this embodiment. The base 3130 can also include indicia 3114 and 3124 on each side thereof-which can be unitarily formed or subsequently applied. The base further includes an extension flange or plate 3140 with opposing surfaces 3142 and 3144. These surfaces 3142 and 3144 are machined (e.g. ground, planed, etc.) using the techniques described above, and/or other techniques, such as precision milling of each side in a CNC milling machine, to define a highly planar and parallel relationship therebetween at an accurate (e.g. within microns) z-axis spacing TP therebetween. Thus, in operation, the vision system employs the 3D corner positions 3116, 3118, 3126 and 3128 of each respective element (frustum) 3112 and 3114 to calibrate the two (or more) sensors in x and y, and establishes absolute z based upon the thickness TP of the flange 3140. The surface of the completed target 3100 can be selectively, or entirely finished in a manner that enhances optical properties (e.g. sand/bead blasting, anodizing, etc.) as described above.

In yet another exemplary embodiment, illustrated by the optional dashed lines 3150, the target can be fabricated as a composite calibration object in which each of the 3D elements (e.g. frusta) 3110 and 3120) are constructed separately and then adhered to predetermined locations on the base 3130 using an appropriate attachment mechanism known to those of skill including, but not limited to, adhesives, welding, braising, fasteners, friction fit, etc. The base can include the above-described accurate and parallel flange/plate 3140, or the base can omit such a flange and is, itself be formed accurately as a precision thickness plate using appropriate machining (or other formation) techniques prior to attachment of the 3D elements to the opposing surfaces thereof.

Figure 32:
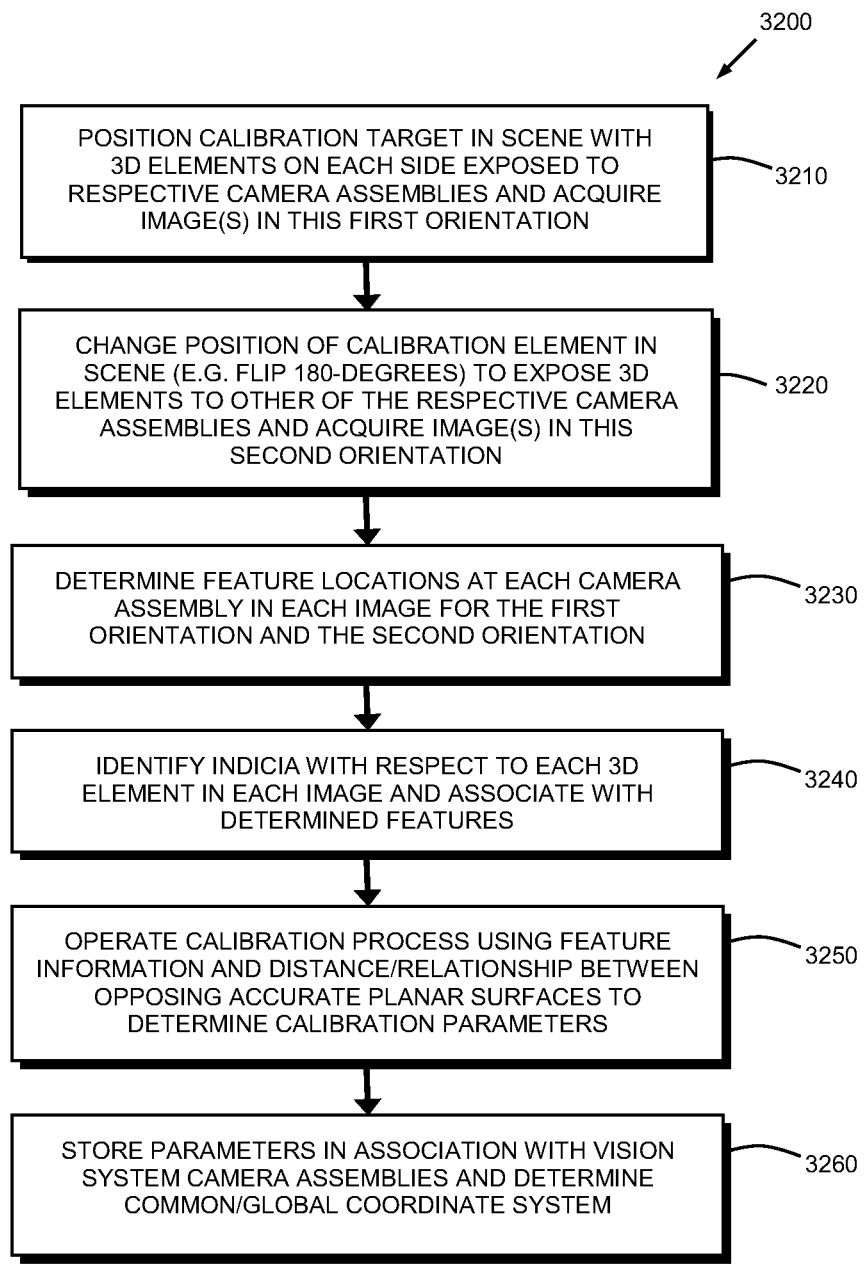
FIG. 32 is a flow diagram of an exemplary procedure for calibrating the vision system of FIG. 28 using the calibration target according to the embodiment.

Reference is now made to FIG. 32, which shows an overall procedure 3200 for field calibration using a double-sided calibration target constructed in accordance with the above-described embodiments. In steps 3210 and 3220, the two-sided calibration target is located in the scene in each of two (e.g. 180-degree opposed/flipped) orientations—for example a right-side up and upside-down configuration. One or more images are acquired by the camera assemblies above and below the target in each of these orientations. In this manner, all camera assemblies image both sides of the target. Additional orientations can also be presented to the camera assemblies and imaged (e.g. 45-degree angles, etc.) to ensure all features are fully acquired. In step 3230, the acquired images are subjected to vision system tools that extract features from the images (edges, corners, etc. and derive local coordinates for the features. Among the identified features are the unique indicia/identifiers that allow the vision system to associate the features with a given fixed location on the calibration target (on a particular side thereof), according to step 3240. Note that an image sensor need not view all of the frustum features during a single scan (see also step 810 described above) because, if the two-sided frustum features are assembled such that odd numbered frustums (as indicated by the adjacent indicia) are located on opposite sides of the base from even numbered frustums, and odd/even pairs are oriented similarly (e.g. along a common perpendicular axis), then the above-described step 810 reduces to a single sensor only needing to view one of each pair of odd/even frustum features during a single scan. That is, the pose corresponding to the odd/even frustum can be extrapolated from the pose of its odd/even companion on the opposing side.

The calibration procedure can determine all the corner positions on both sides of the target from the presentation of the target at multiple orientations. Advantageously, that the 3D calibration can be accurate to the limits of vision system accuracy using this approach. This calibration process is operated in step 3250 and results are stored in step 3260 for use in subsequent (e.g.) runtime operations. Having flat, parallel faces in a known location (e.g. at the top of each opposing frustum) of a precise thickness has the advantage in that the user is free of a requirement to input any values to the system during calibration. Illustratively, those values are known based on the frustum size, and can be saved in a look-up table within the calibration process. By way of example, a frustum size TS5 defines a thickness A millimeters, a frustum size TS10 defines a thickness B millimeters, etc. Alternatively, a procedure can be provided to calibrate a mocked-up two-sided calibration target and a known thickness object, but the user would typically be required to specify the location of the flat faces and specify the known thickness.

More particularly, the calibration of vision system in the x and y coordinates can follow the above-described procedure as provided generally, inter alia, with reference to FIGS. 1-27 above. The present two-sided field calibration procedure differs in that an additional error term/component is added corresponding to the square of the distance between the estimated distance between the parallel features (at a particular nominal through point), and the expected distance between the parallel features (i.e. thickness between opposing frusta tops flange plate surfaces, etc.). Note that in an embodiment where a flange is used, the frustum feature detector is augmented to measure the flange feature so that that information is also provided to the field calibration procedure. The feature detector can measure the 3D position of the center point on the flange, and the distance between that center point and the opposite side of the flange can be used (and/or averaged with the distance from the center point on the opposite side). Alternatively, where the opposing frustum tops are precisely parallel, the center point of each top can be used. A further alternative is to incorporate the flange or frustum top information into the field calibration error function by analyzing all of (or a subset of) the individual 3D points, and estimate the unit length orientation vector between the two parallel faces of the flange/tops, and then scale that by the known thickness of the flange or opposing tops, and map the individual points to a single plane (based on the sensor poses). The plane-fit residual of a single fitted plane is then computed. In yet another alternative the procedure (s) refrains from analyzing all of the points; and instead, (b) computes sufficient statistics based on the point sets; (c) mathematically updates the sufficient statistics according to the direction vector, and then (d) again computes the plane-fit residual of the union of the points.

As part of the specific calibration procedure using a two-sided target the following additional terms can be added to the section II. Definitions above:

| | |
|---|---|
| Measured Planar Feature<br>P$_{pose, sensor, parallelPlanarFeaturePair, topOrBottom}$ | The measured plane and nominal point of a top or bottom feature of a parallel planar feature pair (measurements are in OriginalSensor3D$_{sensor-i}$) |
| Measured Planar Feature Plane<br>PPlane$_{pose, sensor, parallelPlanarFeaturePair, topOrBottom}$ | The measured plane of a top or bottom feature of a parallel planar feature pair (measurements are in OriginalSensor3D$_{sensor-i}$) |
| Measured Planar Feature Point<br>PPoint$_{pose, sensor, parallelPlanarFeaturePair, topOrBottom}$ | The measured nominal point of a top or bottom feature of a parallel planar feature pair (measurements are in OriginalSensor3D$_{sensor-i}$) |
| ParallelPlanarFeatureDistance$_{parallelplanarFeaturePair}$ | The specified distance between the parallel planar features of parallelPlanarFeaturePair |

Figure 33:
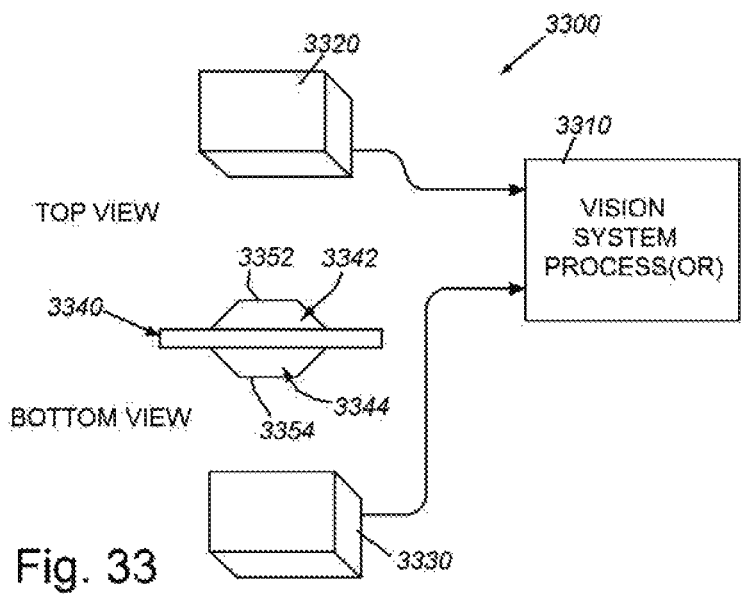
FIG. 33 is a diagram of the arrangement of 3D sensors above and below an exemplary two-sided calibration target having precision-formed, parallel, planar top faces.
Figure 34:
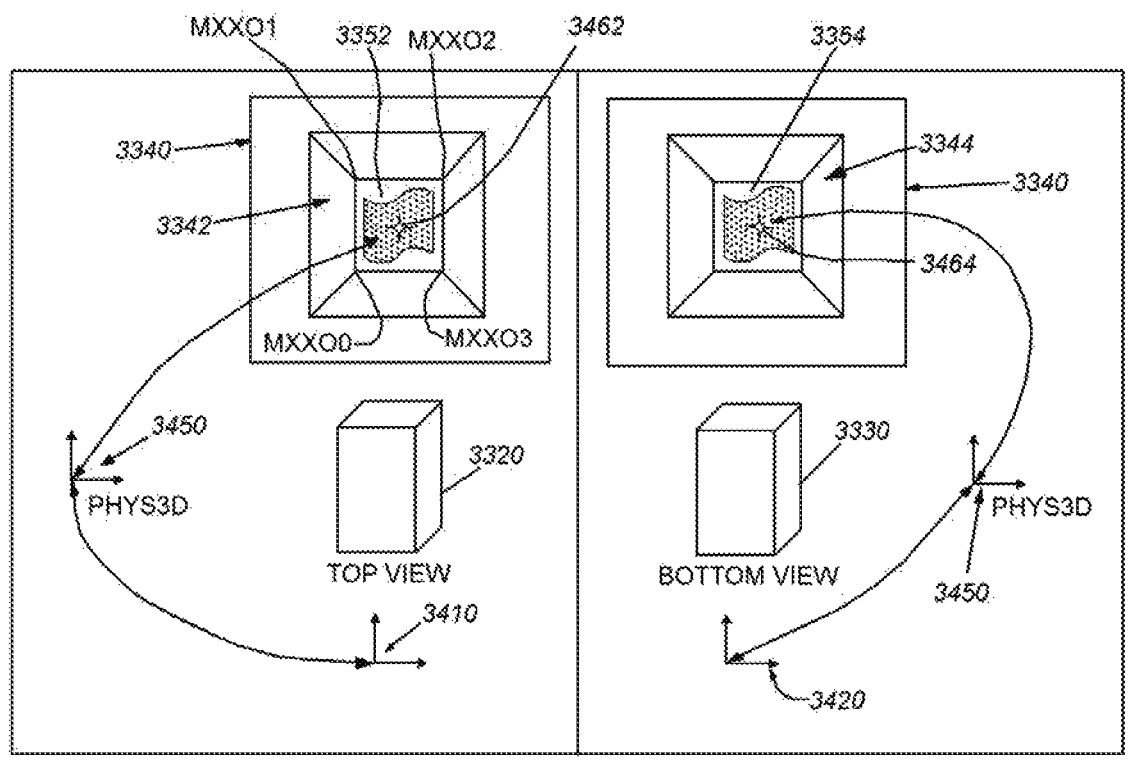
FIG. 34 is a diagram showing the two-sided calibration target with associated features (e.g. corners) of the top and bottom frusta defined by intersecting planes in a physical 3D coordinate space, transformed to the local (i.e. top and bottom) sensors' image coordinate space according to an embodiment of the calibration process.

FIG. 33 shows a side view of a vision system 3300 and associated vision system processor 3310 in accordance with an embodiment, in which a pair of camera assemblies 3320 and 3330 are positioned to image the top frustum 3342 and bottom frustum 3344 of a two-sided calibration target 3340. This target 3340 includes precision machined top surfaces 3352 and 3354 for establishing the z-axis distance within the camera system. As shown in FIG. 34, each camera 3320 and 3330 views the respective frustum 3342 and 3344 in a local coordinate system 3410 and 3420 that is translated relative to the Phys3D coordinate space 3450. Note that the center point 3462 and 3464 of each frusta top 3352 and 3354 is shown and this is established by the procedure for use in calibrating the camera system. The procedures for calibrating the camera system relative to the Phys3D coordinate space in this two-sided embodiment are described further below, and similar steps to those described above are repeated to aid the reader's understanding.

Reference is again made to the description of FIG. 10, by way of background in which the frusta and cameras are side-by-side. However, the principles hereinbelow also apply to the top and bottom frusta of the present embodiment in which at least two of the depicted sensors would reside in top and bottom orientations. The sensors 110, 112, 114 are each shown with associated, respective coordinate space Original Sensor 3D$_{Sensor=0}$, Original Sensor 3D$_{Sensor=1}$, Original Sensor 3D$_{Sensor=2}$ (i.e. axes 1010, 1012, 1014). The object 830 includes exemplary feature calibration object physical feature positions in Object3D space (e.g. corners on each subobject (840, 842, and 844)), F$_{00}$-F$_{07}$ for subobject 840, F$_{10}$-F$_{17}$ for subobject 842 and F20-F27 for subobject 844. These are transformed (dashed arrow 1040) for each sensor as shown into the respective measured feature positions (e.g.) M$_{0100}$-M$_{0107}$, M$_{0110}$-M$_{0117}$ and M$_{0120}$-M$_{0127}$. In an embodiment, the feature detection tool/process checks that the same patches of the subobject are used in measuring the feature positions. The feature detection process estimates the portions of the 3D (range) image that correspond to each face of the measured frusta. Based on each face's expected region in the range image, the feature detection process counts the number of range image pels which were actually used to estimate the plane of that face. The feature detection process then computes the proportion of range image pels used to measure each face, which is equal to the number of range image pels used to estimate a plane divided by the number of range image pels in the region corresponding to that face. That proportion of the expected measurement regions which are used to estimate each plane of the frustum is compared to a proportion tolerance so that only almost completely measured features are used for the calibration computation. This occurs so that the 3D sensor calibration is invariant to the planarity/nonplanarity of each subobject. Such invariance is achieved because the same planar regions, and thereby 3D feature points, are used to measure each frustum plane during all scans of the displacement sensor calibration. In a further embodiment, the region measured for each subobject ignores the corners of the bottom feature when computing the proportion-used ratio for the goal of ignoring the corners is that these corners are the most likely to extend outside the associated 3D sensor's measurement region (and therefore cause the illustrative tolerance check to fail). It is desirable to achieve measurement consistency, which can be more effectively attained by omitting certain 3D image pels in the process.

In the present two-sided (top and bottom) calibration embodiment, in which the frusta tops are precision formed, the feature detector also makes measurements of one or more specific regions for subobjects—the regions specified with respect to measured subobject features. In a further embodiment, the measurements can include a plane estimate computed by fitting a plane (i.e. the plane of each frusta top 3352 and 3354) to the data within a region, and an average position of the data within the region. In a further embodiment, the region can be specified as 3D volume which has been registered to a nominal position with respect to the measured subobject features. In yet a further embodiment, the measurements can be plane fit to the measured subobject features (e.g. corners) Mxx00, Mxx01, Mxx02, Mxx03, and the average position will be the average of the measured subobject features Mxx00, Mxx01, Mxx02, Mxx03 (see FIG. 34 and also refer to FIG. 10 above).

In a further embodiment, the measured planes and positions are used in conjunction with the specified distance between specific planes to determine the relative positions of the sensors.

With reference to the definitions above, the measured feature positions M$_{scan,sensor,subobject,feature}$ are measured in OriginalSensor3D coordinates. These are the measured feature positions of the calibration subobjects detected by the feature detector for each of 3D sensors for each of the scans.

The system can then compute the displacement sensor calibration (i.e. the "field calibration") for all sensors concurrently by estimating sensor configuration parameters. Based on the given measured feature positions M$_{scan,sensor,subobject,feature}$, the 3D sensor calibration involves estimating the following parameters:

Calibration object physical feature positions F$_{frusta,feature}$
Object3DFromPhys3D$_{Pose=p}$
OriginalSensorXZ3DFromPhys3D$_{Sensor=i}$
MotionVectorInPhys3D Note that, for each sensor i, OriginalSensor3DFromPhys3D$_{Sensor=i}$ is computed by combining the x and z axes of OriginalSensorXZ3DFromPhys3D$_{Sensor=i}$ with the y axis of MotionVectorInPhys3D. It follows:

$$Phys3DFromOriginalSensorXZ3D_{Sensor=i} = \begin{bmatrix} a & b & c & | & tx \\ d & e & f & | & ty \\ g & h & i & | & tz \end{bmatrix}$$

$$Phys3DFromOriginalSensorXZ3D_{Sensor=i} * (x, y, z) =$$

$$(a^*x + b^*y + c^*z + tx, d^*x + e^*y + f^*z + ty, g^*x + h^*y + i^*z + tz)$$

$$MotionDirectionInPhys3D = (mx, my, mz)$$

$$Phys3DFromOriginalSensor3D_{Sensor=i} = \begin{bmatrix} a & mx & c & | & tx \\ d & my & f & | & ty \\ g & mz & i & | & tz \end{bmatrix}$$

$$Phys3DFromOriginalSensor3D_{Sensor=i} * (x, y, z) =$$

$$(a^*x + mx^*y + c^*z + tx, d^*x + my^*y + f^*z + ty, g^*x + mz^*y + i^*z + tz)$$

$$OriginalSensorXZ3DFromPhys3D_{Sensor=I} =$$

$$Phys3DFromOriginalSensorXZ3D_{Sensor=i}^{-1}$$

$$OriginalSensor3DFromPhys3D_{Sensor=I} =$$

$$Phys3DFromOriginalSensor3D_{Sensor=i}^{-1}$$

Note, in some embodiments, for selected sensors, where the vector cross product of the selected sensor's x and z coordinate axes has a negative dot product with the measured y-coordinate motion direction, the negative of the MotionDirectionInPhys3D is treated as the y axis for that some sensor's OriginalSensorXZ3D. The calibration object physical feature positions $F_{frusta,feature}$ are characterized by 3D points (x,y,z) for each feature. All but the first three feature positions are characterized by three numbers. Note that the first three feature positions herein illustratively define a canonical coordinate space, and, as such, their values are constrained. The feature points define a canonical coordinate space so that the Phys3D coordinate space constrains the feature pose; otherwise, if the feature positions were unconstrained, then the Phys3D coordinate space would be redundant with respect to the object coordinate space because the Phys3D coordinate space could be traded off against the feature positions. Illustratively, the first three calibration feature vertex positions are constrained (so that there are no redundant degrees of freedom). For example, the first vertex position is (0,0,0). The second vertex position is (x1,0,0) and the third vertex position is (x2,y2,0). In this manner, the calibration feature object illustratively defines a reference plane for further calibration computation steps.

Except for the first pose, p=0, the object poses Object3DFromPhys3D$_{Pose=p}$ each have six degrees of freedom (since they characterize 3D rigid transforms). Each object pose Object3DFromPhys3D$_{Pose=p}$ is characterized by three-value quaternion, and an identifier specifying which quaternion value is 1 (or −1), and a 3D vector characterizing the 3D translation. The first pose is constrained to be the identity transform so that the Phys3D coordinate space is not redundant (where, illustratively, gradient descent solvers have difficulty when there are redundant degrees of freedom). Three value quaternions characterize three of the four quaternion values where the characterization also includes an identifier which says which quaternion is fixed (to either+1 or −1) (As noted above, quaternions are classically characterized by four homogeneous values where $p^2+q^2+r^2+s^2==1$, and more generally, unit quaternions are used to represent 3D rotations, as is well known in the art==1). The use of three quaternion values and an identifier to characterize the 3D rotation is known to those of skills.

The sensor poses OriginalSensorXZ3DFromPhys3D$_{Sensor=I}$ are each characterized by eight (8) values, including an x scale and a y scale, as well as a rigid transform. In an embodiment, each 3D sensor pose OriginalSensorXZ3DFromPhys3DSensor is characterized by a 3D vector for the x axis and a 2D vector for the z axis (where one of the coefficients is derived from the x axis and the two components of the z axis to arrive at a dot-product of 0 and an identifier saying which value the z axis is missing), and the y axis is computed as the unit length cross product of the z axis and the x axis, and the translation is a 3D vector characterized by three numbers. In another embodiment, each 3D sensor pose OriginalSensorXZ3DFromPhys3DSensor is characterized by a three-value quaternion, an identifier specifying which quaternion value is 1 (or −1), a 3D vector characterizing the 3D translation, and two additional numbers (one number for x scale and one number for z scale). In addition, the 3D vector MotionVectorInPhys3D has three independent degrees of freedom, and is characterized by three numbers.

Reference is now also again made to FIG. 11 in the context of the present two-sided calibration embodiment. This figure depicts a diagram 1100 showing the parameters associated with a physical calibration object 830 composed of at least three sub-objects 840, 842, 844.

In an embodiment, the 3D sensor calibration parameters can be estimated via least squares analysis. In an alternate embodiment, the 3D sensor calibration parameters can be estimated via sum of absolute differences. In another embodiment, the 3D sensor calibration parameters are estimated via minimizing the maximum error. Other numerical approximation techniques for estimating calibration parameters should be clear to those of skill. For an embodiment that estimates the calibration using least squares analysis for each measured feature position, the system computes its estimated feature position based on the parameters and then computes the difference between the estimated feature position and the corresponding measured feature position. The system then computes the square of the length of that difference (e.g. by dot-producting that difference vector with itself). All squared differences are then summed to compute a sum-of-squared differences (including contributions from all measured feature positions). This approach assumes that the parameters which induce the minimum sum-of-squares difference is the optimal 3D sensor calibration. Least squares analysis assumes that there is one particular set of parameters which induces the minimum squared error. For an embodiment employing the sum of absolute differences, the total error is computed as the sum of the absolute differences, and the parameters which induce the minimum sum of absolute differences provides an optimal 3D sensor calibration. For an embodiment employing the minimized maximum error, the parameters which induce the minimum maximum discrepancy provide optimal 3D sensor calibration.

An embodiment of the parameter estimation incorporates the difference between specified distances between parallel planar features and the corresponding measured distances between planar features. One embodiment measures the distance between both faces of a parallel planar feature pair are observed during the same pose. One embodiment incorporates at least one such distance measurement from the data set; another embodiment incorporates all such distance measurements from the data set. One embodiment computes the distances between measured planes as the average of two distances—the former distance being the distance between a nominal point on the first plane and the estimated second plane, and the latter distance being the distance between a nominal point on the second plane and the estimated first plane. One embodiment which estimates the parameters using least squares analysis incorporates the sum of the squares of the differences between the measured parallel planar distance and the specified parallel planar distances. One embodiment which estimates the parameters using minimum maximum discrepancy incorporates the sum of the absolute values of the differences between the measured parallel planar distance and the specified parallel planar distances.

Least squares analysis characterizes the sum squared error by an error function of the parameters given the measured feature points i.e., $E(\ldots |M)=E$(Calibration object physical feature positions $F_{frusta,feature}$ [0 . . . X1], Object3DFromPhys3D$_{Pose=p}$,[0 . . . X2], OriginalSensorXZ3DFromPhys3D$_{Sensor=I}$ [0 . . . X3], MotionVectorInPhys3D|M$_{scan,sensor,subobject,feature}$) (the nomenclature [0 . . . num X] signifies that the error function includes multiple instances of each set of variables—one for each of the unknowns and the nomenclature "|M" signifies that the error function is a function of the measured features, M, but those measurements are not variables). Iterative methods are used to find the parameters which minimize $E(\ldots |M)$. The parameters which induce the minimum error characterizes the 3D sensor calibration.

As described above in FIG. 12, a basic procedure 1200 for refining calibration parameters can employ gradient descent techniques. In step 1210, the system initially estimates the calibration parameters. The parameters are then refined in step 1220 using appropriate gradient descent techniques as described herein. For robustness, an illustrative embodiment includes refining the parameters using numerically computed derivatives (such as Levenberg-Marquardt gradient descent). A further embodiment can include performing the refinement using different step sizes (for the numerically computed derivative) to increase the probability of arriving at the global solution. Another embodiment can include running the refinement more than once, in an iterative manner, and for each run, employing a different set of step sizes, and then comparing the errors $E(\ldots |M)$ induced by the estimated parameters, and selecting the parameters which induced the lowest error $E(\ldots |M)$.

In various embodiments, the user specifies (in an embodiment, using the GUI, in other embodiments, via a stored file, and in further embodiments, via information encoded in the scene which is extracted from 3D data in a scan) the calibration object feature positions and these values are used, but not estimated. In these embodiments, the error function depends on the measured feature positions and the specified feature positions, but those measurements are not variables . . . , $E(\ldots M,F)=E$ (Object3DFromPhys3D$_{Pose=p}$,[0 . . . X1], OriginalSensorXZ3DFromPhys3D$_{Sensor=I}$ [0 . . . X2], MotionVectorInPhys3D|M$_{scan,sensor,subobject,feature}$, $F_{frusta,feature}$)

The estimated feature position can be computed in accordance with the following illustrative steps. Given a 3D feature position $F_{frusta,feature}$ (specified in Object3D coordinates) corresponding to scan pose p and sensor i, the first step is to compute that feature position in Phys3D coordinates by mapping it using the inverse of the Object3DFromPhys3D$_{Pose=p}$ transform to compute FPhys3D$_{frusta,feature}$:

$F$Phys3D$_{frusta,feature}$=(Object3DFromPhys3D$_{Pose=p}$)$^{-1}$*$F_{frusta,feature}$.

In the next step, the system computes the intersection plane in Phys3D, which involves mapping the sensorXZ's origin to Phys3D coordinates and mapping its y-axis (normal to its plane) to Phys3D coordinates.

SensorXZPhys3D$_{origin}$= (OriginalSensorXZ3DFromPhys3D$_{Sensor=I}$)$^{-1}$*(0,0,0)

SensorXZPhys3D$_{yAxis}$= (OriginalSensorXZ3DFromPhys3D$_{Sensor=I}$)$^{-1}$*(0,1,0)−SensorXZPhys3D$_{origin}$ The y-coordinate of the intersection corresponds to how many instances of motionVectorPhys3D must be added to the feature position in order to intersect the sensor plane. A 3D point traveling along direction motionVectorPhys3D changes its dot product with SensorXZPhys3D$_{yAxis}$ at a rate of (motionVectorPhys3D dot (SensorXZPhys3D$_{yAxis}$)). Originally the point FPhys3D$_{frusta,feature}$ differed in dot product from the plane SensorXZPhys3D$_{yAxis}$ by a value of (FPhys3D$_{frusta,feature}$−SensorXZPhys3D$_{origin}$) dot (SensorXZPhys3D$_{yAxis}$)), therefore the 3D moves by the following number of instances of motionVectorPhys3D to intersect the plane:

numInstances=((FPhys3D$_{frusta,feature}$− SensorXZPhys3D$_{origin}$)dot (SensorXZPhys3D$_{yAxis}$)))/motionVectorPhys3D dot(SensorXZPhys3D$_{yAxis}$))

After those instances, the feature position intersects the plane at the intersectionPoint, intersectionPoint=FPhys3D$_{frusta,feature}$+ numInstances*motionVectorPhys3D in Phys3D coordinates.

The intersection point in OriginalSensor3D coordinates can be computed by mapping through the transform OriginalSensor3DFromPhys3D$_{Sensor=I}$.

Note that this mapping is linear for a given set of parameters, and it follows that the mapping OriginalSensor3DFromPhys3D$_{Sensor=I}$ is a linear transform and computable from OriginalSensorXZ3DFromPhys3D$_{Sensor=I}$ and MotionVectorPhys3D. The multiplicative factor 1/motionVectorPhys3D dot (SensorXZPhys3D$_{yAxis}$) is constant for a given parameter set. FIG. 13 is a diagram 1300 of the measured feature position based on numInstances described above.

The overall error function, $E(\ldots |M)$ characterizes the sum-square of the discrepancies between the measured feature positions and the estimated feature positions. Each measured feature position (M$_{scan,sensor,subobject,feature}$) is measured in its respective sensor's OriginalSensor3D coordinates. Each calibration object feature position is originally specified in Object3D coordinates. In order to compare each corresponding pair of positions, they must first be transformed into consistent coordinates. For the embodiment where the errors are measured in each sensor's OriginalSensor3D coordinates, the feature positions (which are originally specified in Object3D coordinates) are transformed into OriginalSensor3D coordinates by mapping through the Phys3DFromObject3D$_{Pose=p}$ transform, which is the inverse of the Object3DFromPhys3D$_{Pose=p}$ transform and then mapping through the transform OriginalSensor3DFromPhys3D$_{Sensor=i}$.

$E(\ldots |M)=E_{OriginalSensor3D}(\ldots |M)=$Sum| (M$_{scan,sensor,subobject,feature}$−

$(OriginalSensor3DFromPhys3D_{Sensor=I}*$
$(Object3DFromPhys3D_{Pose=p})^{-1}*F_{frusta,feature})|^2$ In another embodiment of the displacement sensor field calibration procedure, the sum squared error includes the squares of the differences between the measured parallel planar features and the specified parallel planar features $E( \ldots |M)=E_{OriginalSensor3D}( \ldots |M)=\text{Sum}|$
$(M_{scan,sensor,subobject,feature}-$
$(OriginalSensor3DFromPhys3D_{Sensor=I}*$
$(Object3DFromPhys3D_{Pose=p})^{-1}*F_{frusta,feature})|^2+\text{Sum}|$
$((OriginalSensor3DFromPhys3D_{Sensor=j})^{-1}*$
$PPlane_{scan, Sensor=I,parallelPlanarFeature,top}).\text{pointToPlaneDistance}((OriginalSensor3DFromPhys3D_{Sensor=j})^{-1}*$
$PPoint_{scan, Sensor=j,parallelPlanarFeature,bottom}-\text{ParallelPlanarFeatureDistance}_{parallelPlanarFeaturePair}|^2$ Note that a 3D plane is mapped by a transform by mapping the plane's normal by the rotation portion of the transform and by mapping a point on the plane by the transform (rotation and translation). The pointToPlaneDistanceo function characterizes the distance from a point to the closest point on the plane, which is absolute value of the dot product of the plane's normal by the vector subtract of the point and a point on the plane.

In an embodiment that measures the error in each sensor's OriginalSensor3D coordinates, the advantage of measuring the error in each sensor's OriginalSensor3D coordinates is that coordinates are not scaled because they are tied to measured feature positions. The disadvantage of measuring the error in each sensor's OriginalSensor3D coordinates is that the coordinates are not necessarily physically accurate or orthonormal, whereby the measurements in OriginalSensor3D coordinates may be biased by the presentation poses of the calibration object; for each sensor's OriginalSensor3D coordinates, the y coordinates correspond to the magnitude of the conveyance (the motionVectorInPhys3D) whereas the x coordinate and z coordinate were defined by the factory calibration, and the scale of the conveyance magnitude is one of the things that displacement sensor field calibration is estimating.

In another embodiment of the displacement sensor field calibration procedure, the displacement sensor field calibration computation is repeated after estimating the motionVectorInPhys3D and compensated for. Thus, the non-orthogonality of the OriginalSensor3D coordinates is reduced so that the bias due to computing the error in a non-orthonormal coordinate space is reduced. Alternatively, in an embodiment in which the errors are measured in each sensor's Sensor3D coordinates, the measured feature positions are transformed into each sensor's Sensor3D coordinates by mapping them through the coordinate change transform $Phys3DFromOriginalSensor3D_{Sensor=I}$, which is the inverse of $OriginalSensor3DFromPhys3D_{Sensor=I}$. The procedure then maps through the transform $Sensor3DFromPhys3D_{Sensor=i}$. The feature positions (which are originally specified in Object3D coordinates) are transformed into Sensor3D coordinates by mapping through the $Phys3DFromObject3D_{Pose=p}$ transform, which is the inverse of the $Object3DFromPhys3D_{Pose=p}$ transform. The procedure then maps through the transform $Sensor3DFromPhys3D_{Sensor=i}$.

$E( \ldots |M)=E_{Sensor3D}( \ldots |M)=\text{Sum}|$
$((Sensor3DFromPhys3D_{Sensor=I}*$
$(OriginalSensor3DFromPhys$
$3D_{Sensor=I})^{-1}*M_{scan,sensor,subobject,feature})-$
$(Sensor3DFromPhys3D_{Sensor=I}*$
$(Object3DFromPhys3D_{Pose=p})^{-1}*F_{frusta,feature})|^2$ In another embodiment of the displacement sensor field calibration procedure, the sum squared error includes the squares of the differences between the measured parallel planar features and the specified parallel planar features $E( \ldots |M)=E_{Sensor3D}( \ldots |M)=\text{Sum}|$
$((Sensor3DFromPhys3D_{Sensor=I}*$
$(OriginalSensor3DFromPhys3D_{Sensor=I})^{-1}*$
$M_{scan,sensor,subobject,feature})-(Sensor3DFromPhys3D_{Sensor=I}*$
$(Object3DFromPhys3D_{Pose=p})^{-1}*F_{frusta,feature})|^2+\text{Sum}|$
$((OriginalSensor3DFromPhys3D_{Sensor=j})^{-1}*$
$PPlane_{scan, Sensor=I,parallelPlanarFeature,top}).\text{pointToPlaneDistance}((OriginalSensor3DFromPhys3D_{Sensor=j})^{-1}*$
$PPoint_{scan, Sensor=j,parallelplanarFeature,bottom}-\text{ParallelPlanarFeatureDistance}_{parallelPlanarFeaturePair}|^2$ In an embodiment in which the measured error is measured in Phys3D coordinates, the measured feature positions are transformed into Phys3D coordinates by mapping them through the coordinate change transform $Phys3DFromOriginalSensor3D_{Sensor=I}$, which is the inverse of $OriginalSensor3DFromPhys3D_{Sensor=i}$. The feature positions (which are originally specified in Object3D coordinates) are transformed into Phys3D coordinates by mapping through the $Phys3DFromObject3D_{Pose=p}$ transform, which is the inverse of the $Object3DFromPhys3D_{Pose=p}$ transform.

$( \ldots |M)=E_{Phys3D}( \ldots |M)=\text{Sum}|$
$(((OriginalSensor3DFromPhys$
$3D_{Sensor=i})^{-1}*M_{scan,sensor,subobject,feature})-$
$((Object3DFromPhys3D_{Pose=p})^{-1}*F_{frusta,feature})|^2$ Note that the embodiment measuring the error in each sensor's Sensor3D coordinates and the embodiment measuring the error in Phys3D coordinates can be the same because distances are preserved under 3D rigid transforms and Sensor3D and Phys3D are related by a 3D rigid transform.

Other aspects of the filed calibration procedure for a two-sided calibration object can proceed in accordance with the principles described above.

IX. Calibration of Sensors in Presence of Curved Light Projection

A. Overview

Figure 35:
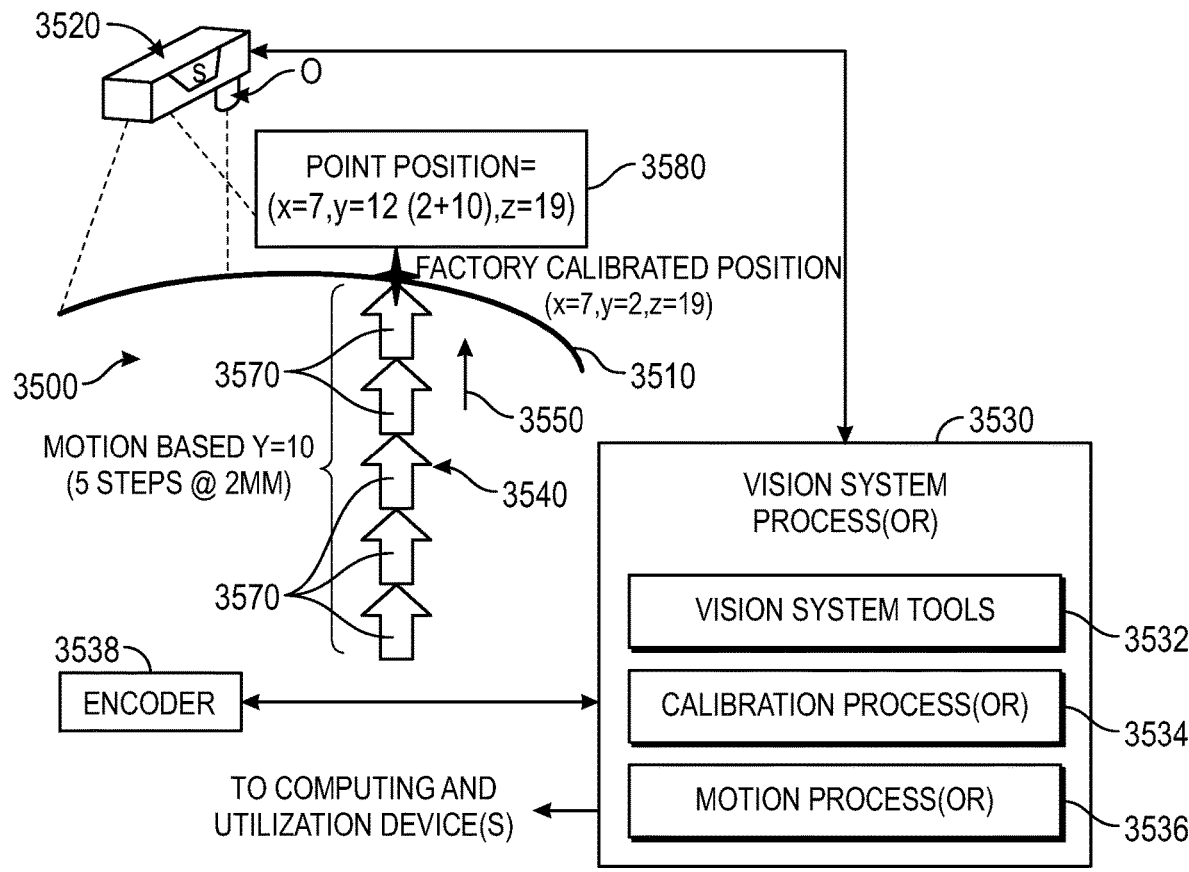
FIG. 35 is a diagram of an exemplary non-planar structured light (e.g. laser) sheet projected by a displacement sensor (profiler) according to an embodiment, for which an exemplary implementation of the embodiment herein can correct.
Figure 36:
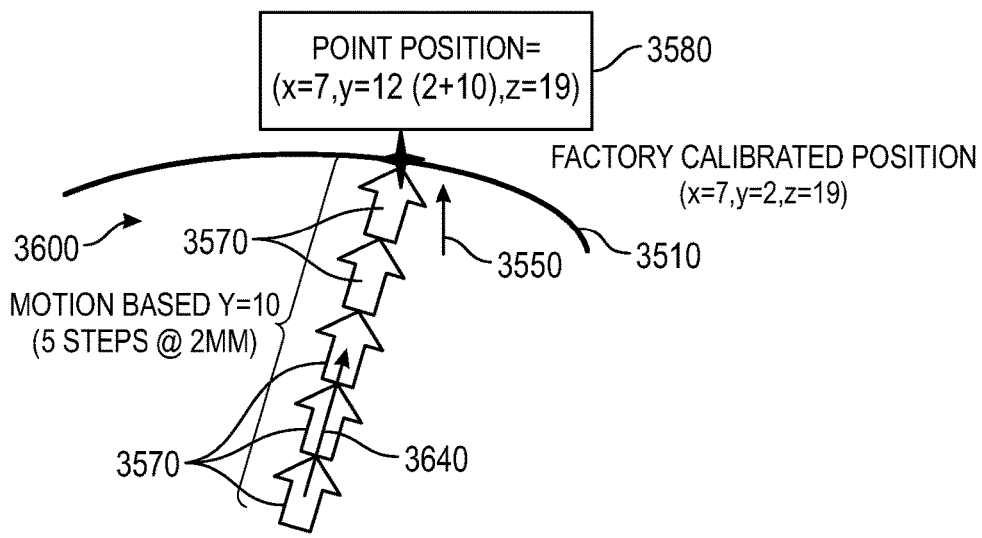
FIG. 36 is a diagram of an exemplary non-planar structured light sheet according to FIG. 35, also depicting a non-parallel direction of object motion y versus a factory calibration coordinate space y for the displacement sensor.

Reference is made to FIGS. 35 and 36, which each show a representation 3500 and 3600, respectively, of a structured light (e.g. laser) sheet 3510 projected by a profiler 3520, having an image sensor S and optics O. As described above, the profiler 3520 can be part of an array of such devices arranged across a conveyor surface. Likewise, the profiler 3520 can include all or part of a vision system process(or) 3530 onboard, or in a separate computing device. As described further below, the process(or) 3530 can include various functional processes/ors and/or modules, including vision system tools 3532, a calibration process(or) 3534 and a motion process(or) 3536. The motion process(or) 3536 interfaces with a conveyor stepper or encoder 3538, or other motion-sensing mechanisms.

Note that a profile sensors' laser sheets can be accurately measured during factory calibration. Additionally, the sensors' laser sheets can be modeled as arcuate or curved surfaces, such that each position of the projected laser line LL corresponds to a 3D position (fx,fy,fz) in factory calibrated coordinates. A motion-based 3D position in factory calibrated coordinates is computed by adding factory calibrated 3D position to a 3D position which only includes a y coordinate corresponding to the motion conveyance position. In implementations of the present embodiment, profile sensors can map the motion-based factory calibrated positions through a known affine transform xyzTfxfyfz to produce P, the returned three dimensional positions. In various implementations, profile sensors can return motion-based positions in factory calibrated coordinates as results, in which case, the xyzTfxfyfz transform (described further below) can be considered the identity transform. Also, the transform fxfyfzTxyz is the inverse transform of xyzTfxfyfz and maps measured 3D data points acquired by the profile sensor to motion-based factory calibrated coordinates.

Thus, as shown, the profiler's laser arrangement projects a non-linear (non-planar) light/laser sheet 3510, which appears to define an arcuate shape in this example. The motion direction 3540 in FIG. 35 is shown in alignment with the generally orthogonal factory calibration direction 3550. Conversely, as depicted in FIG. 36, an additional factor that can arise in scanning objects is the motion direction (or speed) 3640 may not be substantially aligned with factory calibration space/direction 3650. In such instances, the motion direction "y" is oriented at a non-parallel angle with respect to the factory calibration direction y.

Figure 37:
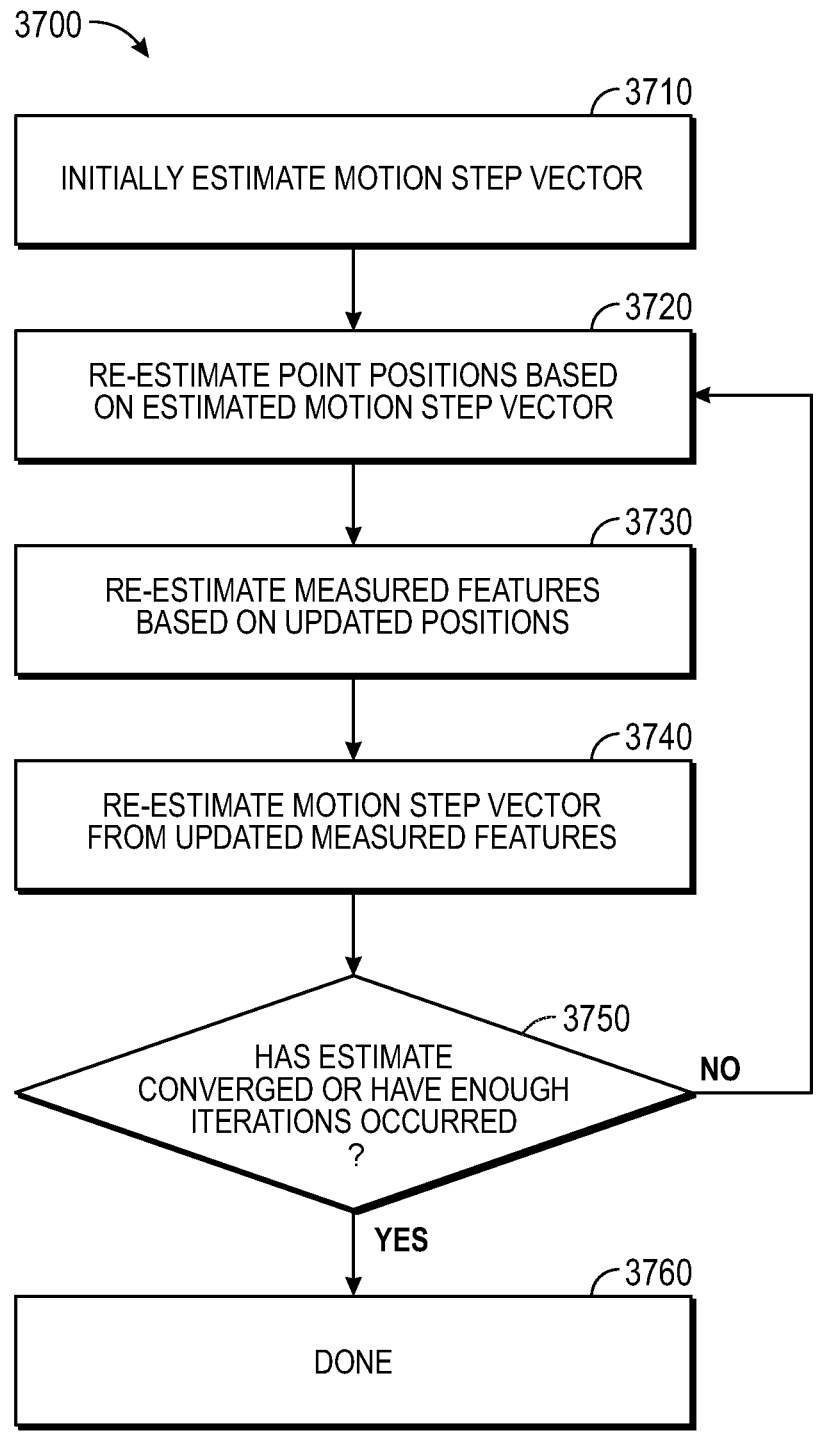
FIG. 37 is a generalized flow diagram of an iterative process for providing correction to the non-planar laser sheet and non-parallel direction of motion depicted in FIGS. 35 and 36.

In overview, a solution to each of the above-described issues/problems can be implemented by operating the calibration process(or) 3534 to perform the general procedure 3700 of FIG. 37. That is, the process(or) 3534 initially estimates the motion step vector (procedure step 3710). Note that the representations 3500 and 3600 define incremental motion steps 3570 that can be based upon one or more encoder pulses (e.g. five 2-millimeter steps 3570 being depicted). The point position (3580 in FIGS. 35 and 36) is then re-estimated in procedure step 3720 based upon the estimated motion step vector. The vision system tools then re-estimate the measured image features based upon the updated positions in procedure step 3730. Then, in procedure step 3740, the motion step vector is also re-estimated from the measured features. The procedure 3700 then, in decision step 3750, determines whether the estimate has converged sufficiently (i.e. within a predetermined threshold), or whether a predetermined number of iterations of steps 3720-3750 have occurred. If neither condition is satisfied, then the procedure 3700 branches back to step 3720 to perform each re-estimation (steps 3720-3740) again, until one of the conditions of decision step 3750 is satisfied, at which time the procedure 3700 concludes (step 3760) with a new estimate of position.

B. Definitions and Further Details

Having described an overview of the operation of the system and method according to the present exemplary embodiment, a more detailed description is provided hereinbelow. In a manner similar to those terms and definitions defined above, for the purposes of this exemplary embodiment, the following terms and definitions are applicable.

| Term | Definition |
| --- | --- |
| Original SensorUVW3D$_{Sensor=i}$ | The coordinate space of data acquired by sensor i of a plurality of sensors 0-n using in U, V, W space which is rigidly related to the factory calibration space. V is wholly dependent on motion steps. |
| Original Sensor UW3D$_{Sensor=i}$ | A coordinate space which shares the u and w axes with Original SensorUVW 3D$_{Sensor=i}$ but where the v axis is perpendicular to the u and w axes (as opposed to being based on the motion direction in the manner of Original Sensor UVW3D$_{Sensor=i}$). |
| Factory Calibrated Coordinates (FX, FY, FZ) | The factory calibrated measured coordinates of positions on the laser sheet. The FY direction is nominally perpendicular to the laser sheet, such that one and only one FY value is associated with each pair of FX, FZ |
| Original SensorFXFYFZ3D$_{Sensor=i}$ | The coordinate space of data acquired by sensor i of a plurality of sensors 0-n using in factory calibrated space. This space differs from OriginalSensor3D$_{Sensor=i}$ for the situation where the acquisition system includes a transform between the factory calibration space and the measurement space |
| Original Sensor FXFZ3D$_{Sensor=i}$ | A coordinate space which shares the fx and fz axes with Original SensorFXFYFZ3D$_{Sensor=i}$ but where the FY axis is perpendicular to the FX and FZ axes (as opposed to FY being based on the motion direction and functions of (FX, FZ) in the manner of Original Sensor FXFYFZ 3D$_{Sensor=i}$). |
| Positions P | The measured (or estimated) (x, y, z) 3D point positions acquired from the data |
| PositionsUVW PUVW | The measured (or estimated) (u, v, w) 3D point positions acquired from the data (transformed from (x, y, z) positions) |
| PositionsUpdatedFXFYFZ PUpdatedFXFYFZ | The measured/estimated updated (fx, fy, fz) 3D point positions acquired from the data (transformed from (x, y, z) positions) |
| Measured feature positions in UVW space MUVW$_{pose, sensor, frusta, feature}$ | The measured (or estimated) (u, v, w) positions of features (e.g., frustum corners) in the calibration target (measurements are in OriginalSensorUVW3D$_{Sensor=i}$). |
| Measured updated feature positions in FXFYFZ space MUpdatedFXFYFZ$_{pose, sensor, frusta, feature}$ | The measured/estimated updated (fx, fy, fz) positions of features (e.g., frustum corners) in the calibration target (measurements are in OriginalSensorFXFYFZ3D$_{Sensor=i}$). |
| SensorIFYPosition(FX, FZ) | For Sensor = i, the factory calibrated fy measurement characterized as a function of factory calibrated (fx, fz) position |
| fxfyfzTxyz FactoryCalibration3Dfrom Measurement3D coordinate transform | (Presumably the same for all sensorns), a rigid 3D coordinate transform characterizing the mapping from measurement coordinates to factory calibration coordinates. |
| uvwTSensorIfxfyfz | For Sensor = i, a Rigid 3D coordinate transform characterizing the mapping between factory calibrated coordinates (fx, fy, fz) and a coordinate system coincident with the laser plane |

C. Various Implementations for Handling Non-Planar Laser Sheets

The following description relates to techniques for handling various use cases related to Laser Sheets by the vision system, of the present embodiment.

i. Field Calibration with Planar Structured Light (e.g. Laser) Sheet

Figure 38:
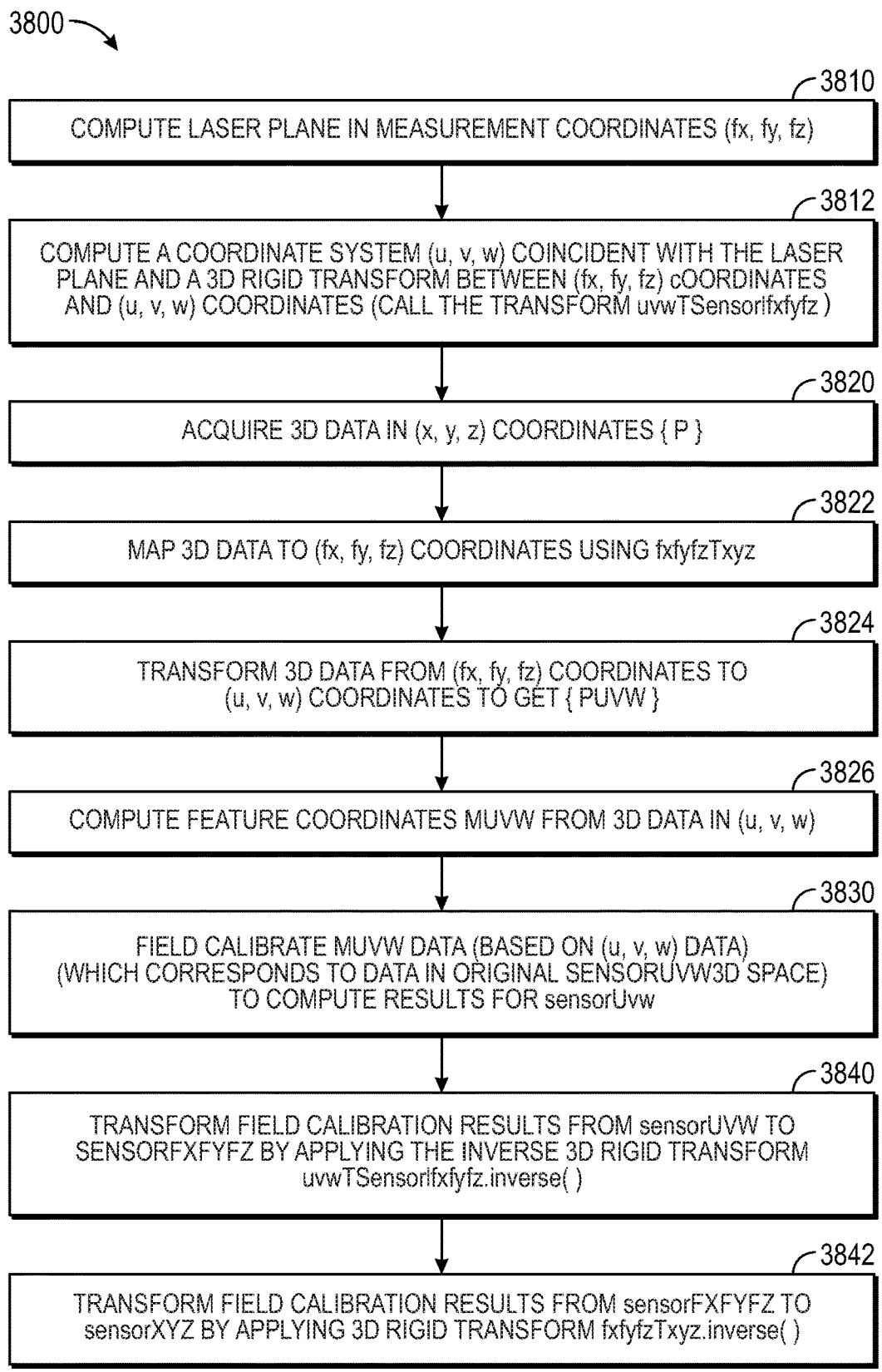
FIG. 38 is a flow diagram of an exemplary correction process that derives transforms between the two coordinate spaces herein.

An embodiment for handling planar laser sheet case (but where the factory calibration space is not aligned to the laser plane) is shown in the procedure 3800 or FIG. 38. The procedure 3800 starts by computing the laser plane measurement coordinates (fxfyfz) in step 3810. Then, in step 3812, the procedure computes a coordinate system/space (u,v,w) that is coincident with the laser plane, and performs a (e.g. rigid 3D) transformation of coordinates from their factory calibration coordinate space of (fx,fy,fz) to a laser plane-aligned coordinate space (u,v,w). The associated 3D rigid transform in step 3812 can be termed uvwTSensorIfxfyfz). In step 3820, the system (e.g. profiler(s)) acquires 3D data in the (x,y,z) coordinates associated with factory calibration of the sensor. In this example, the measured 3D data points/coordinates {P} from step 3820 are mapped to fx,fy,fz coordinates using the fxfyfzTxyz transform in step 3822. Then, the 3D data is transformed from, fx,fy,fz coordinates to (u,v,w) coordinates (based upon the fxfyfzTxyz transform and the respective uvwTSensorIfxfyfz transform) to arrive at a set of measured data points {PUVW corresponding to the (u,v,w) coordinate space in step 3824. Measured features/coordinates {MUVW} (corresponding to the (u,v,w) coordinate space) are derived are then computed from the 3D data in (u,v,w) in step 3826. In step 3830, the field calibration is computed from the between the {MUVW} data in the transformed coordinate space (u,v,w) to compute a field calibration result characterizing OriginalSensorUVW 3D space, the sensors relative to their respective (u,v,w) coordinate spaces. Note that step 650 (the "factory calibration" shown in the procedure 600 of FIG. 6, described above) expects as input 3D positions corresponding to points with fy=0 in their respective sensor coordinate systems. Then, these individual OriginalSensorUVW's are transformed accordingly by the uvwTSensorIfxfyfz and fxfyfzTxyz transforms to produce the OriginalSensor poses.

Similar to the above-described embodiments, in step 3840 of the procedure 3800 the field calibration results from SensorUVW to SensorFXFYFZ (step 3830) can be transformed by applying the inverse 3D rigid transform uvwTSensorIfxfyfz.inverse( ). Finally, in step 3842, the field calibration results from SensorFXFYFZ can be transformed to SensorXYZ by applying 3D rigid transform fxfyfzTxyz.inverse( ).

ii. Separate Measurement Space from Factory Calibration Space

The above-depicted example (FIG. 38) is based upon an implementation in which the measured 3D point positions are in a measurement space which differs from the factory calibrated coordinate space (fx,fy,fz) coordinates. In another exemplary implementation of the present embodiment, the measured 3D point positions (x,y,z) are measured with respect to the factory calibrated coordinate space. The procedure 3800 of FIG. 38 depicts an implementation in which there is a conceptual flow of data through various coordinate spaces. It is contemplated, that at least some of the procedure steps can occur during factory calibration time (e.g. determining the relationship between (fx,fy,fz) and (u,v,w)) whereas other procedure steps can occur during field calibration time (e.g. acquiring 3D data {P} in (x,y,z)).

iii. Planar Laser Sheet Tilting Out of Measurement Space's XZ

Figure 39:
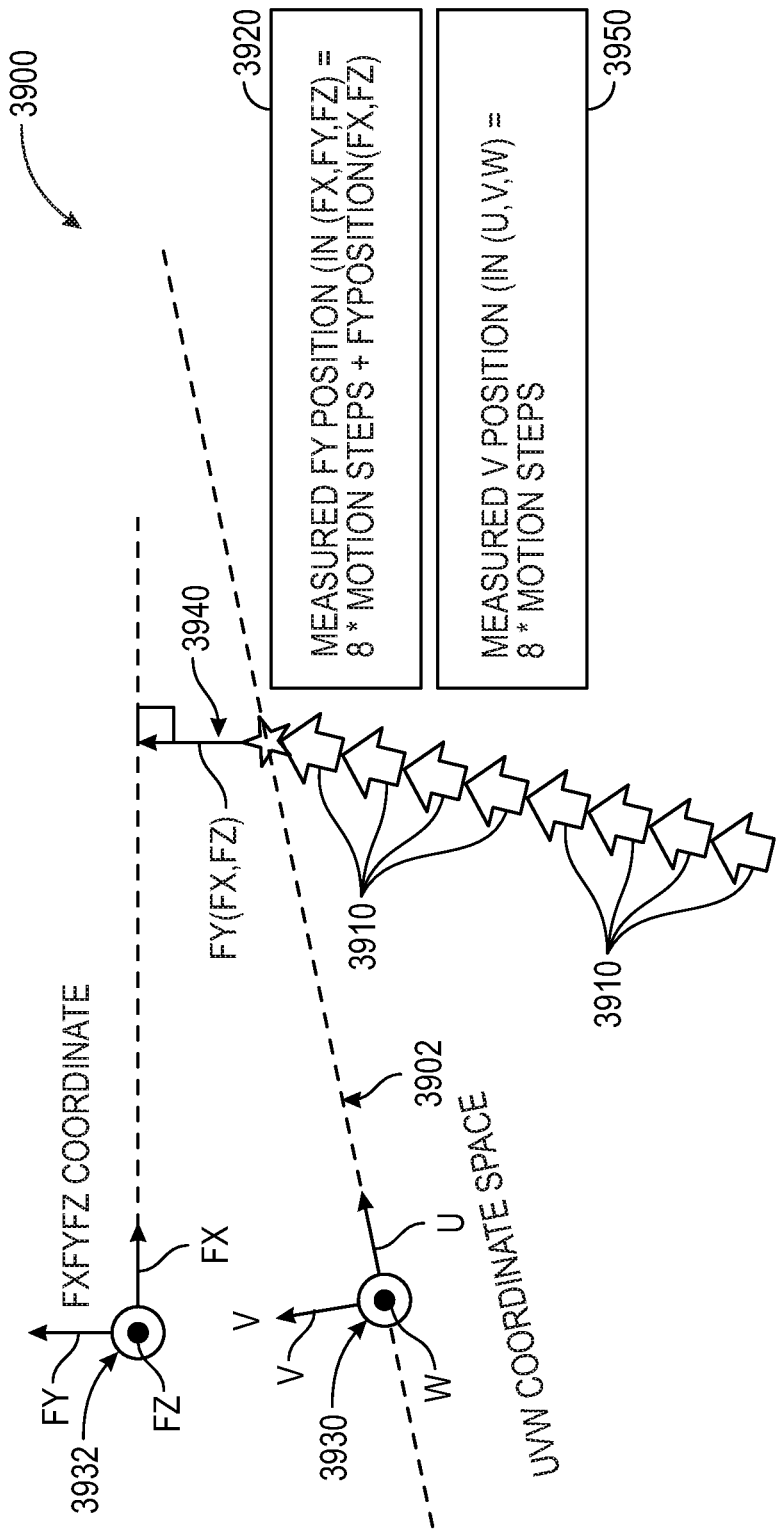
FIG. 39 is a diagram showing a use case in which of the acquired 3D (u,v,w) measurement coordinate space differs from the (fx,fy,fz) factory coordinate space, and a correction is estimated therebetween in accordance with the processes of FIGS. 37 and 38.
Figure 40:
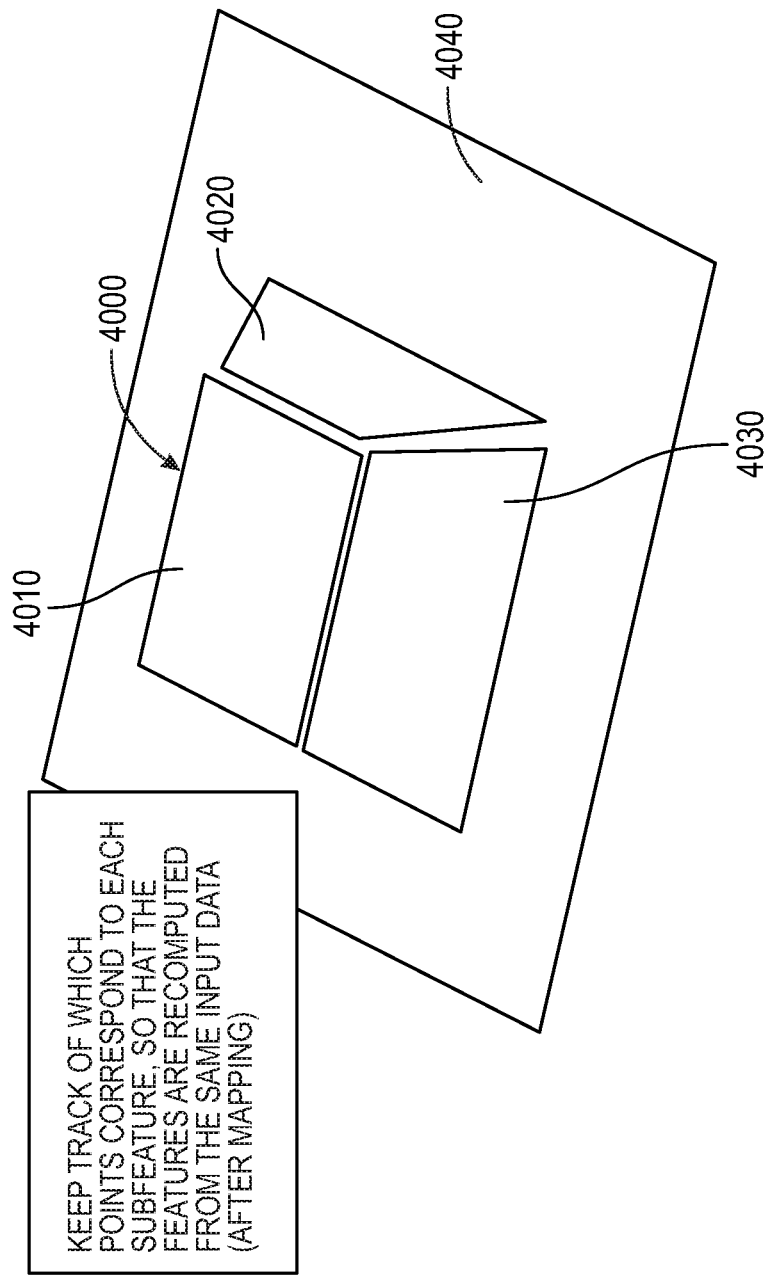
FIG. 40 is diagram of an exemplary calibration object frustum as described herein, showing the various features and feature points tracked according to the processes of FIGS. 37 and 38.

With reference to FIG. 39, a representation 3900 is shown, in which the laser plane/sheet 3902 is not necessarily aligned to the 3D measurement coordinates, the measured y values include contributions from the motion steps 3910 (for example, 8 steps being depicted), and the factory calibrated fyPosition(fx,fz). The representation 3900 more particularly shows a case where of the (u,v,w) measurement coordinate system/space 3930 differs from the (fx,fy,fz) factory coordinate system/space 3932. The representation 3900 further depicts a measurement 3920 for a particular position, wherein the sensor calibration characterizes fyPosition(fx, fz) an additive component fy which is a function of (fx,fz), and the fy position is computed as the sum of a multiple of the number of motion steps 3910 plus the fy component 3940 from the factory calibration. As also shown, the planar laser sheet 3902 is coincident with the (u,w) plane, such that the factory calibrated vPosition(u,w) values are always 0 (the additive component of v which is a function of (u,w). As also shown, the measured position in (u,v,w) the v position 3950 is based solely on a multiple of the number of motion steps 3910 (e.g. 8*motion steps).

iv. Planar Laser Sheet

According to the present embodiment, the (x,y,z) coordinate positions can be transformed (for each Sensor=i) as follows: (a) for each 3D point position, compute the factory calibrated coordinates from the measured (x,y,z) coordinates (using the transform fxfyfzTxyz); (b) compute the factory calibrated fcy position corresponding to the (fx,fz) laser sheet position (fcy=FYPosition(fx,fz)); (c) compute the difference fy−fcy; and (d) then map that 3D position (fx,fy−fcy,fz) to (u,v,w) coordinates using the 3D rigid transform uvwTSensorIfxfyfz. Note that the v coordinate in the mapped point should have a value of 0.

$$(FU,FV,FZ)=(\text{uvwTSensorIfxfyfz}*(FX,FY-\text{FYPosition}(FX,FZ),FZ)$$

Note also that, after transforming the coordinate positions, the next steps are to (a) re-estimate the feature positions (based on points in (u,v,w) coordinates), (b) then call the Field Calibration (to compute the motion direction and sensor pose)(noting again that step 650 (the "factory calibration") expects as input 3D positions corresponding to points with fy=0 in their respective sensor coordinate systems), and (c) map the sensor pose into the original measurement coordinates.

In an implementation of the present embodiment, the FYPosition function can be characterized as a linear function of (fx,fz) because it characterizes the fy position on a plane as a function of fx and fz, when modeling a substantially planar laser sheet.

v. Extracting Calibration Features from Point Cloud Data

In some embodiments, the measured feature positions are computed as follows: from the input data set of points; first, correspondences are found between the points in the input data set and the modeled subfeatures, second, each of the subfeatures is estimated based on the points to which it has been corresponded; third, some groups of subfeatures are analyzed together to produce feature point positions.

vi. Fixed Set of Points Across Iterations

In various exemplary implementations of the present embodiment, each of the subfeatures (used to compute the feature positions) is computed from the same groups of points during all iterations. In some exemplary implementations, this is achieved by (a) keeping track of which subset of points were used to compute each of the subfeatures, and then (b) recomputing the subfeatures from that exact same set of points (after their coordinate values have been mapped accordingly). In some implementations, the computation of the subfeatures involves associating a weight for each point and weighting their contributions accordingly. As such, there are implementations in which the weights are likewise kept track of so that the same weights are used for the points after their coordinates have been mapped accordingly. (Note that the success in using the same set of points (and/or weights) can depend upon the correctness of the initial set.

vii. Update Set of Points in Each Iteration

In some embodiments, the feature extraction algorithm is completely re-run, such that different points are used to compute the subfeatures (for example, the various sides/surfaces 4010, 4020, 4030 and 4040 of a calibration target frustum 4000), which are then used to compute the feature positions. However, it is noted that re-running the feature extraction algorithm can cause different points to be used to compute the subfeatures and then to compute the features, which can introduce seemingly random variations (or perhaps improved estimates) and which can also hamper (or improve) iterative methods.

In various implementations, the feature positions are mapped through the appropriate transforms, and no subfeatures are recomputed and no feature positions are recomputed from subfeatures (in other words, directly mapping points in {M} to {MUVW}).

In various implementations, the individual 3D points are mapped through the appropriate transforms, and subfeatures are recomputed and feature positions are recomputed from subfeatures (in other words, mapping points from {P} to {PUVW} and then recomputing {MUVW} from {PUVVW}.

In further implementations, because the laser sheet is modeled as a plane, since the uvwTSensorIfxfyfz transform, and the fxfyfzTxyz transform and the FYPosition(fx,fz) function are all linear; mapping the feature positions (from {M} to {MUVW}) can yield conceptually the same mapped positions as mapping all the measured points {P} to {PUVW} and then re-estimating the feature positions {MUVW}. This allows for a single-step process.

viii. Single-Step Process Versus Iterative Process

In various implementations of the present embodiment, for the planar laser sheet case, the single-step process can yield the same (or substantially the same) field calibration result as the above-described iterative approach. However, in some exemplary implementations, for non-planar laser sheet use cases, the iterative approach can induce a more accurate field calibration result than a single-step process.

Figure 41:
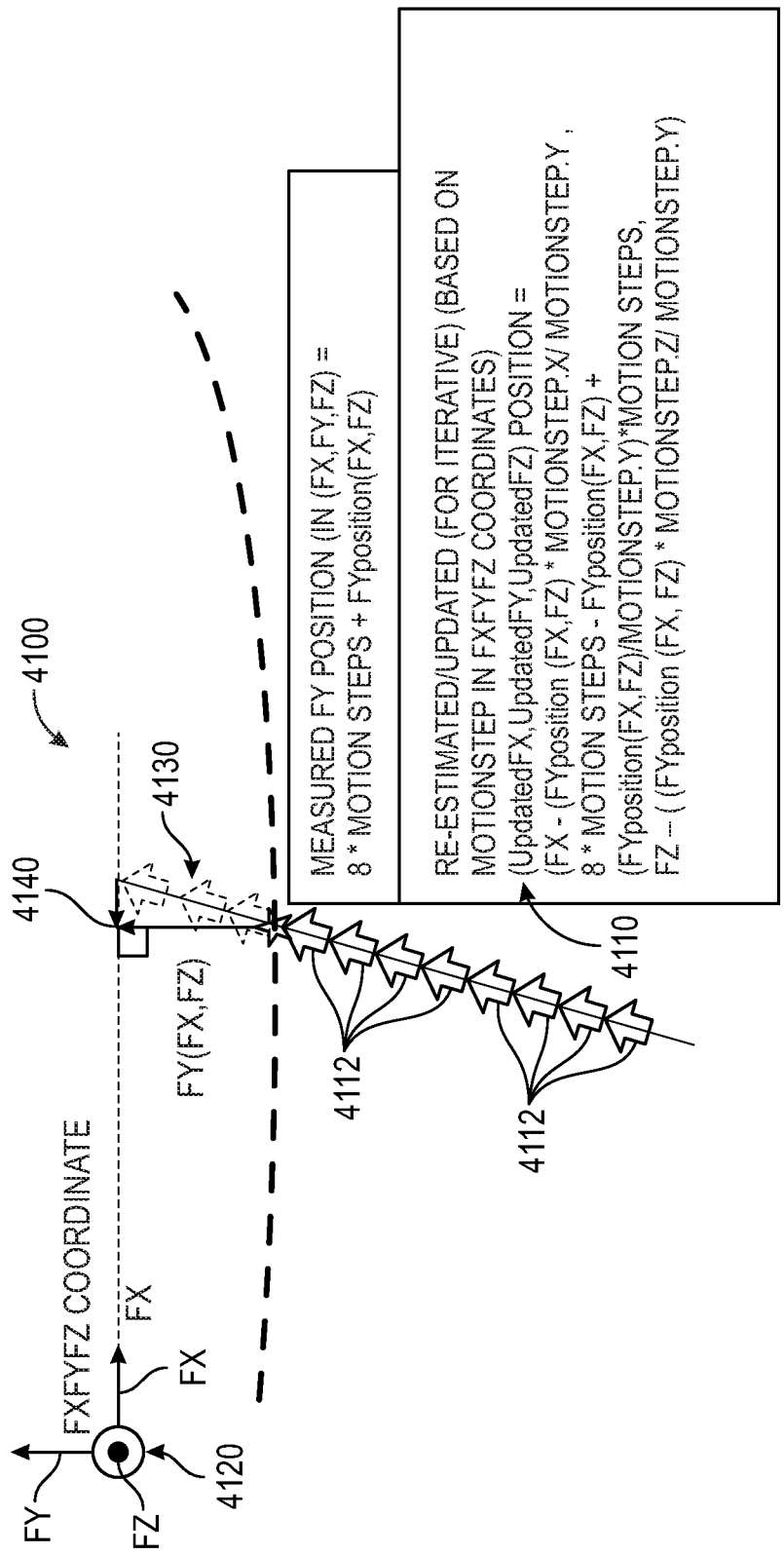
FIG. 41 is a diagram showing a relationship in which the mapped (or updated) coordinate values, fxupdated, fyupdated, fzupdated can all differ from the initial (fx,fy,fz) coordinate values based on the motion step vector (in the FX,FY,FZ coordinate system) and the Factory calibration fy value at that (fx,fz) position.

In some examples of the iterative approach described herein, the measured positions are mapped to convert the contribution from the factory calibrated FY positions into the estimated corresponding number of motion steps (4112). This approach depends on having an estimate of the motion step vector; for the first iteration, the user-specified motion step vector will be used, but in subsequent steps, the previously computed motion step vector will be used and the previously computed SensorPose will be used. Thus, as shown in the representation 4100 of FIG. 41, the mapped coordinate values (or alternatively termed "updated" coordinate values) fxupdated, fyupdated, fzupdated 4110 might all differ from the initial (fx,fy,fz) coordinate values based on the motion step vector (in the FX,FY,FZ coordinate system) and the factory calibration fy value at that (fx,fz) position. Note that the FX,FY,FZ coordinate system 4120 is different for each sensor, and note that the estimated motion step vector 4130 in the FX,FY,FZ coordinate system 4120 is computed from the estimated MotionVectorInPhys3D and Sensor3DFromPhys3D$_{Sensor=i}$. The motion step vector 4130 is referred to as motionStepInFXFYFZ (step 650 (the "factory calibration" shown in the procedure 600 of FIG. 6, described above) expects as input 3D positions corresponding to points with fy=0 in their respective sensor coordinate systems). Position FXupdated,FYupdated,FZupdated 4140 satisfies this expectation, and is estimated from the measured point position FX,FY,FZ and the FYPosition(FX,FZ) and the estimated motionStepInFXFYFZ. The computation yields the following:

FXupdated=FX−FYPosition(FX,FZ)*motionStepInFXFYFZ.x/motionStepInFXFYFZ.y;

FYupdated=FY−FYPosition(FX,FZ)+FYPosition(FX,FZ)/motionStepInFXFYFZ.y; and

FZupdated=FZ−FYPosition(FX,FZ)*motionStepInFXFYFZ.z/motionStepInFXFYFZ.y.

In exemplary implementations, the updated fxupdated, fyupdated, fzupdated coordinate values can differ exclusively in the fy coordinate value from the (fx,fy,fz)—because the fx and fz coordinate values will remain unchanged. The following computations apply:

FXupdated=FX;

FYupdated=FY−FYPosition(FX,FZ)+FYPosition(FX,FZ)/motionStepInFXFYFZ.y; and

FZupdated=FZ.

Figure 42:
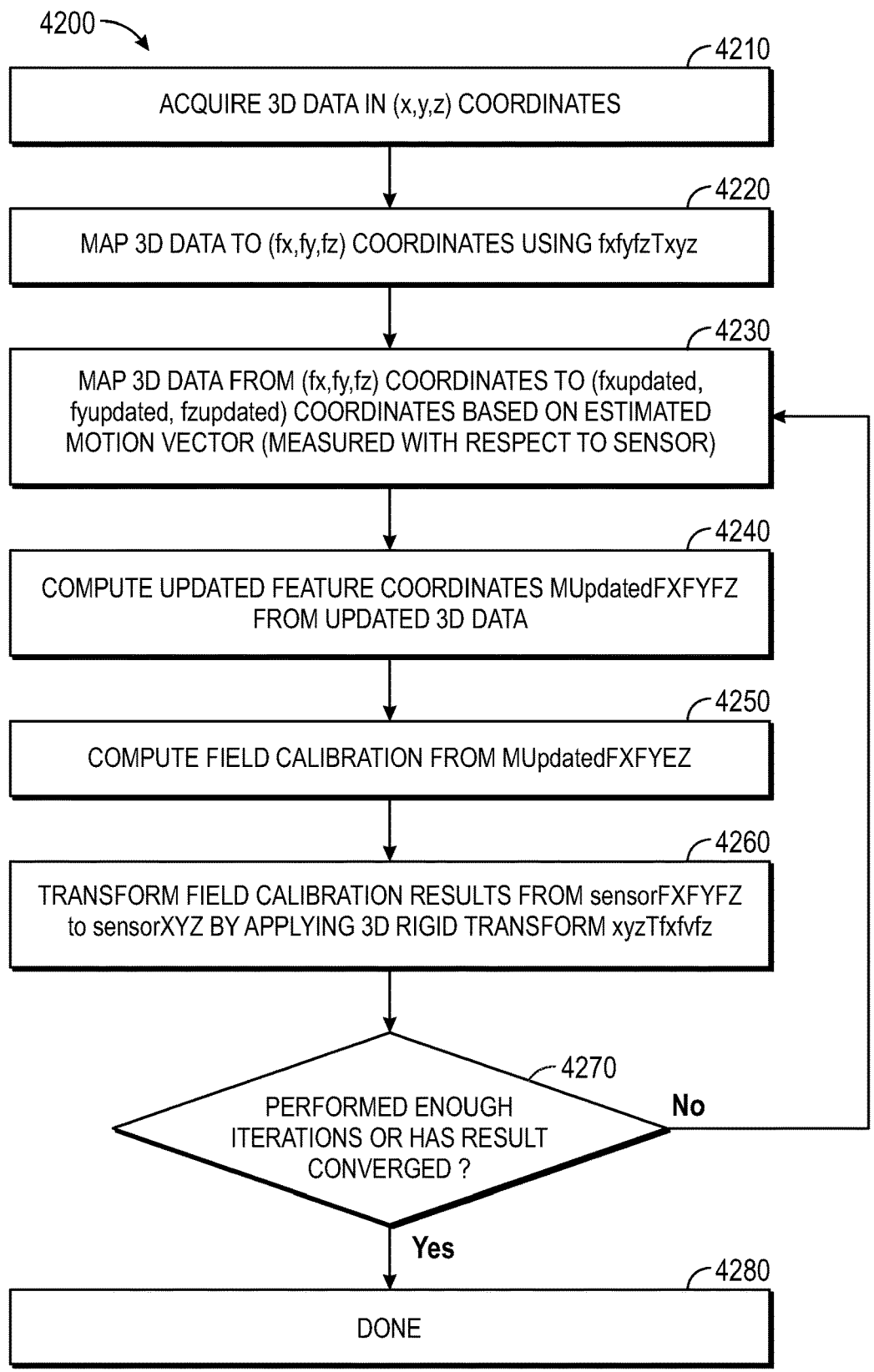
FIG. 42 is an iterative process based around the coordinate space FX,FY,FZ operating similarly to the process of FIG. 38 above.

Reference if made to the procedure 4200 if FIG. 42, which applies to FXFYFZ, in a manner similar to the description for UVW, described above. In the procedure 4200, 3D data is acquired in the factory x,y,z coordinate space (step 4210). In step 4220, the 3D data is mapped to (fx,fy,fz) using the transform fxfyfzTxyz. 3D data from (fx,fy,fz) coordinates is then mapped to (fxupdated, fyupdated, fzupdated) coordinates based upon the estimated motion vector, which is measured with respect to the sensor (step 4230). The procedure 4200 then computes updated feature coordinates MUpdatedFXFYFZ from updated 3D data in step 4240. Then, in step 4250, the procedure 4200 computes the field calibration from MUpdatedFXFYFZ (step 650 (the "factory calibration") expects as input 3D positions corresponding to points with fy=0 in their respective sensor coordinate systems). The field calibration results from SensorFXFYFZ are then transformed to SensorXYZ by applying the 3D rigid transform uvzTfxfvfz in step 4260. This result is analyzed according to decision step 4270. In this step, the procedure determines whether (a) enough iterations of steps 4230-4260 have occurred (e.g. based upon a default or user-defined threshold), or the result has converged sufficiently. If neither is true, then the procedure 4200 branches (via branch 4272) the step 4230, in which 3D data is again mapped from (fx,fy,fz) to (fxupdated, fyupdated, fzupdated), and the above-described steps 4240, 4250 and 4260 are repeated to yield a new result. When a given number of iterations have occurred or the result has converged, then the decision step 4270 is complete 4280, and the result is reported/saved as part of the calibration information for the sensor.

Note that, in various implementations, the feature positions can be mapped through the appropriate transforms, and no subfeatures are recomputed and no feature positions are recomputed from subfeatures (in other words, directly mapping points in {M} to {MUpdatedFXFYFZ}). Also, in some implementations, the individual 3D points are mapped through the appropriate transforms, and subfeatures are recomputed and feature positions are recomputed from subfeature—that is, mapping points from {P} to {PUpdatedFXFYFZ} and then recomputing {MUpdatedFXFYFZ} from {PUpdatedFXFYFZ}.

As described above, it is contemplated in various implementations that a predetermined number of iterations can be performed. In some implementations, iterations can be performed until the iteratively-computed results converge, or, in other words, until the computed result after an iteration is substantially similar to the computed result from the previous iteration. As described above, in some alternate implementations, the iterations will cease either after a predetermined number of iterations or when the iteratively-computed results converge.

D. Compensation for Non-Parallel Planar Laser Sheet

Figure 43:
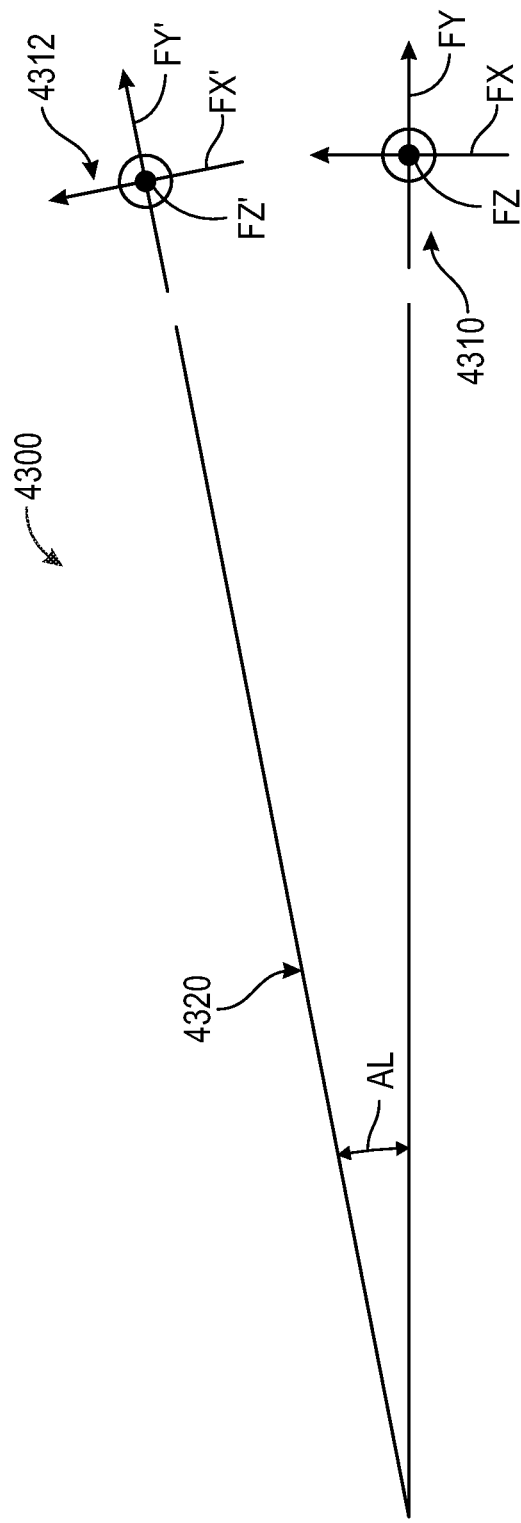
FIG. 43 is a diagram showing an arrangement for the profiler in which a substantially planar laser sheet is oriented at a non-parallel angle with respect to the image sensor's factory coordinate space, illustrating a technique for compensating for this relationship using a software-based approach.

FIG. 43 shows an arrangement 4300 in which the image sensor's factory coordinate space (FX,FY,FZ) 4310 is non-parallel (e.g. acute angle AL) with respect to the line of projection 4320 of a substantially planar laser sheet. The laser sheet 4320, thus, defines a different coordinate space (FX',FY',FZ') 4312. It is possible during manufacture of a profiler, that the laser sheet projector component can be non-parallel with respect to the sensor coordinate space. In general, during manufacture, it is typical to undertake significant, time-consuming and costly fixturing operations to ensure appropriate physical alignment of the laser sheet projector and the image sensor. This alignment may not remain stable throughout the life of the profiler based upon various factors. The above-described techniques can be employed to provide a software (or firmware) based solution to compensate for a physically non-parallel laser plane and image sensor coordinate space. That is, the non-parallel, planar laser sheet is imaged on an appropriate calibration object of known dimensions. The features are used to map between the two coordinate spaces 4310 and 4312. These techniques then generate an appropriate transform (as described above) between the two coordinate spaces 4310 and 4312 at the time of manufacture, or in the field, which is stored as part of the profiler's calibration parameters. Hence, the technique for compensating for such non-parallel relationships is performed via software and free of the use of a physical fixturing or alignment process.

E. Further Implementations

It is contemplated that the system and method of the present embodiment can be variously implemented with elements of the other embodiments described herein. For example, the system and method can be applied to calibration objects having 3D features on each of opposing sides. The system and method can also be applied to sensors in a staggered array or straight-line array. Calibration features (e.g. frusta) can be arranged along a "vertical" alignment and a "horizontal" alignment (relative to the conveyance motion direction). The calibration features can also be marked with various indicia to resolve their identity in the overall array. Appropriate GUI screen displays can be implemented to setup and control the functional aspects of the system and method such as thresholds for convergence and/or number of iterations to be used.

X. Conclusion

It should be clear that the above-described system and method effectively provides automatic setup and calibration of a plurality of 3D (e.g. laser displacement) sensors concurrently (i.e. not one-at-a-time or in a serial manner) in a manner that is scalable to an arbitrary, desired number of sensors and width of FOV. Advantageously, the illustrative calibration technique does not require a precisely manufactured (or precisely measured) calibration object. Moreover, the above-described system and method effectively addresses issues caused by non-planar structured light (e.g. laser) sheets used by the sensor(s) to illuminate the object under inspection and/or misalignments between the factory coordinate space of the sensor and the motion direction.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). By way of further example, where relative motion is described, it can refer to exclusively moving objects, exclusively moving image sensors or both moving objects and moving image sensors. Thus, in certain implementation relative motion can be a predictable rotational motion, such as objects positioned on a moving carousel. Accordingly, this description is meant to be taken only by way of example, and not to otherwise limit the scope of this invention.

What is claimed is:

1. A system for generating measurements as a result of a calibration process in a 3D vision system sensor in the presence of either a non-planar structured light sheet used to illuminate an object or a non-parallel relationship between a direction of object travel and a factory coordinate space of the 3D vision system sensor comprising:
    an image sensor connected to a processor responsive to factory calibration parameters associated with a factory coordinate space that has an origin and orthogonal directions defined in production of the image sensor, and the image sensor being adapted to receive motion step information from a motion signal device of the motion conveyance that moves the object with respect to a field of view and the structured light sheet of the 3D vision sensor;

a correction process that determines a mapping between the factory coordinate space and another coordinate space derived from acquired 3D image data of the object and that derives a transform therebetween; and an iterative process that applies the correction process a plurality of times based upon predetermined factors.

2. The system as set forth in claim 1 wherein the correction process employs estimates of the motion step information and is adapted to re-estimate acquired point positions of the 3D data based upon the estimated motion step information.

3. The system as set forth in claim 2 wherein the iterative process re-estimates measured features of the object to derive updated measured features and re-estimates the motion step information from the updated measured features.

4. The system as set forth in claim 3 wherein the motion step information defines vector information.

5. The system as set forth in claim 4 wherein the predetermined factors comprise a number of times the iterative process is performed or convergence of the re-estimated measured features.

6. The system as set forth in claim 1 wherein the 3D image data is based upon a calibration object having a plurality of 3D features thereon.

7. The system as set forth in claim 6 wherein the 3D features define a frustum.

8. The system as set forth in claim 1 wherein the 3D vision system sensor is a laser displacement sensor.

9. The system as set forth in claim 8, further comprising a plurality of laser displacement sensors mounted across a width that is substantially transverse to the motion direction.

10. The system as set forth in claim 1, further comprising a calibration object having (a) a base defining a first side and an opposing second side, (b) a first three-dimensional element projecting from the first side, the first three-dimensional element having a first top, (c) a second three-dimensional element projecting from the second side, the second three-dimensional element having a second top, and (d) a first plane located relative to the first side and a second plane located relative to the second side, wherein the first plane and the second plane are substantially parallel.

11. A system for generating calibration measurements in a profile sensor of a vision system comprising:

a compensation process that determines an image sensor coordinate space and a substantially planar structured light coordinate space that can be non-parallel with respect to each other, the compensation process determining a transform between the image sensor coordinate space that has an origin and orthogonal directions defined in production of the image sensor, and the structured light coordinate space, defined based upon an external structured light source, features of an imaged calibration object of known dimensions, the transform being stored as part of the calibration parameters of the profile sensor.

12. The system as set forth in claim 11 wherein the compensation process occurs free of physical alignment or fixturing processes with respect to the profile sensor.

13. A method for generating measurements as a result of a calibration process in a 3D vision system sensor in the presence of either a non-planar structured light sheet used to illuminate an object or a non-parallel relationship between a direction of object travel on a motion conveyance that passes through a field of view of the 3D vision system sensor and a factory coordinate space of the 3D vision system sensor, the method comprising the steps of:

providing motion step information from the motion conveyance to a vision system processor responsive to factory calibration parameters associated with a factory coordinate space, the factory calibration parameters having an origin and orthogonal directions defined in production of the 3D vision sensor, and adapted to receive motion step information from a motion signal device of the motion conveyance that moves the object with respect to a field of view and the structured light sheet of the 3D vision system sensor;

determining a mapping between the factory coordinate space and another coordinate space derived from acquired 3D image data of the object and computing a transform therebetween; and iteratively applying the steps of determining and computing a plurality of times based upon predetermined factors.

14. The method as set forth in claim 13, further comprising, estimating the motion step information and re-estimating acquired point positions of the 3D data based upon the estimating of the motion step information.

15. The method as set forth in claim 14, further comprising, re-estimating measured features of the object to derive updated measured features and re-estimating the motion step information from the updated measured features.

16. The method as set forth in claim 15, wherein the predetermined factors comprise a number of times the step of iteratively applying is performed or convergence of the re-estimated measured features.

17. The method as set forth in claim 13 wherein the 3D image data is based upon a calibration object having a plurality of 3D features thereon.

18. The method as set forth in claim 13 wherein the 3D vision system sensor is a laser displacement sensor.

19. The method as set forth in claim 18, further comprising mounting a plurality of laser displacement sensors across a width that is substantially transverse to the motion direction.

* * * * *